US008746563B2

(12) United States Patent
Hennick et al.

(10) Patent No.: US 8,746,563 B2
(45) Date of Patent: Jun. 10, 2014

(54) LASER SCANNING MODULE WITH ROTATABLY ADJUSTABLE LASER SCANNING ASSEMBLY

(75) Inventors: Robert John Hennick, Cayuga, NY (US); Roberto Spuches, Liverpool, NY (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/492,883

(22) Filed: Jun. 10, 2012

(65) Prior Publication Data

US 2013/0327834 A1 Dec. 12, 2013

(51) Int. Cl.
*G06K 7/00* (2006.01)
(52) U.S. Cl.
USPC ........................................... 235/439
(58) Field of Classification Search
USPC ................................ 235/439–441
See application file for complete search history.

(56) References Cited

U.S. PATENT DOCUMENTS

| 3,020,414 | A | 2/1962 | Mcknight et al. |
| 3,087,373 | A | 4/1963 | Poor et al. |
| 3,532,408 | A | 10/1970 | Dostal |
| 3,642,344 | A | 2/1972 | Corker |
| 4,034,230 | A | 7/1977 | Brill et al. |
| 4,251,798 | A | 2/1981 | Swartz et al. |
| 4,286,145 | A | 8/1981 | Palmer |
| 4,805,175 | A | 2/1989 | Knowles |
| 4,856,858 | A | 8/1989 | Koike et al. |
| 5,003,164 | A | 3/1991 | Barkan |
| 5,015,831 | A | 5/1991 | Eastman et al. |
| 5,019,764 | A | 5/1991 | Chang |
| 5,059,779 | A | 10/1991 | Krichever et al. |
| 5,099,110 | A | 3/1992 | Shepard et al. |
| 5,115,120 | A | 5/1992 | Eastman |
| 5,126,545 | A | 6/1992 | Barkan |
| 5,168,149 | A | 12/1992 | Dvorkis et al. |

(Continued)

FOREIGN PATENT DOCUMENTS

| JP | 2003315713 A | 11/2003 |
| WO | 2011038072 | 3/2011 |

OTHER PUBLICATIONS

Oliveira et al., "Dynamic Analysis of Silicon Micromachined Double-Rotor Scanning Mirror", Journal of Brazilian Society of Mechanical Science and Engineering, Oct.-Dec. 2006, vol. XXVIII, No. 4/443.
Search Report for PCT/US2010/049927 completed May 13, 2011.

*Primary Examiner* — Christle I Marshall
(74) *Attorney, Agent, or Firm* — Additon, Higgins, Pendleton & Ashe, P.A.

(57) ABSTRACT

A laser scanning module employing a laser scanning assembly mounted within a module housing using a mechanism that allows the laser scanning assembly to be rotated to an angular position within the engine housing so that light collection, beam folding and light collection mirrors in the module housing are optically aligned. A PC board is mounted on a side of the housing and has a configuration of elongated apertures of open-ended and/or closed geometry, arranged in a non-parallel manner. An electromagnetic coil structure, associated with the laser scanning assembly, has a linear array of electrically-conductive pins that project through the configuration of elongated holes, at locations along the elongated holes that are determined by the angular rotation of the laser scanning assembly attained during optical alignment conditions during manufacture.

16 Claims, 55 Drawing Sheets

(56) References Cited

U.S. PATENT DOCUMENTS

| | | | |
|---|---|---|---|
| 5,200,597 A | 4/1993 | Eastman et al. |
| 5,206,492 A | 4/1993 | Shepard et al. |
| 5,252,816 A | 10/1993 | Onimaru et al. |
| 5,258,699 A | 11/1993 | Grodevant |
| 5,262,627 A | 11/1993 | Shepard |
| 5,280,163 A | 1/1994 | Barkan |
| 5,280,165 A | 1/1994 | Dvorkis et al. |
| 5,281,801 A | 1/1994 | Shepard et al. |
| 5,329,103 A | 7/1994 | Rando |
| 5,367,151 A | 11/1994 | Dvorkis et al. |
| 5,373,148 A | 12/1994 | Dvorkis et al. |
| 5,412,198 A | 5/1995 | Dvorkis |
| 5,420,411 A | 5/1995 | Salatto, Jr. et al. |
| 5,422,469 A | 6/1995 | Bard et al. |
| 5,422,471 A | 6/1995 | Plesko |
| 5,422,472 A | 6/1995 | Tavislan et al. |
| 5,464,976 A | 11/1995 | Scofield et al. |
| 5,475,206 A | 12/1995 | Reddersen et al. |
| 5,479,000 A | 12/1995 | Dvorkis et al. |
| 5,484,995 A | 1/1996 | Scofield et al. |
| 5,486,944 A | 1/1996 | Bard et al. |
| 5,506,394 A | 4/1996 | Plesko |
| 5,508,503 A | 4/1996 | Scofield et al. |
| 5,512,744 A | 4/1996 | Scofield et al. |
| 5,519,198 A | 5/1996 | Plesko |
| 5,532,468 A | 7/1996 | Scofield |
| 5,532,480 A | 7/1996 | Scofield |
| 5,539,192 A | 7/1996 | Scofield et al. |
| 5,543,609 A | 8/1996 | Giordano et al. |
| 5,559,319 A | 9/1996 | Peng |
| 5,576,531 A | 11/1996 | Murphy |
| 5,581,067 A | 12/1996 | Grosfeld et al. |
| 5,581,070 A | 12/1996 | Dvorkis et al. |
| 5,583,332 A | 12/1996 | Krichever et al. |
| 5,589,679 A | 12/1996 | Dvorkis et al. |
| 5,594,232 A | 1/1997 | Giordano |
| 5,596,446 A | 1/1997 | Plesko |
| 5,598,070 A | 1/1997 | Coleman |
| 5,600,120 A | 2/1997 | Peng |
| 5,614,706 A | 3/1997 | Bard et al. |
| 5,621,371 A | 4/1997 | Dvorkis et al. |
| 5,625,483 A | 4/1997 | Swartz |
| 5,629,510 A | 5/1997 | Quinn et al. |
| 5,637,856 A | 6/1997 | Bridgelall et al. |
| 5,648,649 A | 7/1997 | Bridgelall et al. |
| 5,656,805 A | 8/1997 | Plesko |
| 5,668,362 A | 9/1997 | Plesko |
| 5,682,029 A | 10/1997 | Dvorkis et al. |
| 5,691,834 A | 11/1997 | Plesko |
| 5,693,929 A | 12/1997 | Dvorkis et al. |
| 5,698,835 A | 12/1997 | Dvorkis et al. |
| 5,705,799 A | 1/1998 | Li |
| 5,712,471 A | 1/1998 | Bremer |
| 5,714,750 A | 2/1998 | Eastman et al. |
| 5,723,851 A | 3/1998 | Salatto, Jr. et al. |
| 5,750,976 A | 5/1998 | Eastman et al. |
| 5,763,863 A | 6/1998 | Grosfeld et al. |
| 5,764,398 A | 6/1998 | Hayakawa |
| 5,786,585 A | 7/1998 | Eastman et al. |
| 5,796,222 A | 8/1998 | Grodevant |
| 5,804,809 A | 9/1998 | Eastman et al. |
| 5,821,521 A | 10/1998 | Bridgelall et al. |
| 5,825,013 A | 10/1998 | Dvorkis et al. |
| 5,866,894 A | 2/1999 | Bard et al. |
| 5,870,219 A | 2/1999 | Plesko |
| 5,874,720 A | 2/1999 | Dvorkis et al. |
| 5,886,452 A | 3/1999 | Plesko |
| 5,917,173 A | 6/1999 | Dvorkis et al. |
| 5,923,025 A | 7/1999 | Dvorkis et al. |
| 5,932,860 A | 8/1999 | Plesko |
| 5,945,658 A | 8/1999 | Salatto, Jr. et al. |
| 5,945,659 A | 8/1999 | Dvorkis et al. |
| 5,955,720 A | 9/1999 | He et al. |
| 5,984,188 A | 11/1999 | Dvorkis et al. |
| 6,056,200 A | 5/2000 | Dvorkis et al. |
| 6,059,188 A | 5/2000 | Difazio et al. |
| 6,102,294 A | 8/2000 | Swartz et al. |
| 6,114,712 A | 9/2000 | Dvorkis et al. |
| 6,129,282 A | 10/2000 | Reddersen |
| 6,142,379 A | 11/2000 | Bard et al. |
| 6,149,061 A | 11/2000 | Massieu et al. |
| 6,152,372 A | 11/2000 | Colley et al. |
| 6,173,895 B1 | 1/2001 | Plesko |
| 6,206,290 B1 | 3/2001 | Giebel et al. |
| 6,227,450 B1 | 5/2001 | Blake et al. |
| 6,230,976 B1 | 5/2001 | Sautter et al. |
| 6,283,372 B1 | 9/2001 | Li |
| 6,303,927 B1 * | 10/2001 | Ahten et al. .................. 250/234 |
| 6,325,288 B1 | 12/2001 | Spitz |
| 6,328,216 B1 | 12/2001 | Colley et al. |
| 6,332,576 B1 | 12/2001 | Colley et al. |
| 6,334,573 B1 | 1/2002 | Li et al. |
| 6,347,744 B1 | 2/2002 | Metlitsky |
| 6,348,773 B1 | 2/2002 | Dvorkis et al. |
| 6,360,949 B1 | 3/2002 | Shepard et al. |
| 6,390,370 B1 | 5/2002 | Plesko |
| 6,439,461 B2 | 8/2002 | Dvorkis et al. |
| 6,491,222 B1 | 12/2002 | Dvorkis et al. |
| 6,527,180 B1 | 3/2003 | Dvorkis et al. |
| 6,527,183 B2 | 3/2003 | Bard et al. |
| 6,540,145 B2 | 4/2003 | Gurevich et al. |
| 6,575,370 B1 | 6/2003 | Dvorkis et al. |
| 6,585,160 B2 | 7/2003 | Dvorkis et al. |
| 6,592,040 B2 | 7/2003 | Barkan et al. |
| 6,607,132 B1 | 8/2003 | Dvorkis et al. |
| 6,612,192 B2 | 9/2003 | Hardy et al. |
| 6,612,496 B1 | 9/2003 | Barkan et al. |
| 6,621,070 B2 | 9/2003 | Ahten et al. |
| 6,637,657 B2 * | 10/2003 | Barkan et al. ............ 235/462.43 |
| 6,641,043 B1 | 11/2003 | Plesko |
| 6,641,044 B2 | 11/2003 | Plesko |
| 6,648,227 B2 | 11/2003 | Swartz et al. |
| 6,651,888 B1 | 11/2003 | Gurevich et al. |
| 6,657,765 B2 | 12/2003 | Hayashi et al. |
| 6,712,270 B2 | 3/2004 | Leach |
| 6,715,681 B2 | 4/2004 | Dvorkis |
| 6,722,566 B1 | 4/2004 | Drzymala et al. |
| 6,729,545 B2 | 5/2004 | Li et al. |
| 6,769,616 B2 | 8/2004 | Fu et al. |
| 6,775,077 B1 | 8/2004 | Feng |
| 6,817,529 B2 | 11/2004 | Barkan et al. |
| 6,874,689 B2 | 4/2005 | Blake et al. |
| 6,884,993 B2 | 4/2005 | Ahten et al. |
| 6,900,918 B2 | 5/2005 | Orcutt et al. |
| 6,929,184 B2 | 8/2005 | Barkan |
| 6,932,274 B2 | 8/2005 | Dvorkis |
| 6,969,005 B2 | 11/2005 | Otsubo |
| 6,994,256 B2 * | 2/2006 | Shimizu et al. .......... 235/462.37 |
| 7,034,370 B2 | 4/2006 | Kuo et al. |
| 7,059,528 B2 | 6/2006 | Barkan et al. |
| 7,071,931 B2 | 7/2006 | Tegreene et al. |
| 7,182,262 B2 | 2/2007 | Wood et al. |
| 7,184,187 B2 | 2/2007 | Cannon et al. |
| 7,204,424 B2 | 4/2007 | Yavid et al. |
| 7,207,489 B2 | 4/2007 | Drzymala et al. |
| 7,246,375 B1 | 7/2007 | Jean et al. |
| 7,281,658 B2 | 10/2007 | Shepard et al. |
| 7,296,750 B2 | 11/2007 | Wood et al. |
| 7,306,154 B2 | 12/2007 | Takahashi |
| 7,325,736 B2 | 2/2008 | Asai et al. |
| 7,379,221 B2 | 5/2008 | Saito |
| 7,387,248 B2 | 6/2008 | Drzymala et al. |
| 7,416,126 B2 | 8/2008 | Wittenberg et al. |
| 7,420,721 B2 | 9/2008 | Takeuchi |
| 7,441,705 B2 | 10/2008 | Shepard et al. |
| 7,614,561 B2 | 11/2009 | Blake et al. |
| 7,667,723 B2 | 2/2010 | Cannon et al. |
| 8,059,324 B2 | 11/2011 | Edmonds |
| 2004/0179254 A1 | 9/2004 | Lewis et al. |
| 2006/0169780 A1 | 8/2006 | Drzymala et al. |

\* cited by examiner

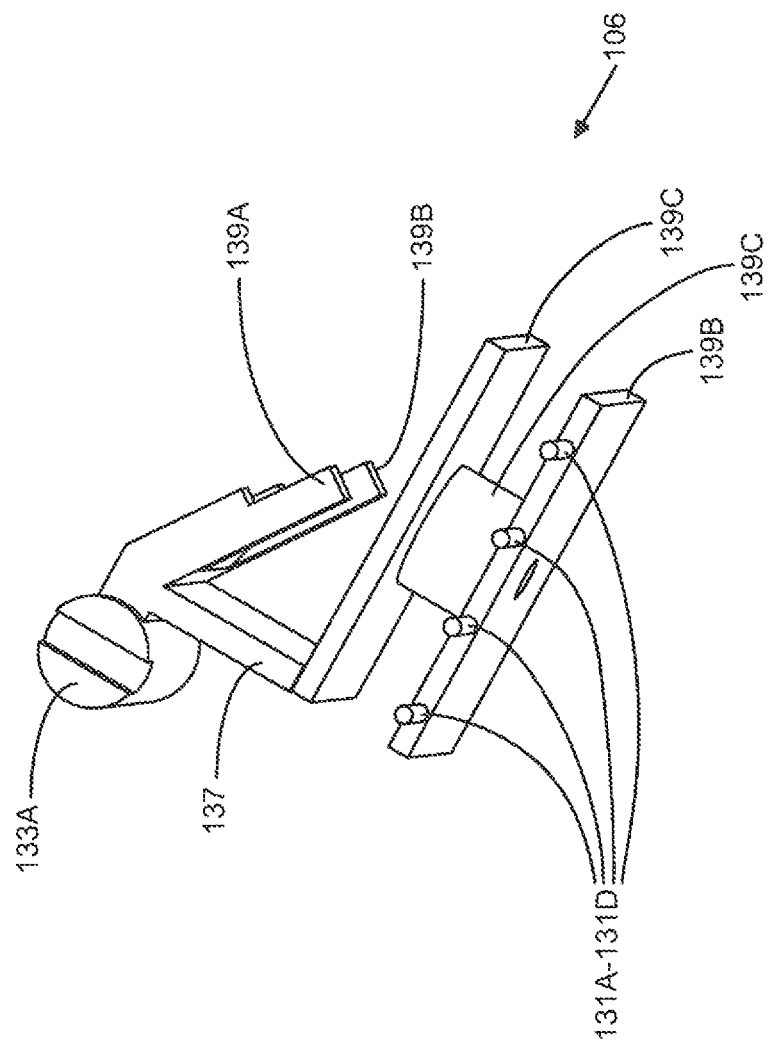

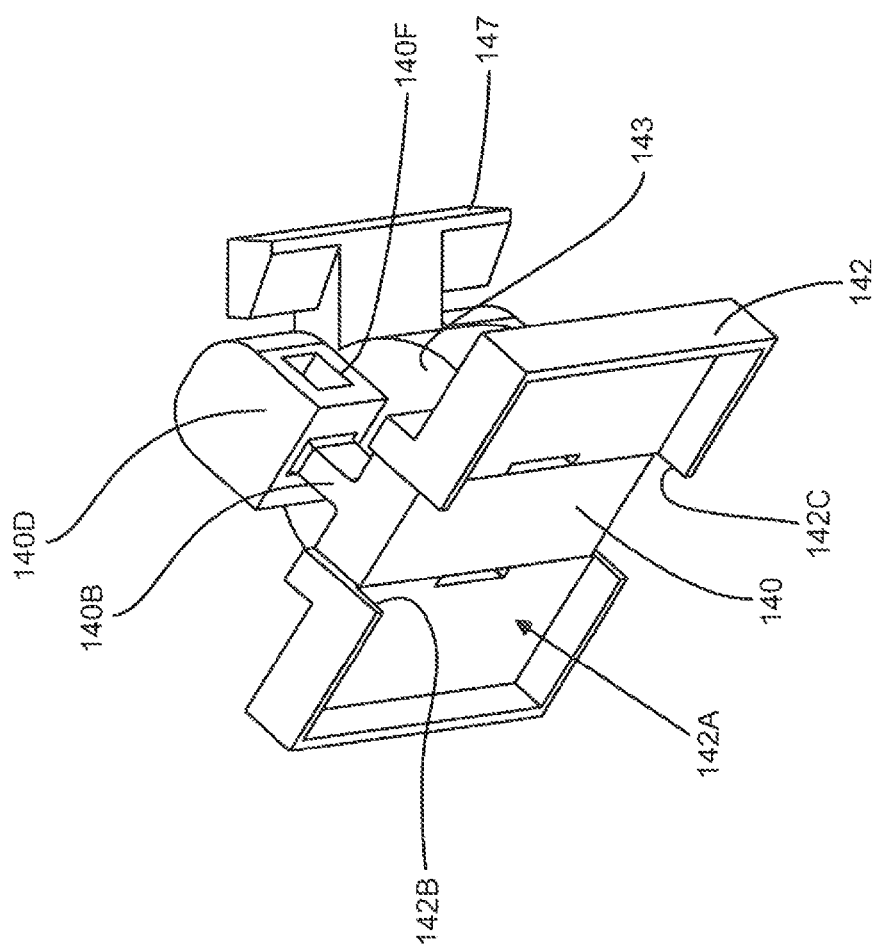

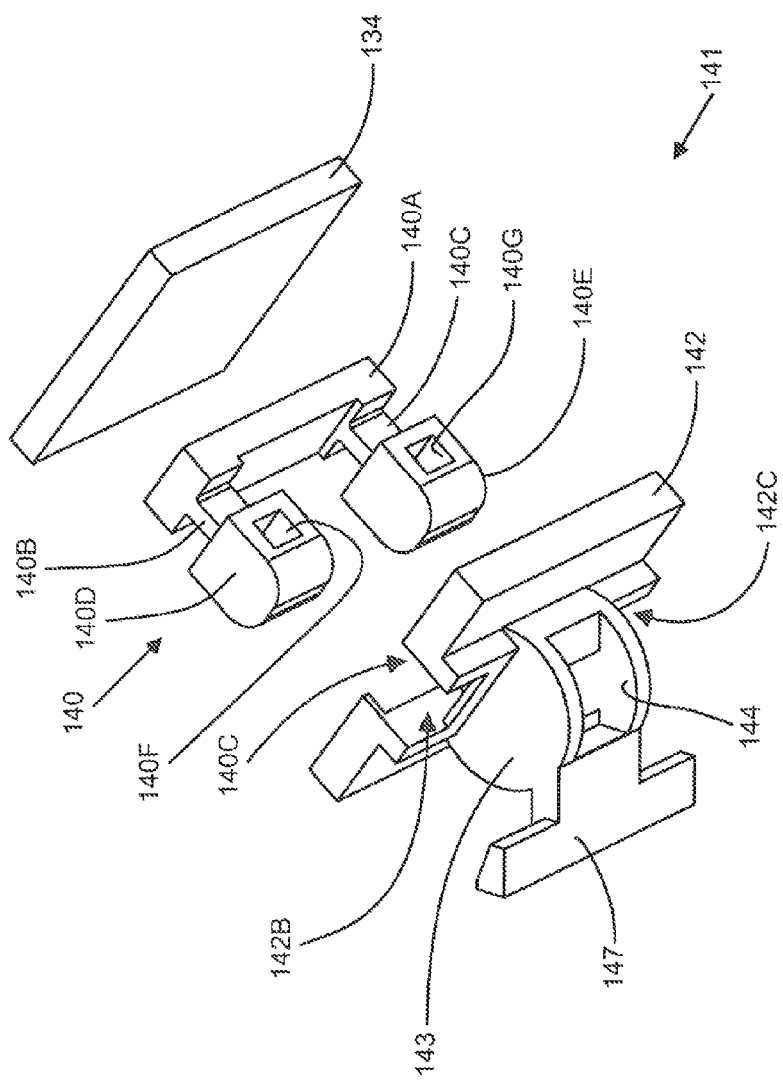

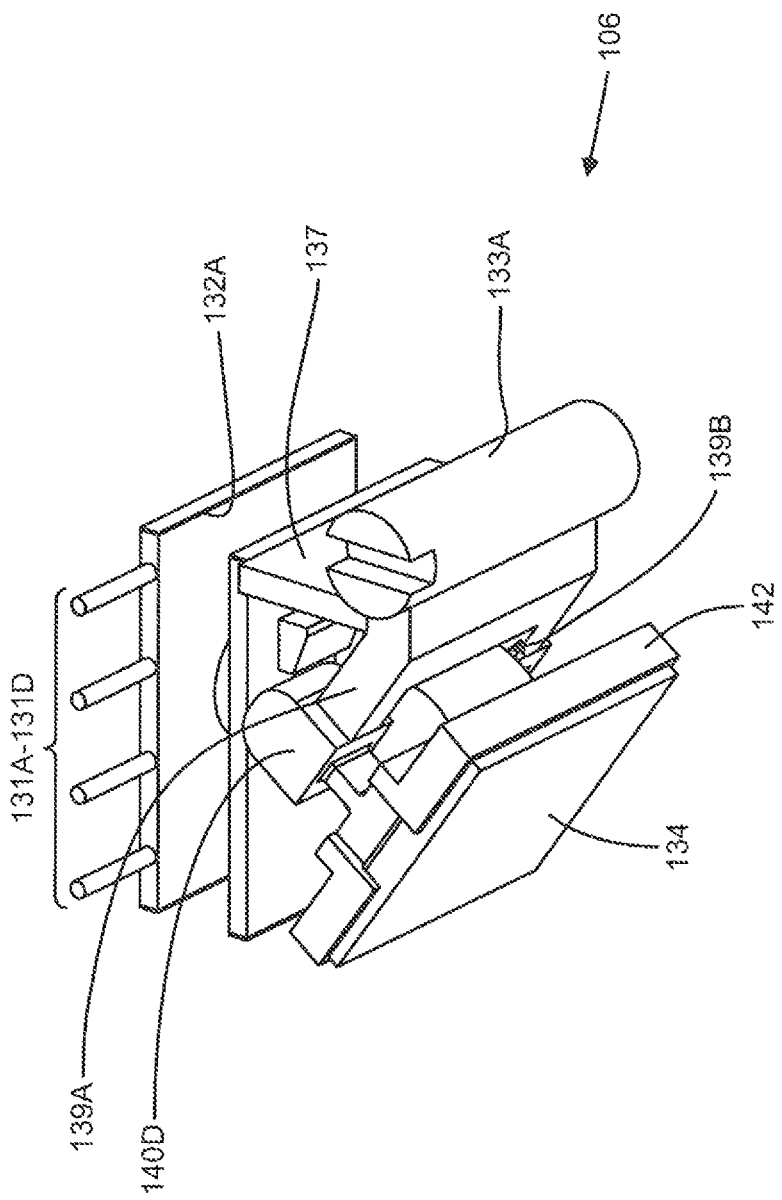

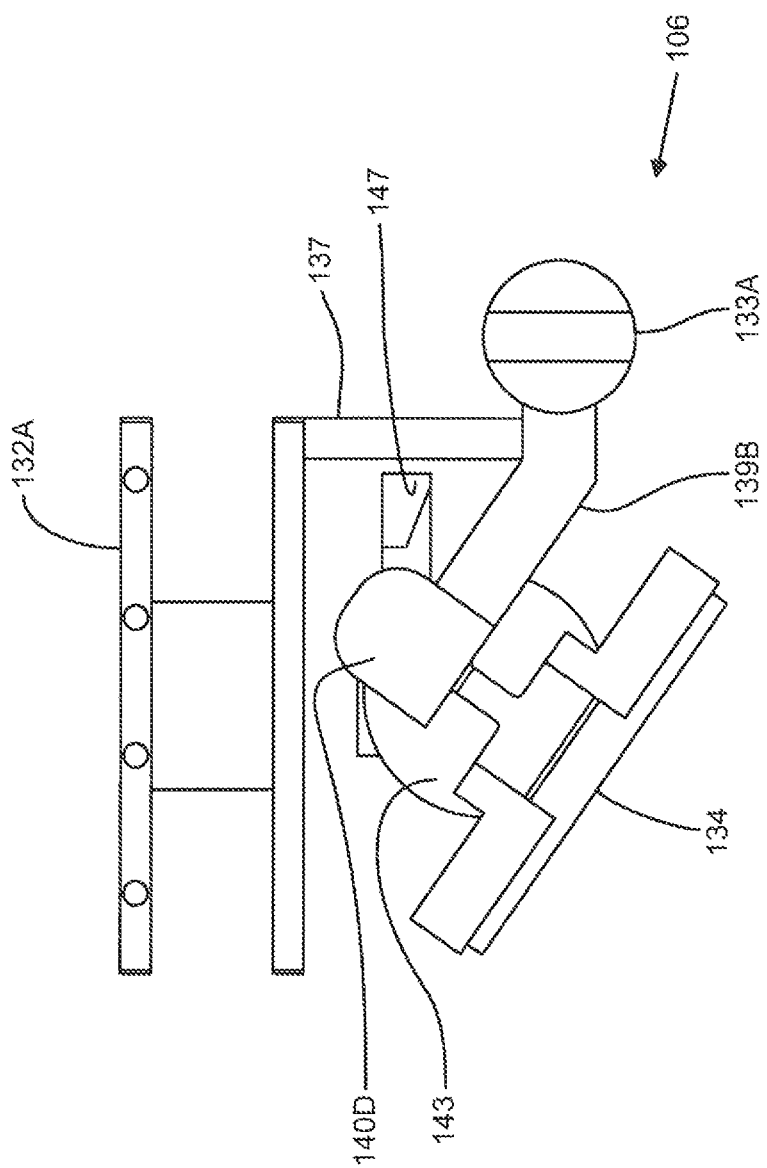

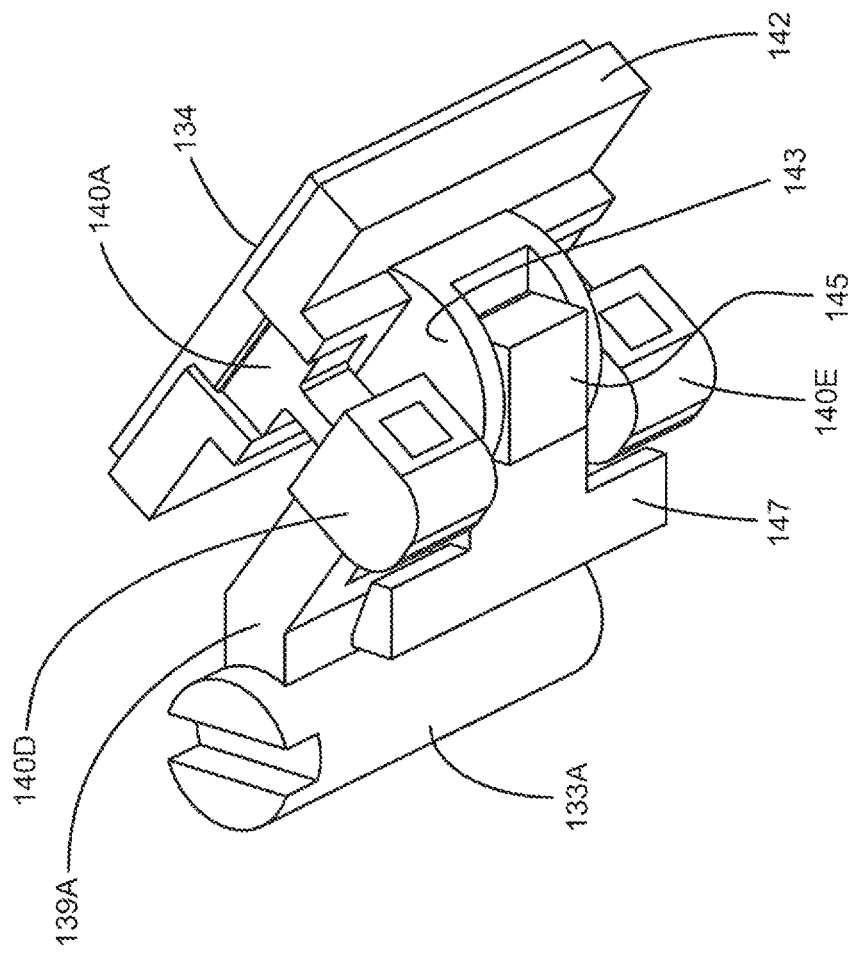

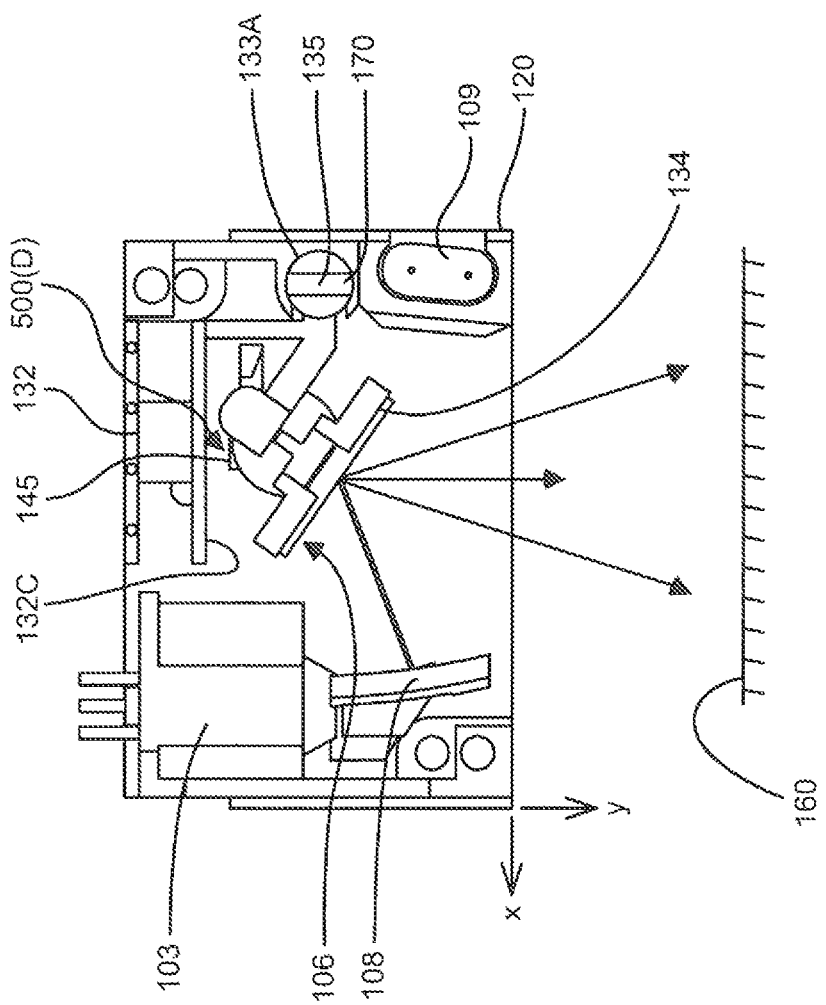

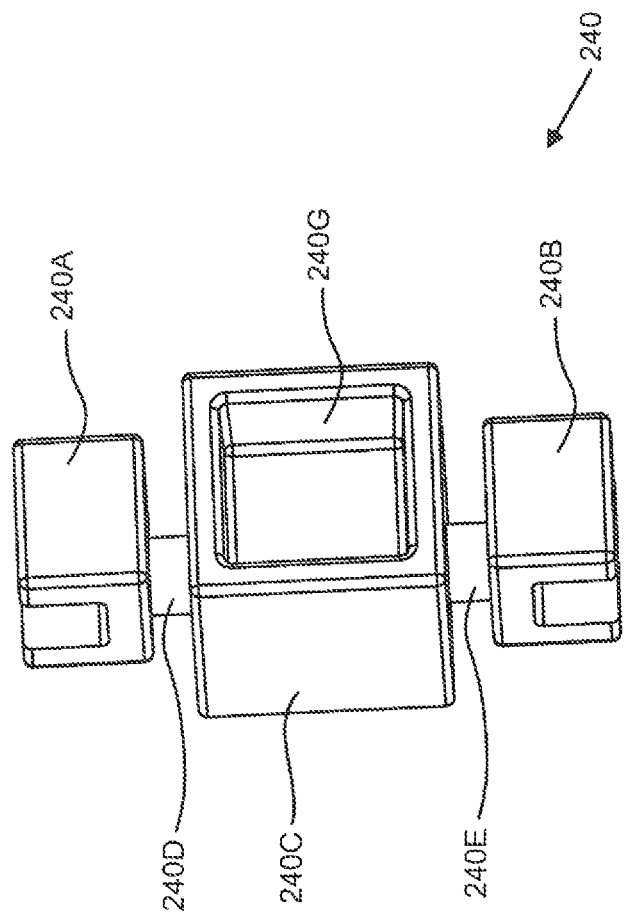

Method Of Adjusting Laser Scanning Engine

Mount a laser scanning engine within a fixture, wherein the laser scanning engine comprises: an engine housing, in which a laser scanning assembly is rotatably mounted about an axis of rotation; said laser scanning assembly has a scanning element with a light reflective surface, that is driven into motion by an electromagnetic coil having a plurality of electrical conductors terminated in a linear array of conductive pins that are capable of sliding within elongated holes formed in a PC board, bearing electronic circuits, and mountable onto the top surface of the laser scanning engine. — A During optical adjustment operations within the laser scanning engine, direct a laser source onto the light reflective element while rotating the laser scanning assembly about its axis of rotation, and causing said linear array of conductive pins to rotate about said axis of rotation. — B When the optical components within the engine housing are properly aligned with the light reflective surface on the laser scanning assembly, lock the angular position of the laser scanning assembly within the engine housing, and then mount the PC board onto the top surface of the laser scanning engine so that the rotated linear array of conductive pins project through the elongated holes formed in the PC board. — C Solder the linear array of conductive pins projecting through the elongated holes in the PC board, to electrical conductors adjacent said elongated holes. — D

FIG. 14

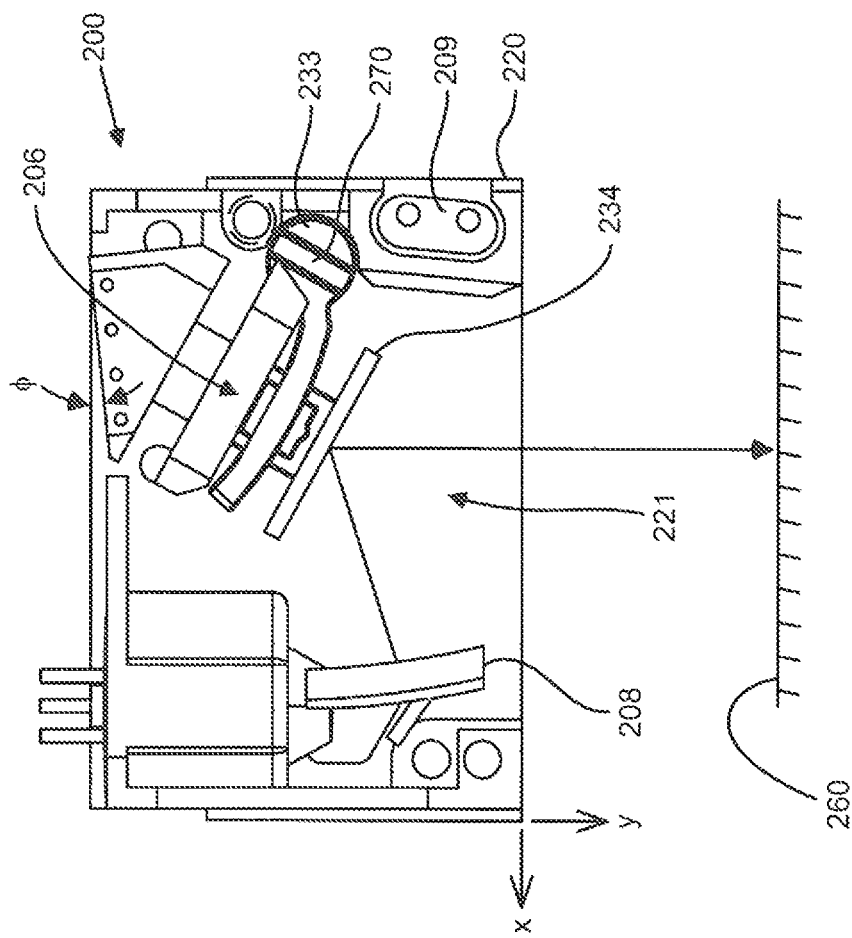

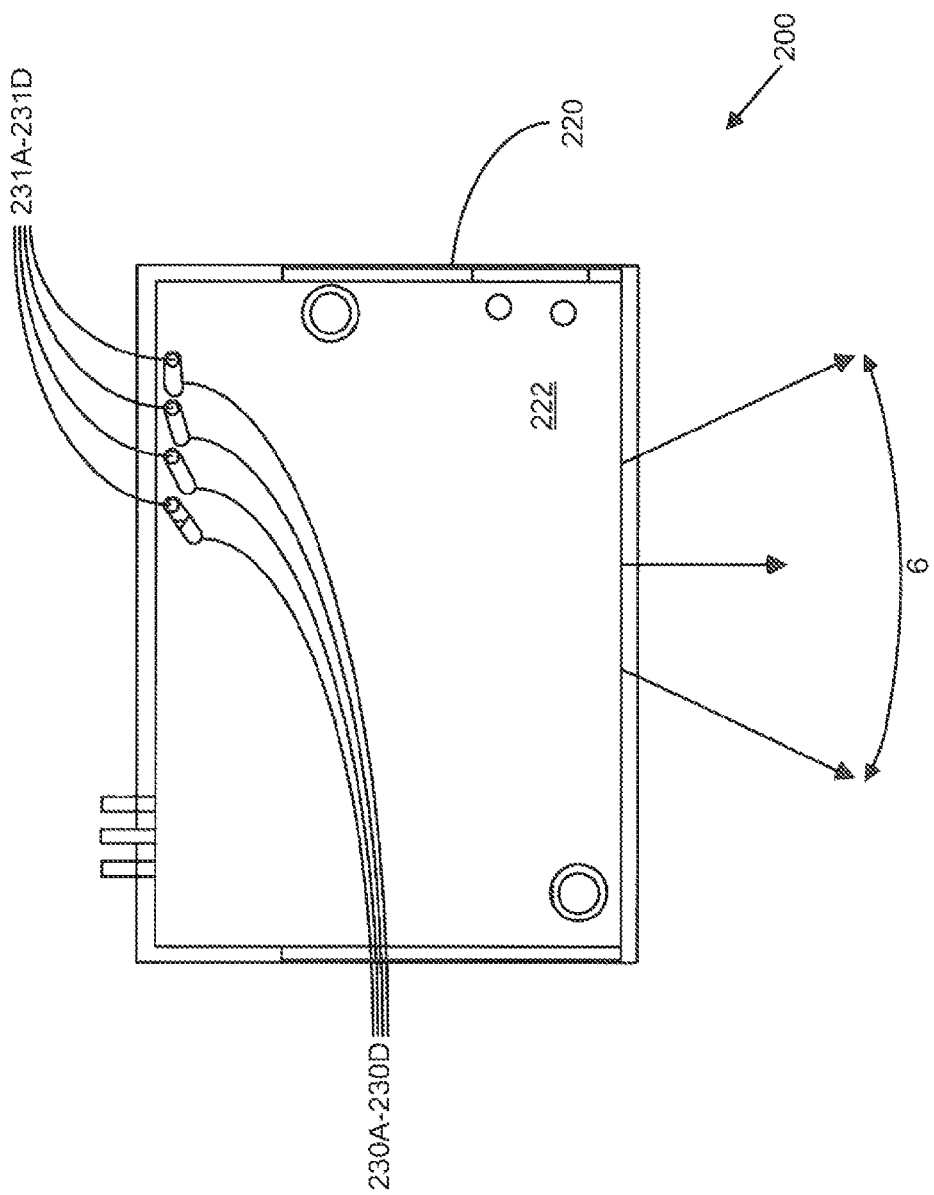

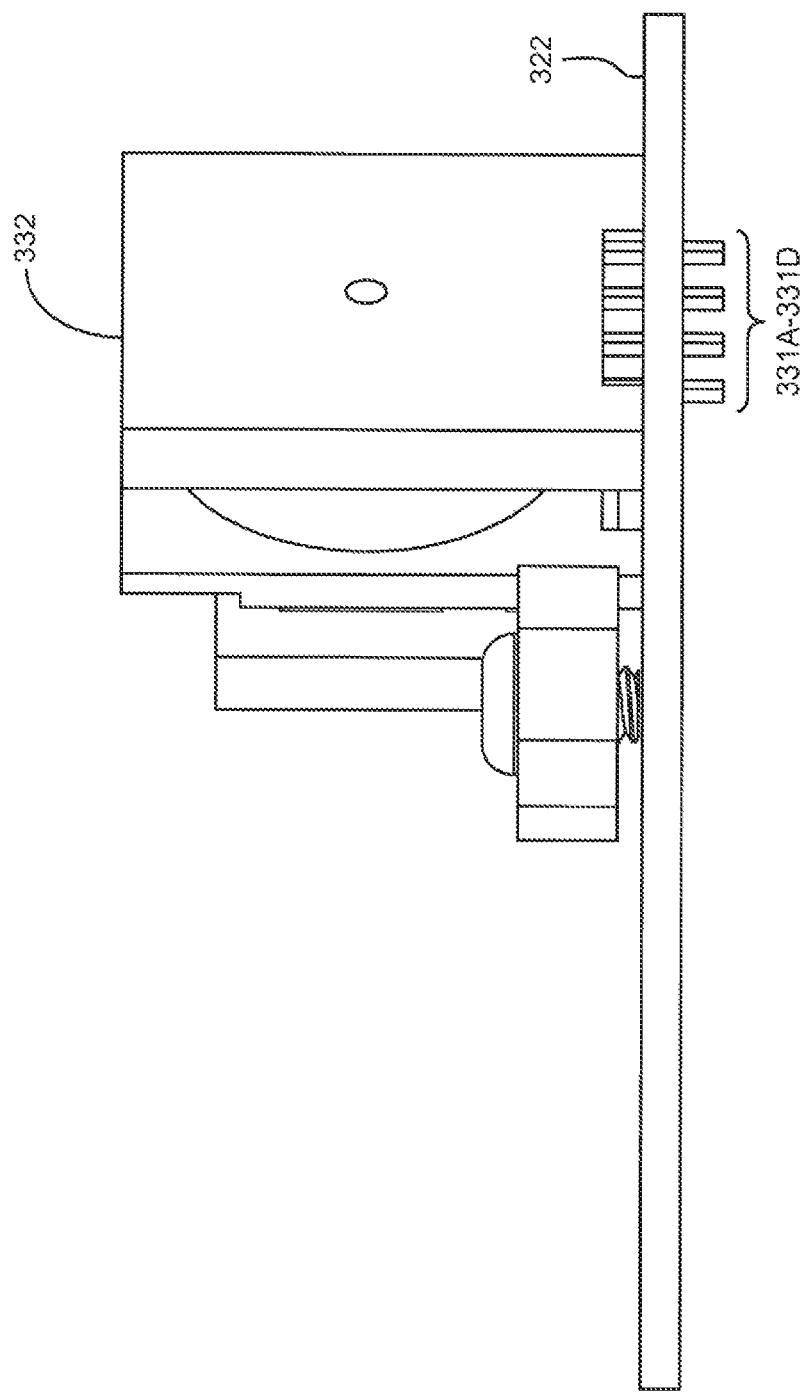

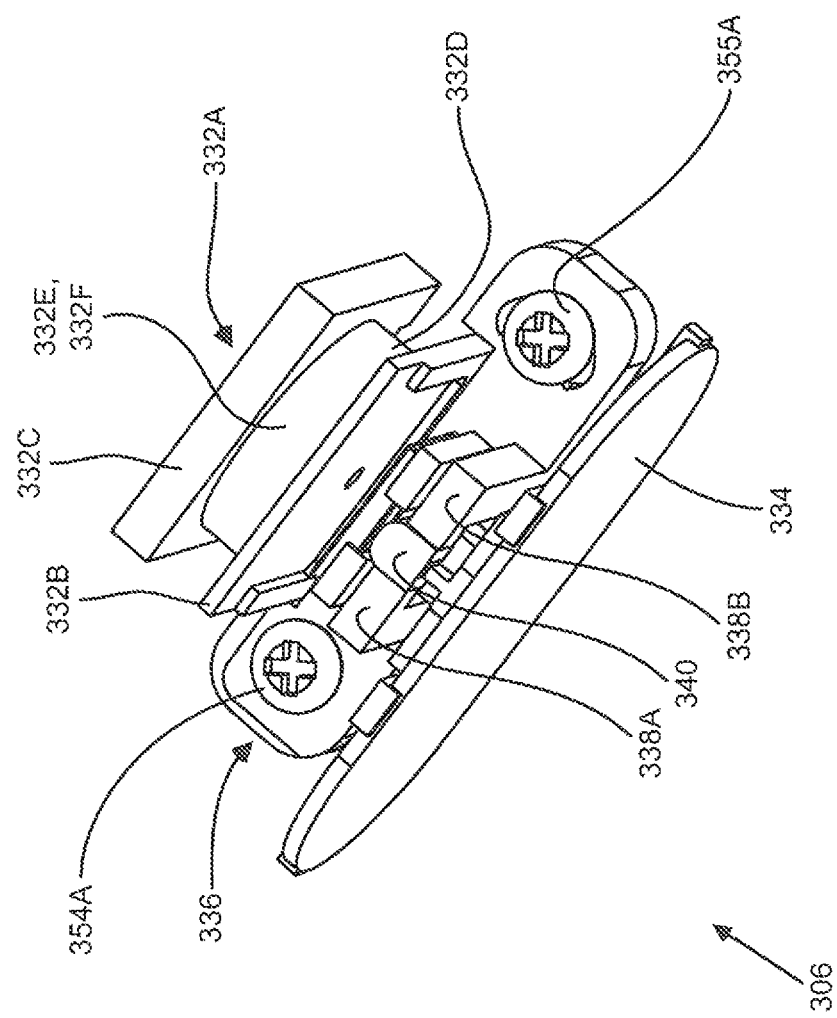

LASER SCANNING MODULE WITH ROTATABLY ADJUSTABLE LASER SCANNING ASSEMBLY

BACKGROUND OF DISCLOSURE

1. Field of Disclosure

The present disclosure relates to improvements in optical scanning devices and more particularly to a new and improved laser scanning modules with simpler methods of assembly and optical adjustment.

2. Brief Description of the State of the Art

The use of laser scanning bar code symbol reading engines is well know in the art. Applications include: hand-held products; reverse-vending machines; and the like.

A major problem encountered during the manufacture of laser scanning engines described above is adjusting the beam folding mirror and scanning mirror located within the housing of the laser scanning engine. During this adjustment process, carried out during manufacturing, the goal is to adjust the optical paths of the outgoing laser illumination beam and the return laser beam so that they are in desired locations, and performance is maximized.

One method of achieving such alignment between the beam folding and laser scanning mirrors is to provide a separate arm and mirror assembly that rotates about the bobbin structure supporting the electromagnetic coil. This arrangement, however, can effect magnetic performance because the distance between the permanent magnet on the hinge/mirror assembly and the electromagnetic coil can change in two planes.

Thus, there is great need in the art for a new and improved laser scanning engine, and method of and apparatus for aligning the optical components (i.e. the beam folding mirror and scanning mirror) within the housing so as to avoid the shortcomings and drawbacks of the prior art scanning methods and apparatus

OBJECTS AND SUMMARY

A primary object of the present disclosure is to provide a new and improved apparatus for and method of aligning the optical components within a laser scanning module, while overcoming the shortcomings and drawbacks of the prior art scanning methods and apparatus.

Another object is to provide an improved method of and apparatus for adjusting the beam folding mirror, light collection mirror, and scanning mirror within a laser scanning module so that the optical paths of the outgoing laser illumination beam and return laser beam are optically aligned.

Another object is to provide a novel method of and apparatus for adjusting the optics within a laser scanning module.

Another object is to provide such a method of and apparatus for adjusting the optics within a laser scanning module, comprising the steps of: (i) providing a laser scanning module including a housing with optics, at least on one printed circuit (PC) board with an electronic circuit, and a laser scanning assembly having a scanning subassembly and an electromagnetic coil structure (i.e. coil bobbin); (ii) mounting the laser scanning assembly within the housing a scanning assembly pivot mechanism that allows a set of electrically-conductive pins associated with the electromagnetic coil structure to project through a configuration of elongated holes formed in the PC board, at locations along the elongated holes, at which optical alignment between the beam folding, light collection and laser scanning mirrors has been attained; and (iii) once optical alignment has been attained, mechanically locking the laser scanning assembly within the housing and then soldering the electrically-conductive pins to a conductive circuit formed on the PB board, so as to further fix the laser scanning assembly in aligned position with respect to the optics within the housing.

Another object is to provide a novel laser scanning module employing (i) a laser scanning assembly mounted within a module housing a mechanism that allows the laser scanning assembly to be rotated to an angular position within the engine housing so that light collection, beam folding and light collection mirrors in the module housing are optically aligned, (ii) a PC board mounted on the top side of the housing and having a configuration of elongated holes, arranged in a non-parallel manner, and (iii) an electromagnetic coil structure associated with the laser scanning assembly and having a linear array of electrically-conductive pins that project through the configuration of elongated holes, at locations along the elongated holes that are determined by the angular rotation of the laser scanning assembly attained during optical alignment conditions.

Another object is to provide a novel laser scanning module employing (i) a laser scanning assembly mounted within a module housing a mechanism that allows the laser scanning assembly to be rotated to an angular position within the engine housing so that light collection, beam folding and light collection mirrors in the module housing are optically aligned, (ii) a PC board mounted on the bottom side of the housing having and having a configuration of elongated holes, arranged in a non-parallel manner, and (iii) an electromagnetic coil structure associated with the laser scanning assembly and having a linear array of electrically-conductive pins that project through the configuration of elongated holes, at locations along the elongated holes that are determined by the angular rotation of the laser scanning assembly attained during optical alignment conditions.

These and other objects will become apparent hereinafter and in the Claims.

BRIEF DESCRIPTION OF THE DRAWINGS

In order to more fully understand the objects, the following detailed description of the illustrative embodiments should be read in conjunction with the accompanying drawings in which:

FIG. 4B is a second perspective view of the electromagnetic coil support structure integrated with the scanning assembly pivot mechanism as shown in FIG. 4A;

FIG. 5B is a perspective view of the scanning subassembly employed in the laser scanning assembly shown in FIG. 6A, shown with its light reflective element (i.e. mirror) removed;

FIG. 5C is an exploded view of the scanning subassembly employed in the laser scanning assembly shown in FIG. 6A;

FIG. 6A is a perspective view of the laser scanning assembly employed in the scanning engine shown in FIGS. 1A, 1B and 1C, comprising the electromagnetic coil support structure shown in FIGS. 4A and 4B, the integrated scanning assembly pivot mechanism shown in FIGS. 4A and 4B, and the scanning subassembly shown in FIGS. 5A through 5C;

FIG. 6B is a plan view of the laser scanning assembly shown in FIG. 6A, comprising the electromagnetic coil support structure, the integrated scanning assembly pivot mechanism, and the scanning subassembly;

FIG. 6C is a first partially-cutaway perspective view of the laser scanning assembly in FIGS. 6A and 6B, with the electromagnetic coil support structure and a portion of the integrated scanning assembly pivot mechanism are removed (i.e. cutaway) to show the location of the permanent magnet on the rear side of the scanning subassembly;

FIG. 8A is a plan view of the laser scanning engine of FIG. 1A shown with its PC board removed, revealing the laser scanning assembly rotatably arranged at the 0 degree position, relative to the its axis of rotation, at the beginning of the optical alignment and adjustment process described in the flow chart of FIG. 7;

FIG. 13A is a first perspective view of the elastomeric scanning element torsionally-supported within the scanning element support frame shown in FIGS. 12A and 12B;

FIG. 14 is a flow chart describing the major steps performed when carrying out the method of optical adjustment in accordance with the principles of invention disclosure, using the laser scanning engine shown in FIGS. 9A, 9B and 9C;

FIG. 15B is a plan view of the laser scanning engine of FIG. 9A shown with its PC board removed, and revealing that the laser scanning assembly is rotated to the 6 degree position, about the axis of rotation, at subsequent steps in the optical alignment and adjustment process described in the flow chart of FIG. 14;

FIG. 15C is a plan view of the laser scanning engine of FIG. 9A shown with its PC board installed, and the linear array of electrically-conductive pins projecting through the elongated holes formed therein, and ready for being soldered to conductive circuits supported on the front surface of the PC board;

Figure 9:
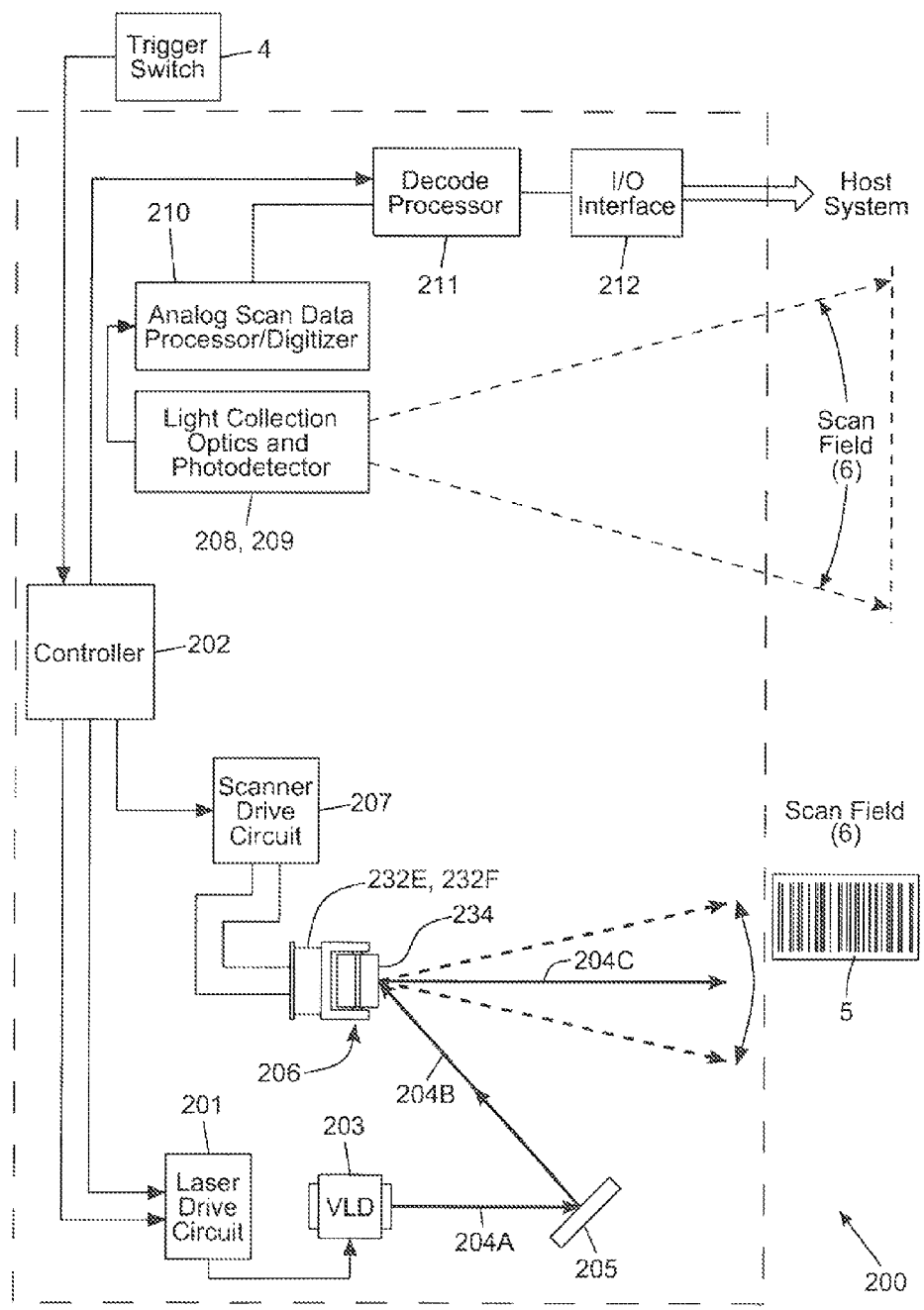
FIG. 9 is a block schematic of the laser scanning bar code symbol reading system shown in FIG. 1, employing the laser scanning engine shown in FIG. 9A.
Figure 9A:
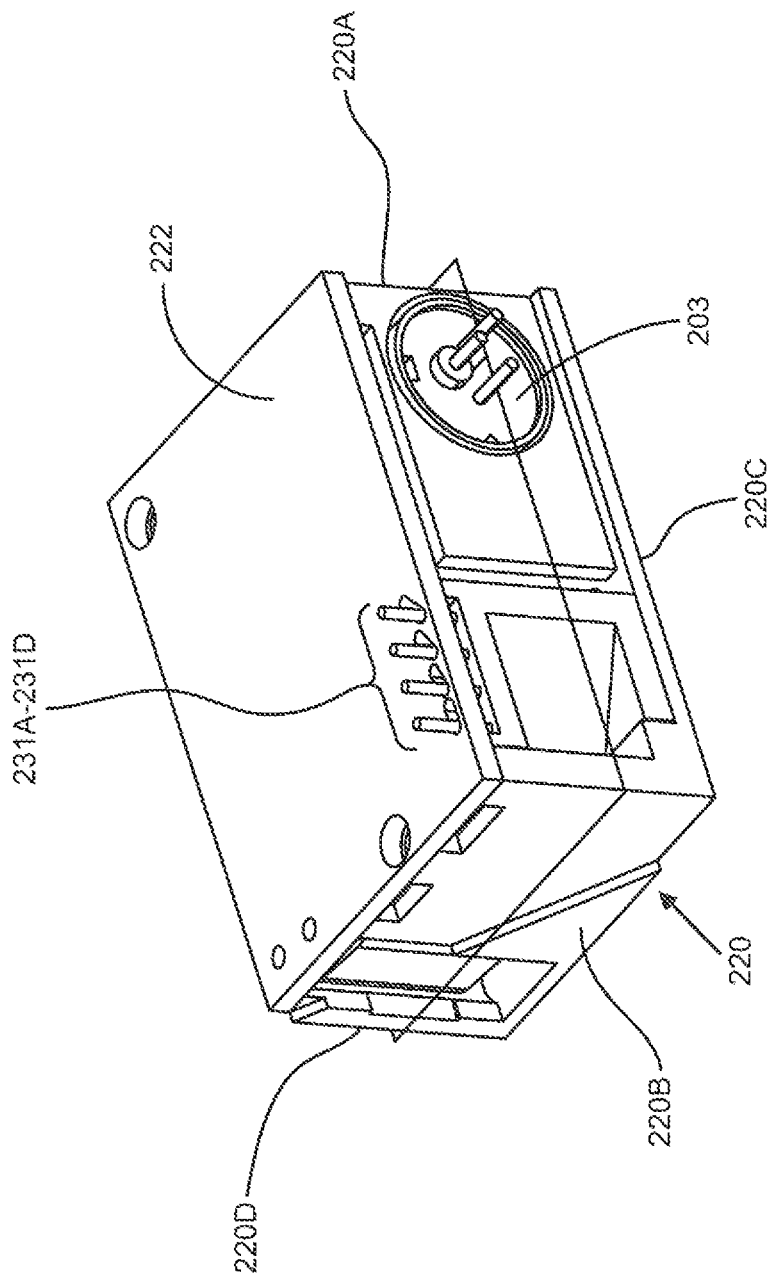
FIG. 9A is a first perspective view of a laser scanning module according to a second illustrative embodiment of the present disclosure, employing a laser scanning assembly mounted within the engine housing a mechanism that allows a linear array of electrically-conductive pins on the electromagnetic coil structure to project through and slide within a configuration of elongated holes (i.e. elongated apertures) formed in the PC board, as the laser scanning assembly is rotatably adjusted relative to the PC board and optics within the engine housing, during optical adjustment and alignment operations performed during module manufacture.
Figure 16:
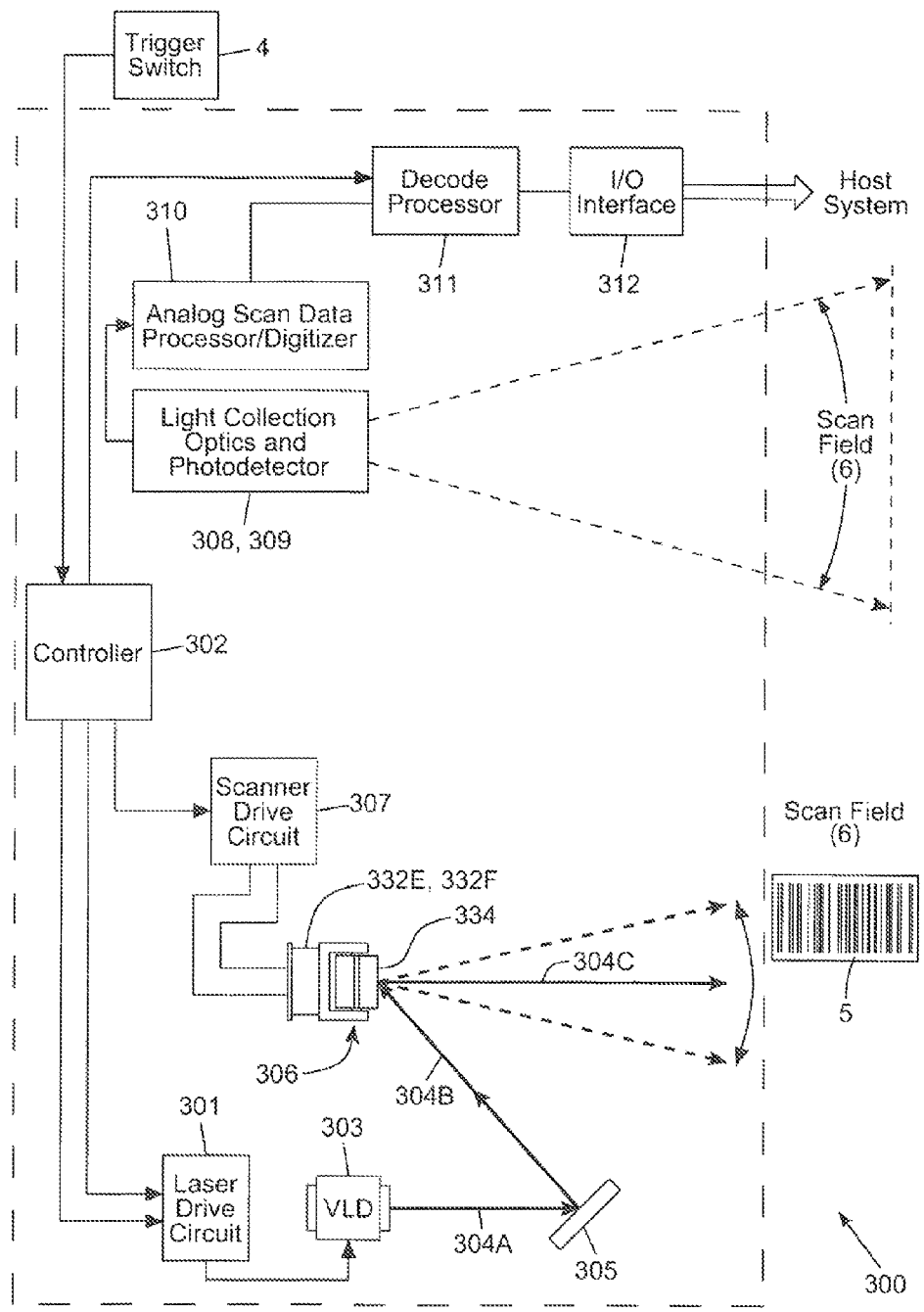
FIG. 16 is a block schematic system diagram of the laser scanning bar code symbol reading system shown in FIG. 1, employing the laser scanning engine shown in FIG. 16A.
Figure 16A:
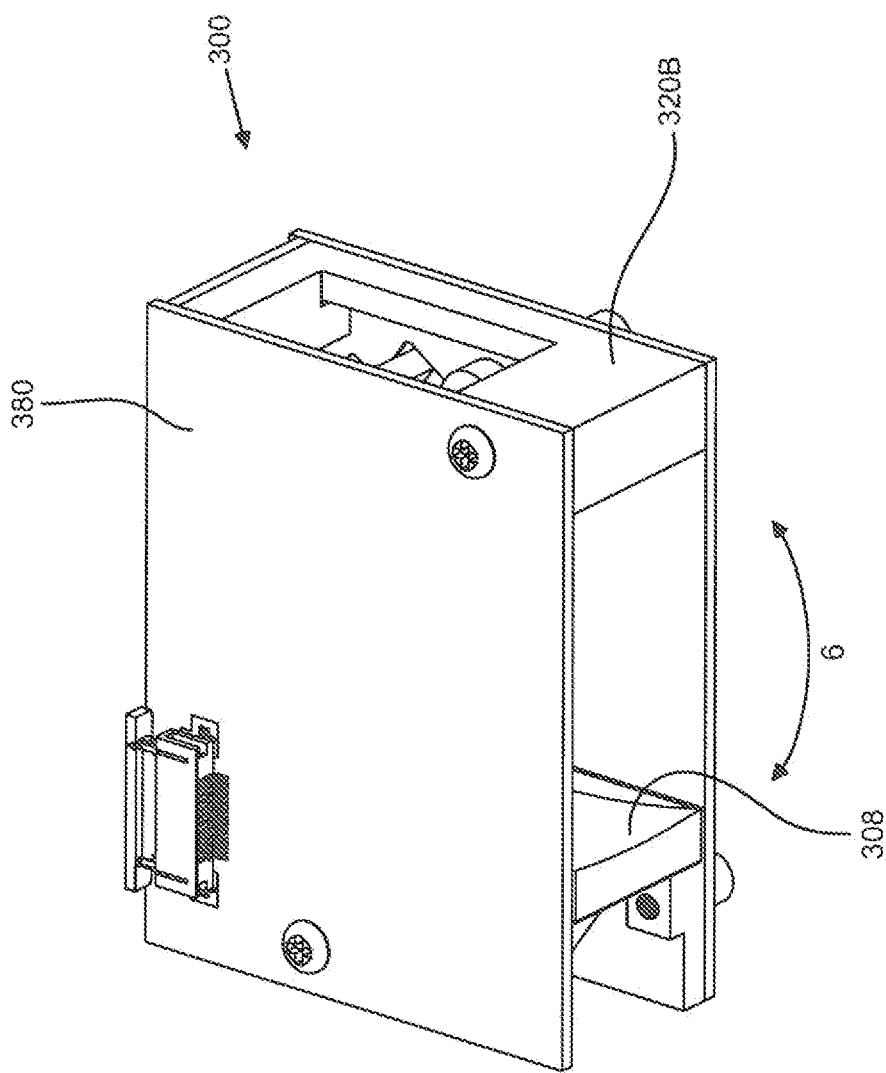
FIG. 16A is a perspective view of a laser scanning module according to a third illustrative embodiment of the present disclosure, employing a laser scanning assembly mounted within the engine housing a mechanism that allows a linear array of electrically-conductive pins on the electromagnetic coil structure to project through and slide within a configuration of elongated holes (i.e. elongated apertures) formed in the PC board in a non-parallel manner on the bottom-side of the engine housing, as the laser scanning assembly is rotatably adjusted relative to the PC board and optics within the engine housing, during optical adjustment and alignment operations performed during module manufacture.
Figure 16B:
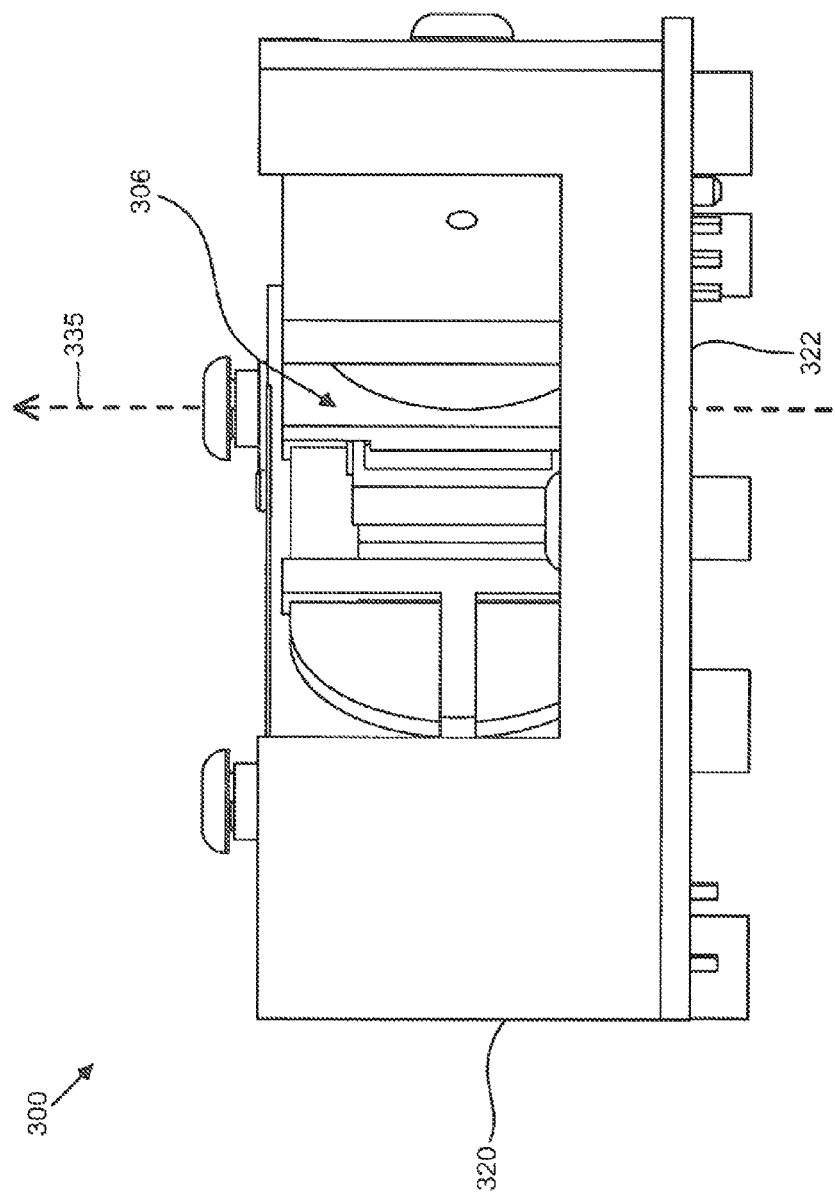
FIG. 16B is a side view of the laser scanning engine shown in FIG. 16A, revealing the laser scanning mechanism of the laser scanning engine and the scanning and light collection optics employed therein.
Figure 16C:
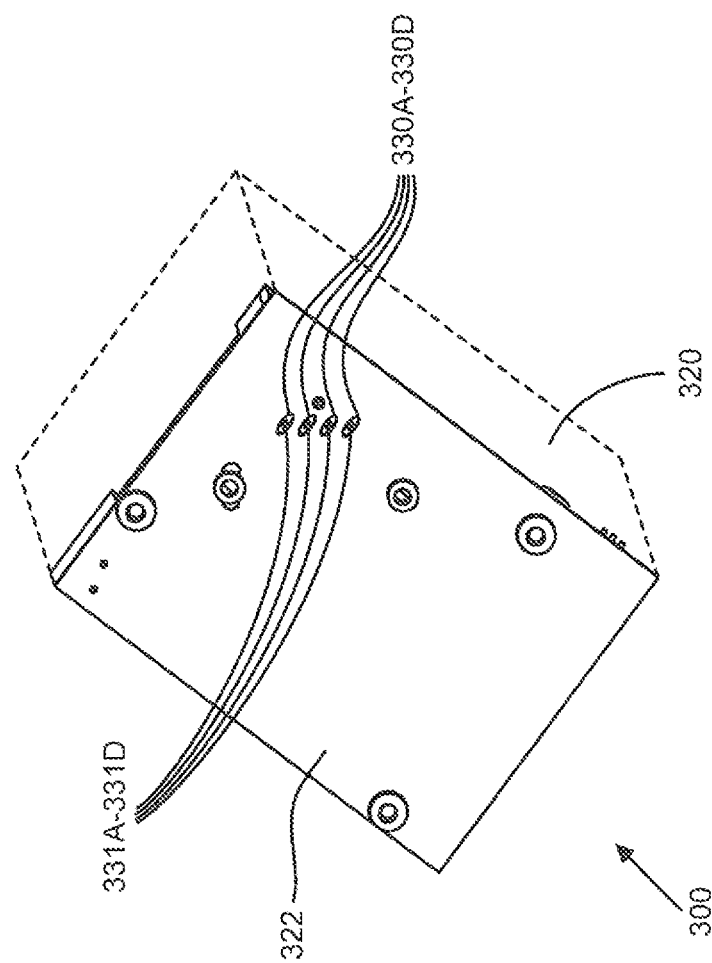
FIG. 16C is a perspective view of the laser scanning engine shown in FIGS. 16A and 16B, showing the bottom side of the engine housing being realized by the PC board supporting the laser scanning assembly and allowing the linear array of electrically-conductive pins on the electromagnetic coil structure to project through and slide within the configuration of elongated holes (i.e. elongated apertures) formed in the PC board, as the laser scanning assembly is rotatably adjusted relative to the PC board and optics within the engine housing, during optical adjustment and alignment operations performed during module manufacture.
Figure 17:
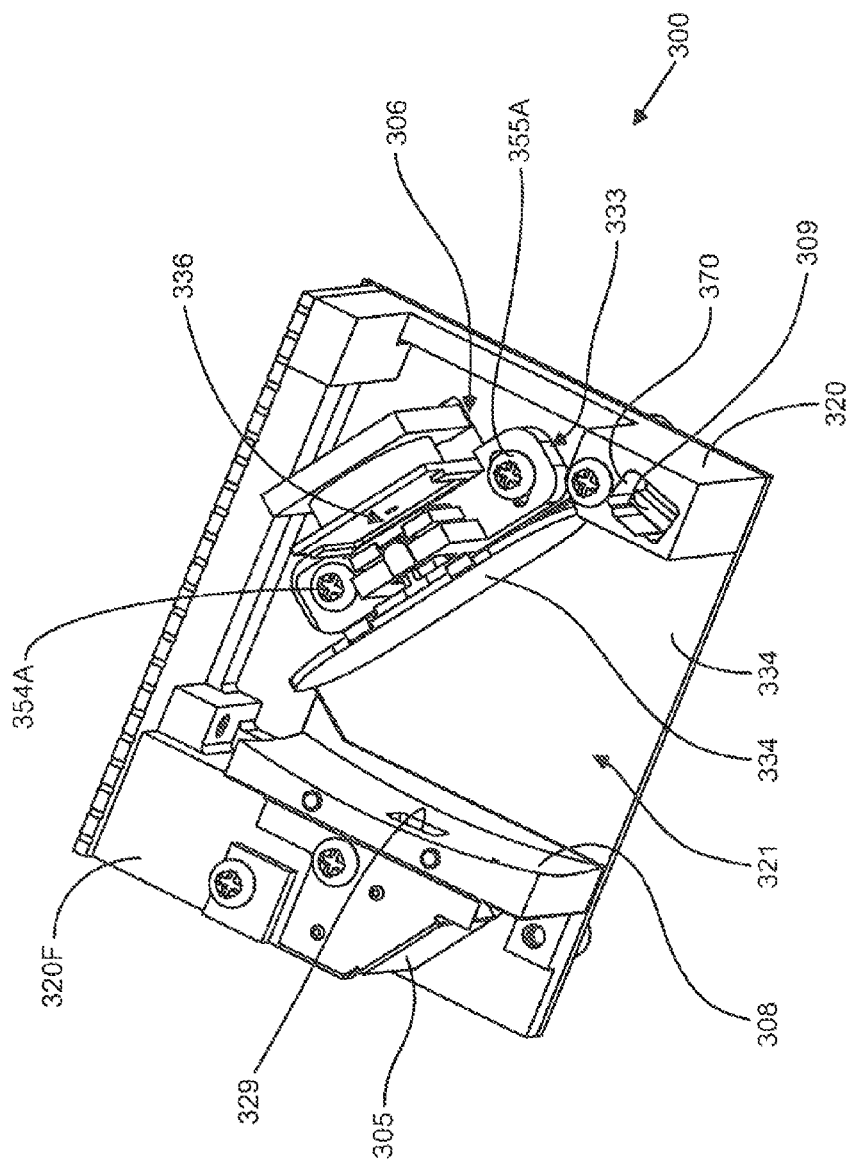
FIG. 17 is a perspective view of the laser scanning engine shown in FIGS. 16A and 16B, with its top side panel removed, revealing the laser scanning assembly mounted to the bottom surface PC board in a rotatably-adjustable manner, while the linear array of electrically-conductive pins on the electromagnetic coil structure project through and can slide within the configuration of elongated holes (i.e. elongated apertures) formed in the PC board, during manufacture.
Figure 19A:
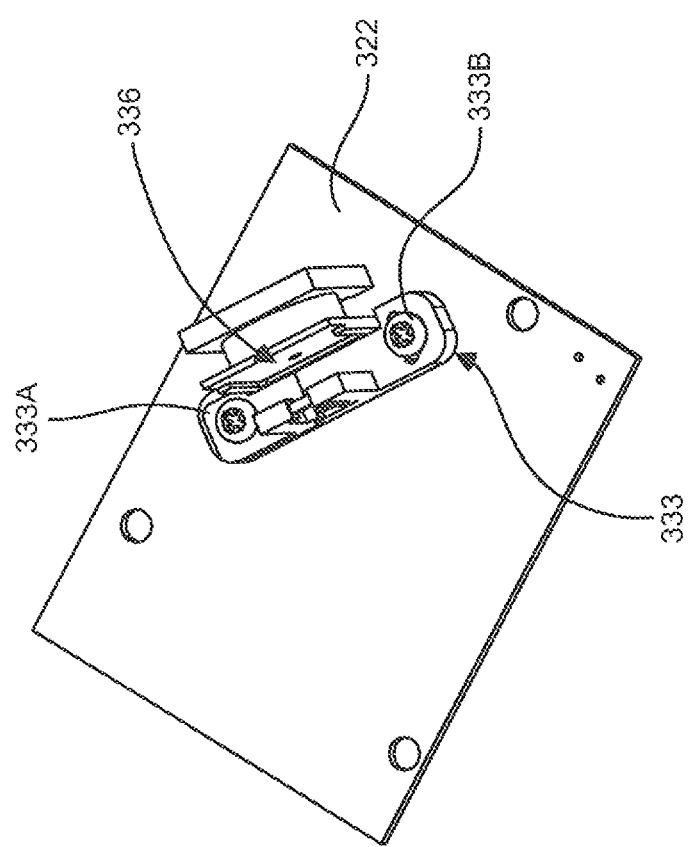
FIG. 19A is a perspective view of the electro-magnetic coil mounting structure and scanning element support assembly mounted on the PC board, employed in the laser scanning engine shown in FIG. 17.
Figure 20B:
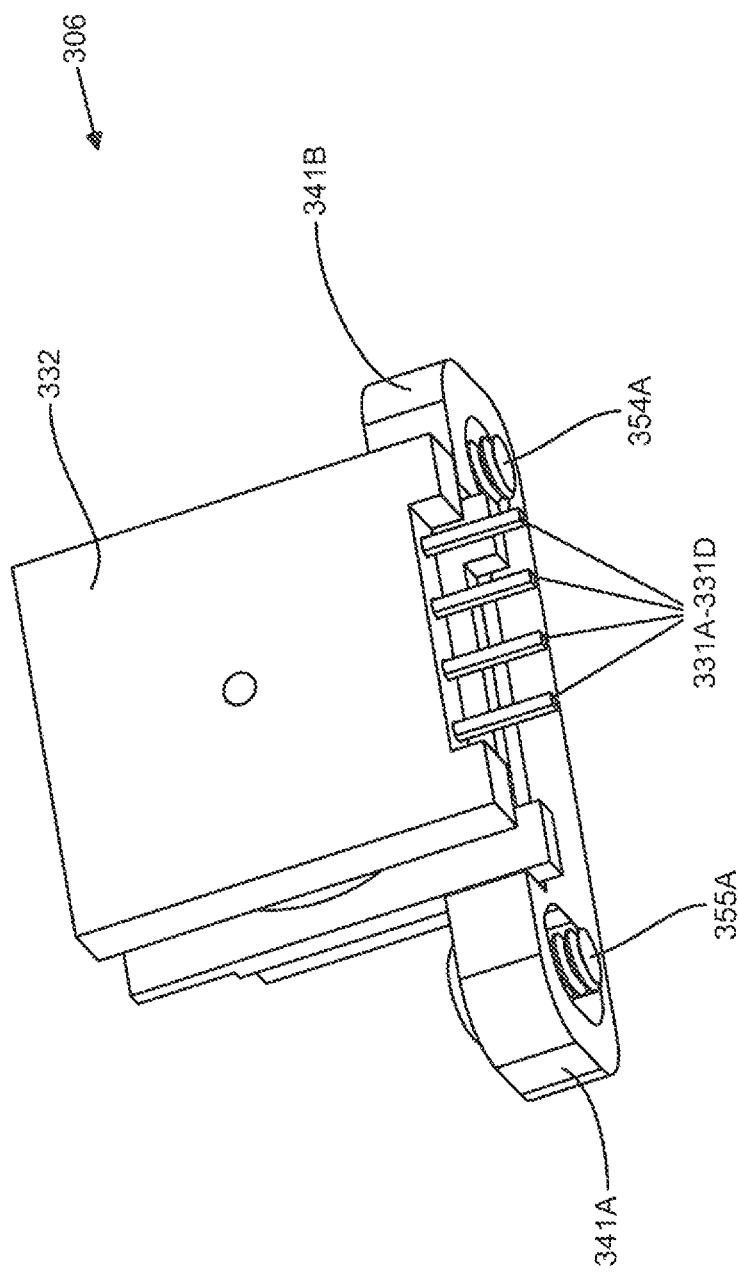
Figure 20C:
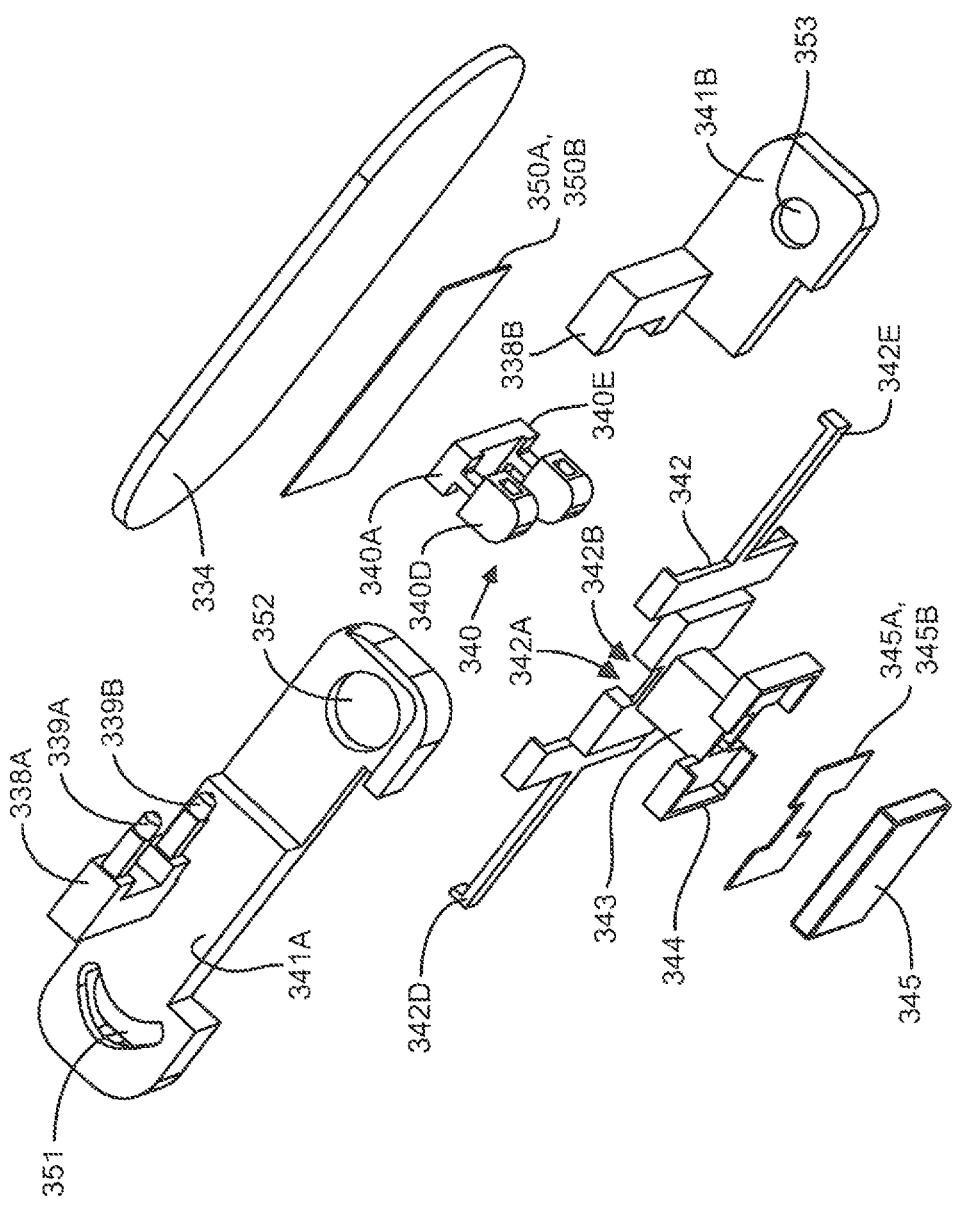
Figure 21:
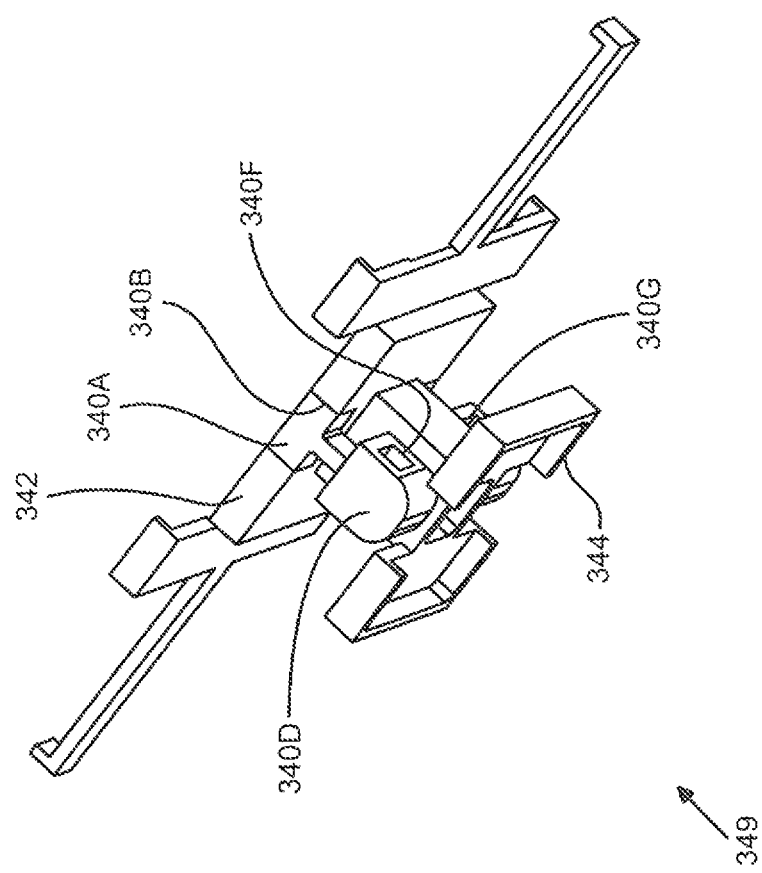
Figure 22:
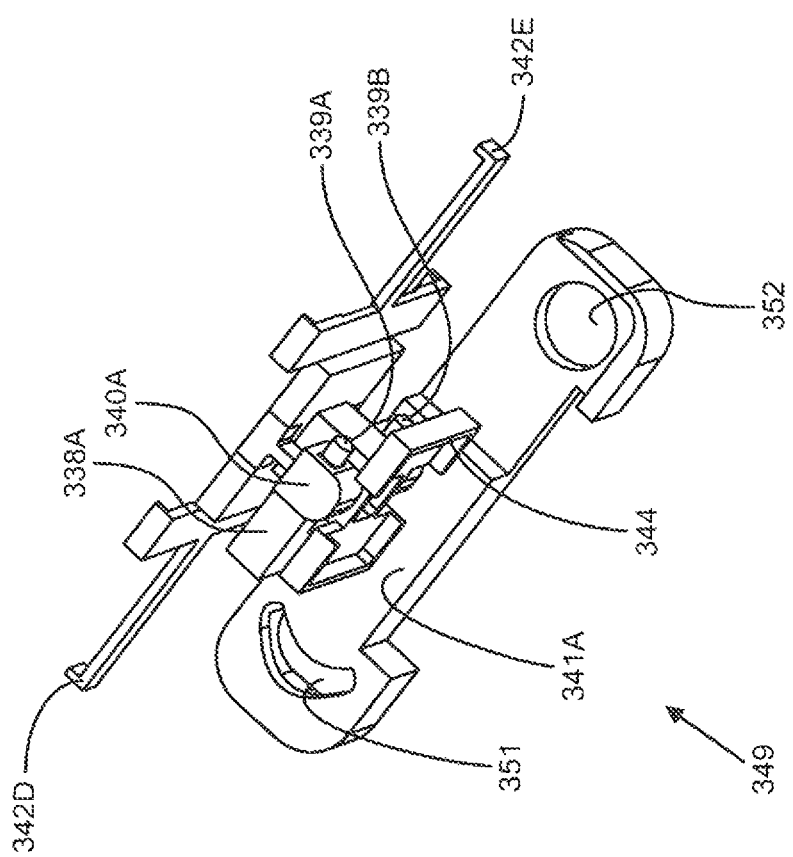
Figure 23:
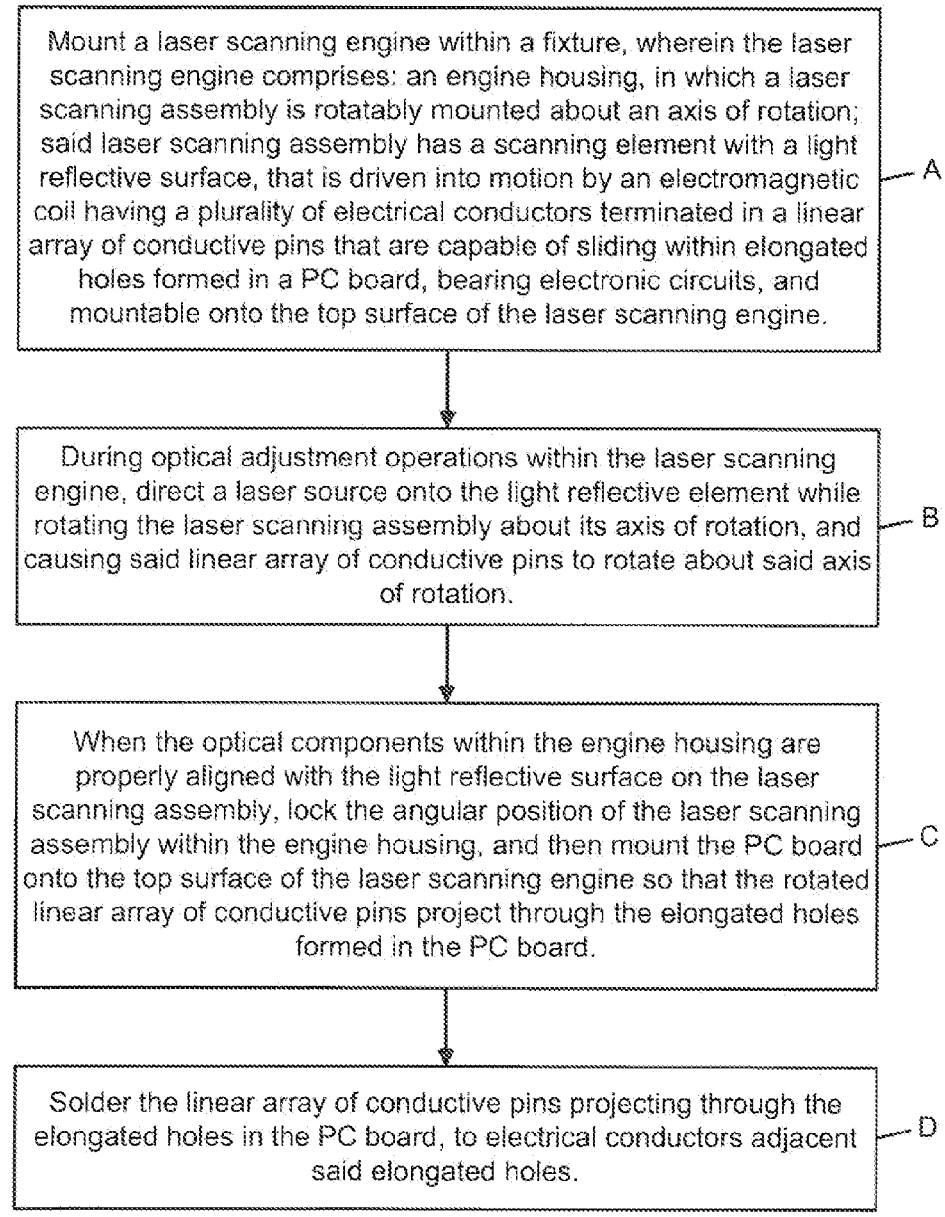
Figure 24A:
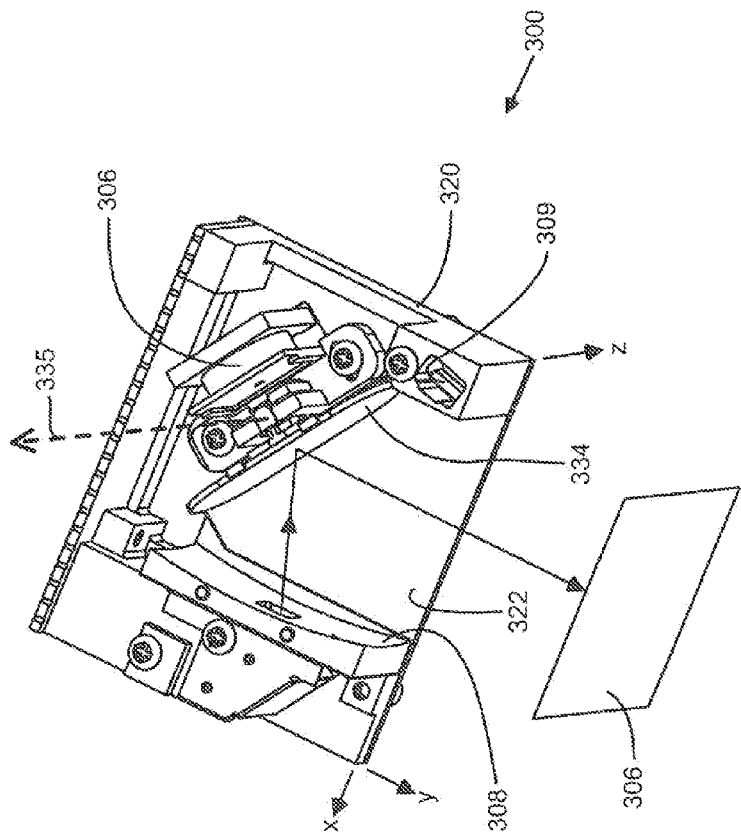
Figure 24B:
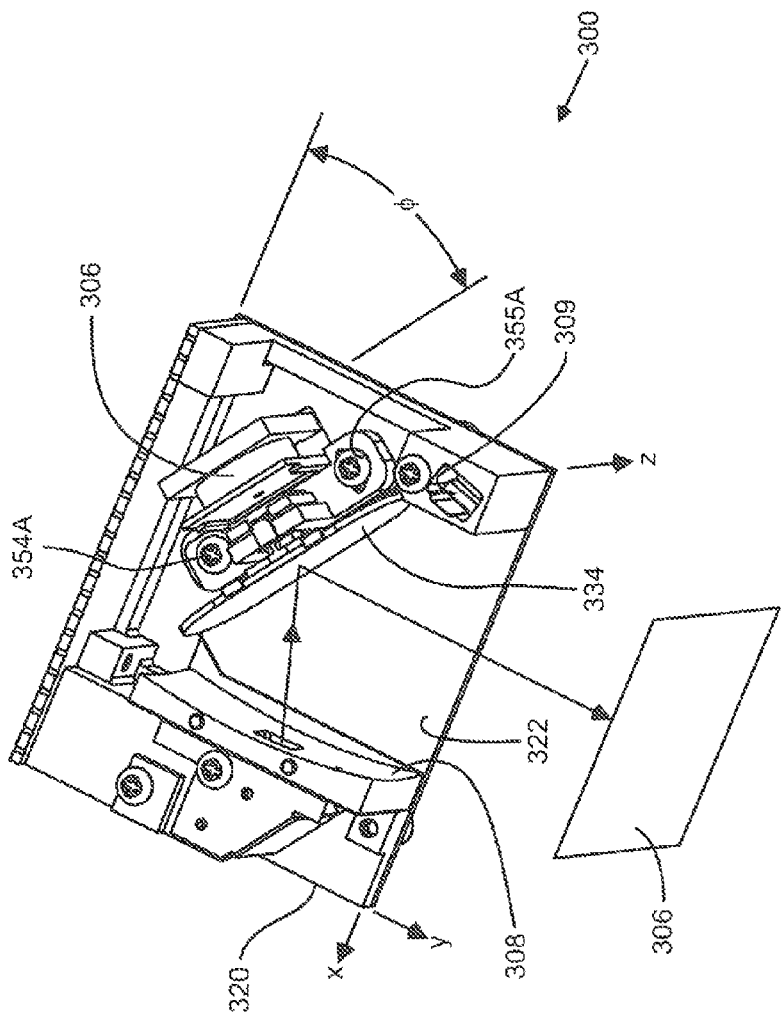
Figure 24C:
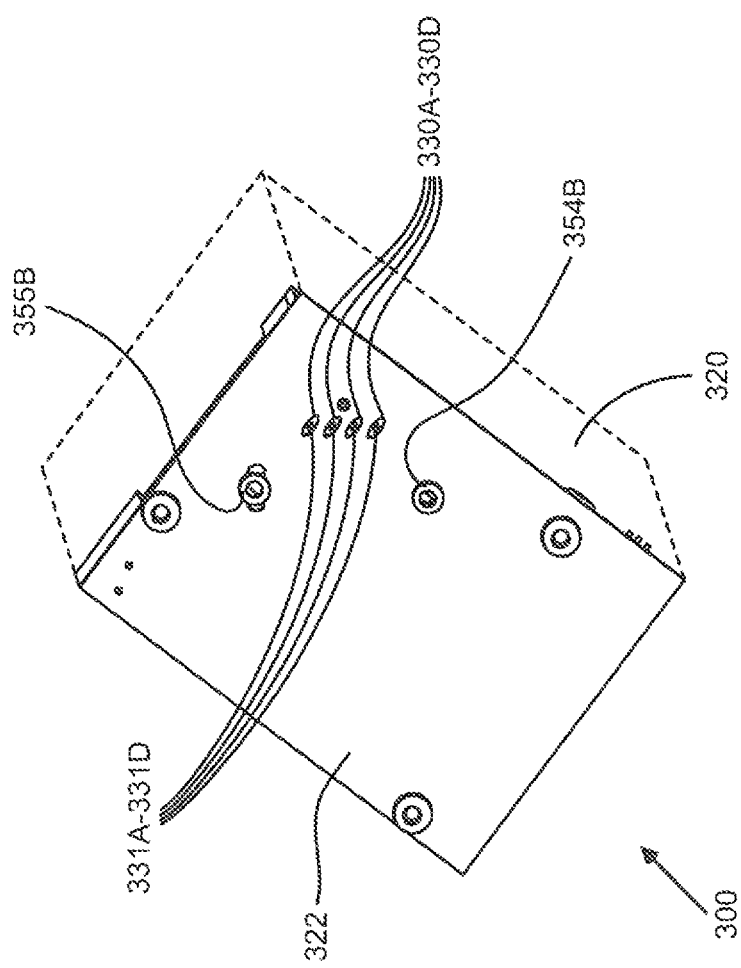

19C is a perspective view of the PC board shown in FIGS. 19A and 19B, showing the linear array of electrically-conductive pins on the electromagnetic coil structure projecting through the configuration of elongated holes (i.e. elongated apertures) formed in the PC board, ready for soldering to conductive circuits formed on the PB board;

FIG. 20A is a first perspective view of the laser scanning assembly employed in the laser scanning engine shown in FIGS. 16A through 16D, revealing the mirror supported by the torsional-type scanning element and driven by the electromagnetic coil structure integrated therewith;

FIG. 20B is a second perspective view of the laser scanning assembly employed in the laser scanning engine shown in FIGS. 16A through 16D, with its scanning subassembly removed for simplicity of exposition, and revealing the linear array of electrically-conductive pins on its electromagnetic coil structure;

FIG. 20C is an exploded view of the laser scanning assembly employed in the laser scanning engine shown in FIG. 17, but without the electromagnetic coil structure shown for clarity of illustration;

FIG. 21 is a perspective view of the scanning subassembly shown in the exploded view of FIG. 20C, comprising a mirror mounting structure coupled to a magnet mounting structure with the torsional scanning element disposed therebetween, and no mirror or permanent magnet shown for clarify of exposition;

FIG. 22 is a perspective view of the scanning subassembly of FIG. 21, shown attached to its base portion, but with its electromagnetic coil structure removed for purposes of illustration;

FIG. 23 is a flow chart describing the major steps performed when carrying out the method of optical adjustment in accordance with the principles of invention disclosure, using the laser scanning engine shown in FIGS. 16A, 16B and 16C;

FIG. 24A is a perspective view of the laser scanning engine depicted in FIGS. 16A through 16C shown with its PC board removed, and revealing that the laser scanning assembly is rotated to the 0 degree position, about its axis of rotation, at the beginning of the optical alignment and adjustment process described in the flow chart FIG. 23;

FIG. 24B is a plan view of the laser scanning engine depicted in FIG. 9A shown with its PC board removed, and revealing that the laser scanning assembly is rotated to the 6 degree position, about the axis of rotation, at subsequent steps in the optical alignment and adjustment process described in the flow chart of FIG. 23; and FIG. 24C is a perspective view of the laser scanning engine depicted in FIG. 16A shown with its PC board installed, and the linear array of electrically-conductive pins projecting through the elongated holes formed therein, and ready for being soldered to conductive circuits supported on the front surface of the PC board.

DETAILED DESCRIPTION OF THE ILLUSTRATIVE EMBODIMENTS

Referring to the figures in the accompanying drawings, the various illustrative embodiments of the present invention will be described in greater detail, wherein like elements will be indicated using like reference numerals.

Figure 1:
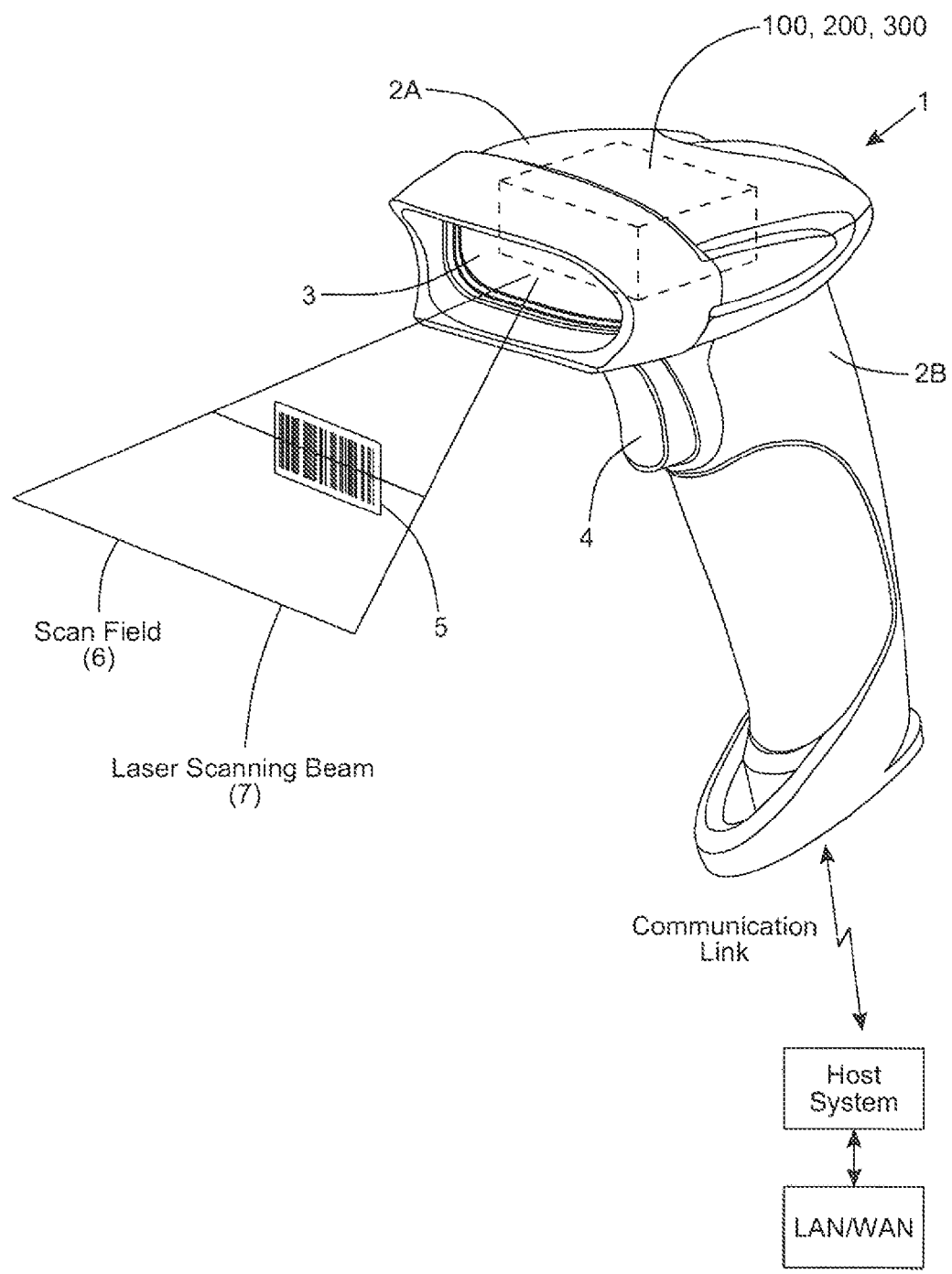
FIG. 1 is a hand-supportable laser scanning bar code symbol reading system, incorporating any one of the laser scanning modules of the illustrative embodiments of the present disclosure.

Overview on the Method of Optical Alignment According to Principles of the Present Disclosure Disclosed herein is a novel laser scanning module, and a novel method of adjusting the optics therewithin during manufacture. In the general, the laser scanning module can be used in diverse kinds of laser scanning bar code symbol reading systems 1 including, but not limited to, the laser scanning modules shown in the illustrative embodiments. For purposes of illustration, FIG. 1 shows a laser scanning module (i.e. engine) 100, 200, 300 embodied in hand-supportable laser scanning system 1. However, it is understood that such laser scanning modules 100, 200 and 300 can be installed in other types of laser scanning systems, including hand-supportable, POS-projection and industrial type laser scanning systems.

As shown in FIG. 1, the laser scanning bar code symbol reading system 100 comprises: a hand-supportable housing 2 having a head portion 2A and a handle portion 2B supporting the head portion 2A; a light transmission window 3 integrated with the head portion of the housing 2; a trigger switch 4 integrated with the housing for generating a trigger event signal; a laser scanning module 100, 200 or 300, described in detail hereinafter, for repeatedly scanning, across a bar code symbol 5 in a laser scanning field 6, a visible laser beam 7 generated from the laser scanning module, and collecting laser light reflected and/or scattered from the bar code symbol, and detecting the intensity of this received optical signal and generating an analog scan data signal and processing it to read the scanned bar code symbol.

In general, the method involves the steps of: (i) providing the laser scanning module 100, 200 or 300 including its housing with optics, with a printed circuit (PC) board having at least one electronic circuit and a configuration of elongated apertures of either open and/or closed geometry, formed in the at least one electronic circuit board in a non-parallel manner, and a laser scanning assembly having a scanning subassembly and an electromagnetic coil structure (i.e. coil bobbin) with a set of electrically-conductive pins; (b) mounting the laser scanning assembly within the housing a rotatable mounting mechanism; (c) rotating the laser scanning assembly to an angular position about its axis of rotation until optical alignment conditions have been attained between the light collection and beam forming optics in the housing and the scanning mirror on the laser scanning assembly; (c) once optical alignment conditions have been attained therebetween, mechanically locking the laser scanning assembly within the housing at the angular position at which optical alignment has been attained; and (d) allowing the electrically-conductive pins associated with the electromagnetic coil structure to project through the elongated apertures at locations determined by the angular position of the mechanically-locked laser scanning assembly, and soldering the electrically-conductive pins to electrical conductors associated the electronic circuits formed on the PC board.

As used hereinafter and in the claims, the term "aperture" shall include any opening, formed in a substrate or structure (including but not limited to PC boards and support plates), and having either (i) an open-ended geometry such as a slot and or a notch, or (ii) a closed-geometry such as a hole. Also, the term "apertures" shall mean more than one "aperture", and the term "elongated apertures" shall mean more than one aperture, each of which has an elongated dimension, along which a conductive element (e.g. pin from an electromagnetic coil) can move during alignment operations. The geometrical characteristics of any elongated aperture having a close-ended geometry can vary in numerous ways, provided that the pins are permitted to move or slide along the elongated aperture during alignment operations. Likewise, the geometrical characteristics of any elongated aperture having an open-ended geometry can vary in numerous ways, provided that the pins are permits to move or slide along the elongated aperture during alignment operations.

In some embodiments, each elongated aperture in a plurality of elongated apertures will have either an open-ended geometry, or a closed geometry. In other embodiments, some of the elongated apertures may each have an open-ended geometry, whereas the other elongated apertures will each have a closed geometry.

As will be described in detail below, the rotatable mounting mechanism can be realized in different ways to accommodate the design of the laser scanning mechanism, and other laser scanning module design requirements. Preferably, the rotatable mounting mechanism will be designed so that it can be rotated using a screwdriver or like hand tool, that is passed through an opening formed in the module housing and/or PC board. Also, mechanical locking of the laser scanning assembly relative to the housing can be achieved by applying a few drops of Lock-Tite® or equivalent cement, and/or using fastening screws that can be turned easily with a screwdriver or other tool.

By virtue of the present invention, it is now possible to design a laser scanning engine having a simpler engine housing, and which isolates (i) the electromagnetic circuit associated with the laser scanning element, from (ii) the optical subsystem within the engine housing so that optical alignment can be achieved without altering the electromagnetic circuit once it has been constructed and assembled as part of the laser scanning assembly.

Having described the method of the present invention, it is appropriate at this juncture to describe the illustrative embodiments of the laser scanning modules.

Figure 1A:
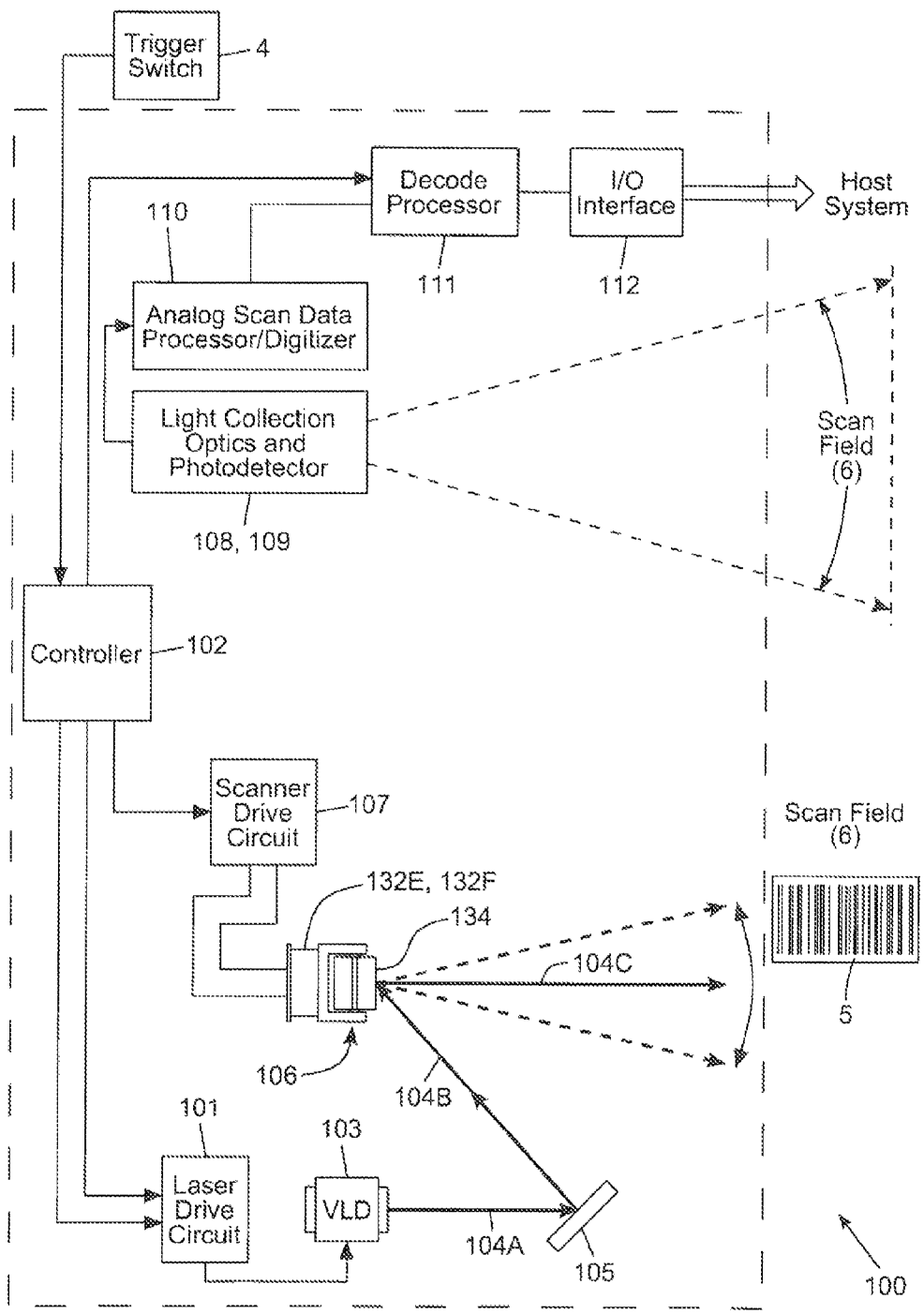
FIG. 1A is a block schematic system diagram of the laser scanning bar code symbol reading system shown in FIG. 1, employing the laser scanning engine shown in FIG. 2A.
Figure 2A:
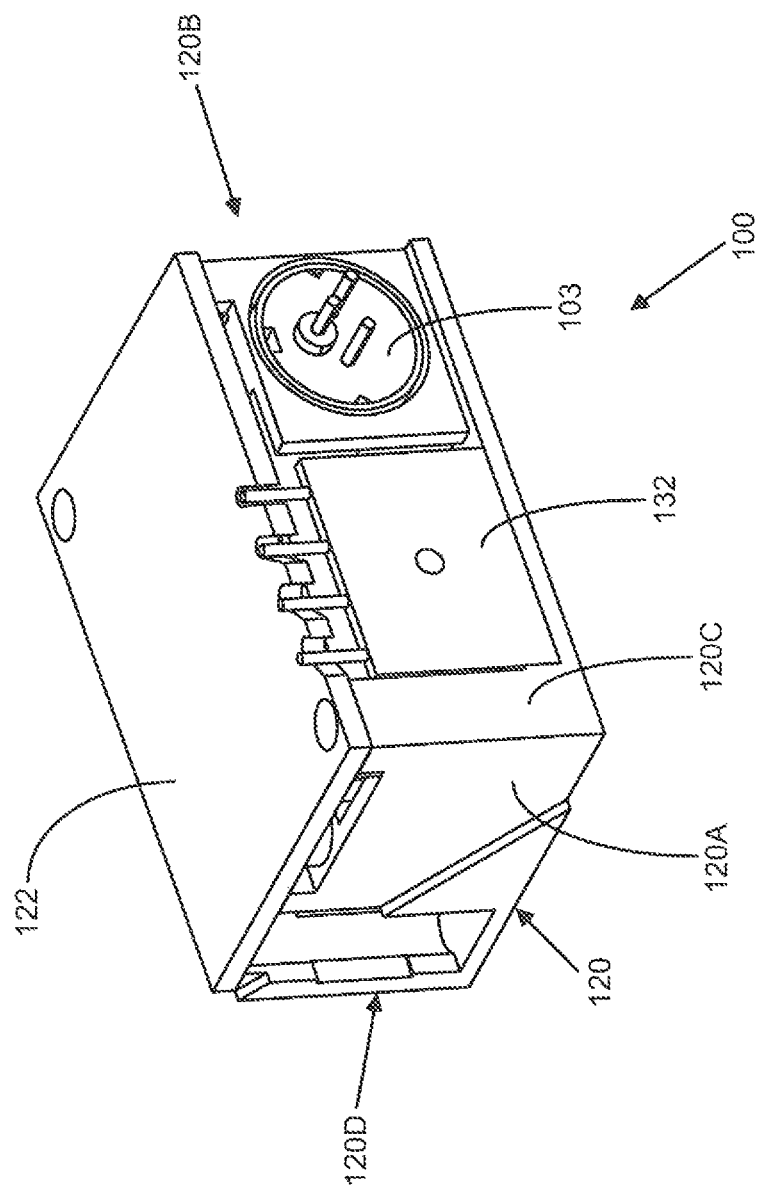
FIG. 2A is a first perspective view of a laser scanning module according to a first illustrative embodiment of the present disclosure, employing a laser scanning assembly mounted within the engine housing a mechanism that allows a linear array of electrically-conductive pins on the electromagnetic coil structure to project through and slide within a configuration of elongated slots (i.e. elongated apertures having open-ended geometry) formed in the PC board in a non-parallel manner, as the laser scanning assembly is rotatably adjusted relative to the PC board and optics within the engine housing, during optical adjustment and alignment operations performed during module manufacture.
Figure 2C:
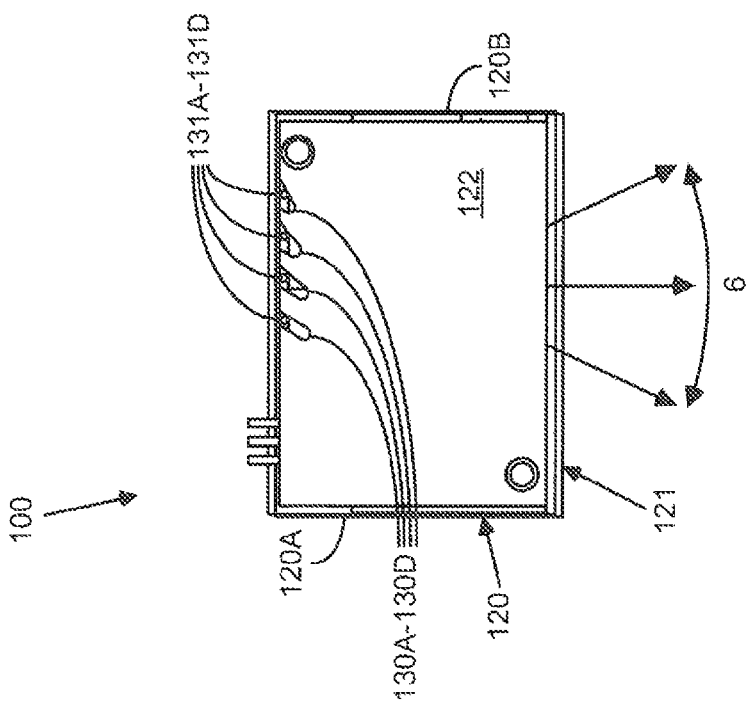
FIG. 2C is a plan view of the laser scanning engine shown in FIGS. 2A and 2B, showing the linear array of electrically-conductive pins projecting through the plurality of elongated holes formed in the PC board mounted over the top open side of the engine housing, and slid along the configuration of elongated slots during adjustment and alignment of the laser scanning assembly within the engine housing, during manufacture, as specified in FIGS. 7 through 8C.
Figure 2B:
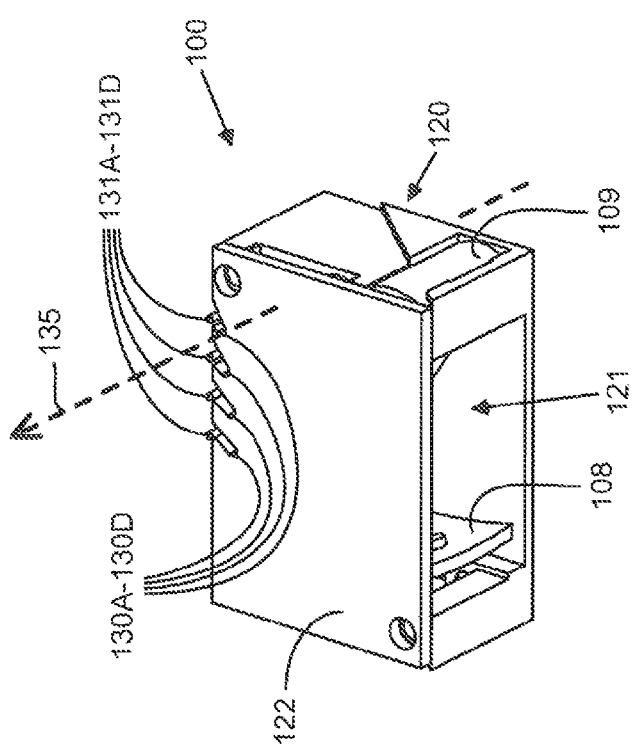
FIG. 2B is a second perspective view of the laser scanning module shown in FIG. 2A, revealing a plurality of elongated holes (i) formed in the PC board mounted over the top open side of the engine housing, and (ii) through which the linear array of electrically-conductive pins project and can slide back and forth along the elongated slots during adjustment and alignment of the laser scanning assembly within the engine housing, during manufacture.
Figure 2E:
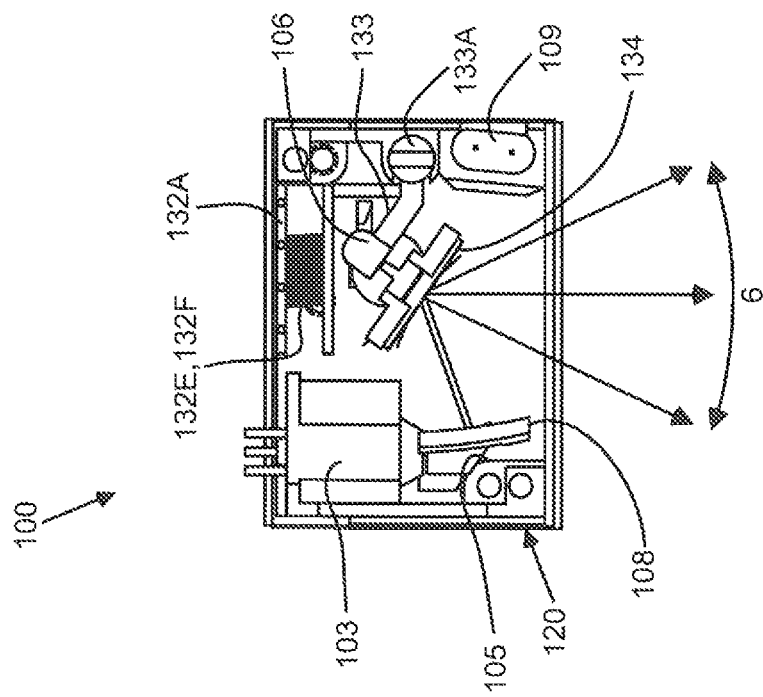
FIG. 2E is a plan view of the laser scanning engine shown in FIG. 2A, revealing the laser scanning assembly rotatably mounted within the engine housing, about its axis of rotation, using its scanning assembly pivot mechanism, and supporting a light reflective surface (e.g. mirror element) on an elastomeric hinge element supported by arms of the scanning assembly pivot mechanism.
Figure 2D:
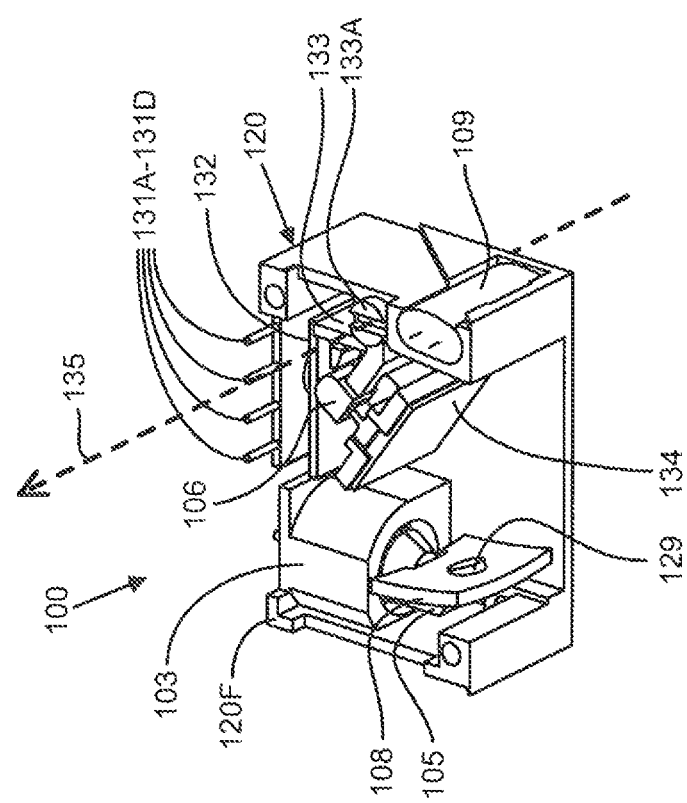
FIG. 2D is a perspective view of the laser scanning engine shown in FIGS. 2A through 2C, with the PC board removed from the top side thereof, and revealing the linear array of electrically-conductive pins projecting from the electromagnetic coil support structure, integrated with a scanning assembly pivot mechanism that is rotatable about an axis of rotation and supported within a cylindrical recess formed in the wall portion of the engine housing, and allowing the laser scanning assembly to be rotated about the axis of rotation during laser scanning assembly adjustment and alignment operations, specified in FIGS. 7 through 8C.
Figure 3:
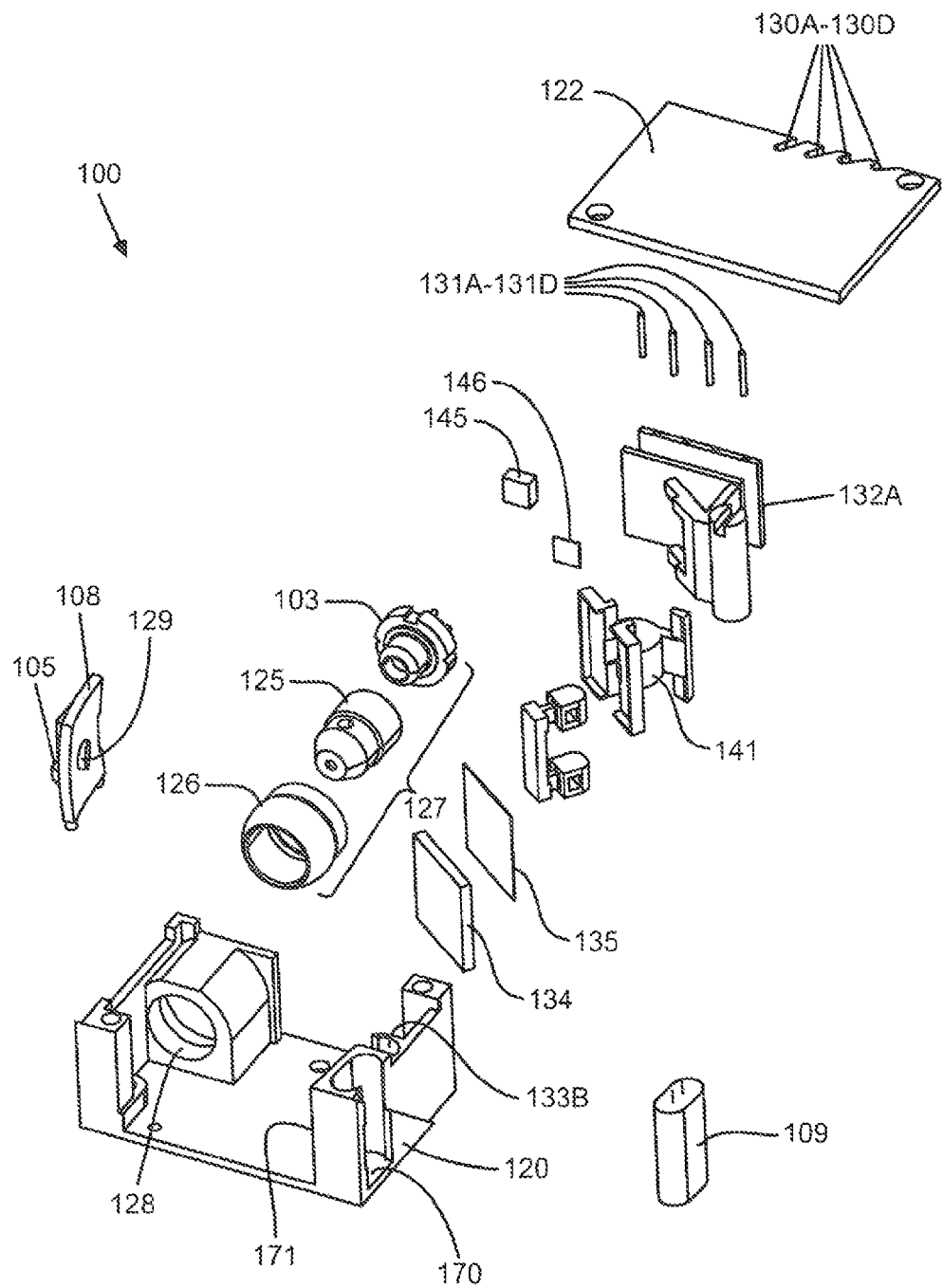
FIG. 3 is an exploded view of the laser scanning engine shown in FIGS. 1A, 1B and 1C showing components used to construct the laser scanning assembly and laser beam production assembly within the engine housing.

Laser Scanning Module According to a First Illustrative Embodiment of the Present Disclosure FIG. 2 through 3 show the laser scanning module 100 according to a first illustrative embodiment of the present disclosure comprising: an engine housing or framework 120 having six sides, namely opposing sides 120A and 120B, a front side 120C with a light transmission aperture 121, and opposing rear side 120D, a bottom side 120E and opposing top side 120F; a laser scanning assembly 106 rotatably mounted within the engine housing 120; and at least one PC board 122, mounted on the top side 120F, having one or more electronic circuits formed thereon implementing the functions of the various subsystems described in the system block diagram shown in FIG. 1A.

As shown in FIG. 1A, the laser scanning module 100 comprises: a laser drive circuit 101 for receiving control signals from system controller 102, and in response thereto, generating and delivering laser (diode) drive current signals to laser source 103, to produce a laser scanning beam 104A during each laser scanning bar code symbol reading cycle; a beam folding mirror 105 for folding beam 104A into beam 104B; a laser scanning assembly 106 for scanning laser beam 104B into laser scanning beam 104C across the laser scanning field 6; a scanner drive and sense circuit 107 for driving the electromagnetic coil 132 structure employed within the laser scanning assembly 106, and sensing scanning mirror movement, under the control of system controller 102; light collection optics 108 for collecting light reflected/scattered from scanned object in the scanning field, and a photo-detector 109 for detecting the intensity of collected light and generating an analog scan data signal corresponding to said detected light intensity during scanning operations; an analog scan data signal processor/digitizer 110 for processing the analog scan data signals and converting the processed analog scan data signals into digital scan data signals, which are then converted into digital words representative of the relative width of the bars and spaces in the scanned code symbol structure; programmed decode processor 111 for decode processing digitized data signals, and generating symbol character data representative of each bar code symbol scanned by laser scanning beam 104C; an input/output (I/O) communication interface module 112 for interfacing with a host communication system (e.g. PC computer) and transmitting symbol character data thereto via wired or wireless communication links that are supported by the symbol reading system and host system; and system controller 102 for generating the necessary control signals for controlling operations within the laser scanning module 100.

In the illustrative embodiment, electronic circuit blocks 101, 107, 102, 110, 111 and 112 specified in the system diagram of FIG. 1A can be realized on one or more printed circuit (PC) boards 122 that mounted to one or more sides of the engine housing, as will be described in greater detail hereinafter.

In general, the laser scanning assembly 106 is rotatably mounted within the framework, and comprises a scanning subassembly (supporting a scanning mirror), having a permanent magnetic, and being capable of oscillation about a scanning axis, when its electromagnetic coil structure 132, having a plurality of electrically conductive pins 131A through 131D connected to its coil windings, are driven by scanner drive and sense circuit 107. The function of the electromagnetic coil is to exert forces on the permanent magnet, causing the scanning subassembly and scanning mirror 134 to oscillate about its scanning axis, and sweeping the laser scanning beam 104C across the laser scanning field 6. One or more PC boards having one or more electronic circuits are mounted on one or more of the sides of the module housing. Also, at least one of the PC board has a configuration of elongated slots (i.e. elongated apertures having an open-ended geometry) formed therein non-parallel manner, through which the electrically-conductive pins project at locations determined by the angular rotation of the laser scanning assembly 106 when it is fixedly mounted in the module housing after optical alignment procedures have been completed during manufacture. Conductors associated with the electronic circuit (i.e. scanner driver circuit 107) are formed adjacent the elongated slots on the PC board, so that soldered connections can be established between electrically-conductive pins that project therethrough, during the manufacturing process, as will be described in greater detail hereinafter.

As shown in FIG. 3, the laser scanning engine 100 further comprises: visible laser diode (VLD) 103 and beam forming optics 125 mounted in a barrel 126 forming a laser beam production module 127 that is mounted within cylindrical mount 128 formed in the housing 120; beam folding mirror 105, integrated with the rear side of the light collection mirror 108, for folding the focused laser beam and transmitting it through an aperture 129 formed in light collection mirror 108 mounted within the housing for focusing return laser light rays to a point of focus within the engine housing; and photodetector 109 mounted in a cavity 170 formed in the housing 120 with an aperture 171, and being electrically mounted to the PC board 122 and located at the point of focus of the light collection mirror 108 so as to detect the intensity of the analog laser light return signal and generate an electrical signal corresponding thereto; signal processing circuitry 110 on PC board 122, for converting the electrical analog scan data signal into a digital scan data signal (including edge detection signals and/or digital count values); and programmed decode processor 111 on the PC board 122 (or 124), for processing digital scan data and producing symbol character data of decoded bar code symbols in a matter known in the art.

As shown in FIGS. 1B and 1C, the PC board 122 is mounted over the top open side of the engine housing 120, when the engine is assembled, and has the plurality of elongated slots (i) 130A through 130D, through which the linear array of electrically-conductive pins 131A through 131D from electromagnetic coil structure 132 project. As shown in FIGS. 2A and 2B, the laser scanning assembly 106 employs a scanning assembly pivot mechanism 133 that allows the set (e.g. linear array) of electrically-conductive pins 131A through 131D on the electromagnetic coil structure 132 to slide along and project through the configuration of elongated holes (i.e. elongated apertures) 130A through 130D, respectively, formed in the PC board 122, as the scanning mirror 134 of the laser scanning assembly 133 is rotatably adjusted relative to the PC board 122 and optics (i.e. light collection and beam folding mirrors) 105, 108 mounted within the engine housing, during optical adjustment and alignment operations performed during manufacture, as specified in FIGS. 7 through 8C.

FIGS. 2A and 2B show the PC board 122 removed from the top side thereof, to reveal: (i) the linear array of electrically-conductive pins 131A through 131D projecting from the electromagnetic coil support structure 132A; and (ii) scanning assembly pivot mechanism 133 integrated with the electromagnetic coil structure 132A and rotatable about an axis of rotation 135. As shown, the scanning assembly pivot mechanism 133 is realized as a cylindrical post portion 133A that is supported within a cylindrical recess 133B formed in the wall portion 120B of the engine housing 120, and allows the entire laser scanning assembly 106 to be rotated about the axis of rotation 135 during adjustment and alignment operations, specified in FIGS. 7 through 8C.

As shown in FIGS. 6A through 6D, the laser scanning assembly 106 supports a light reflective surface (e.g. mirror element) 134 on an elastomeric hinge element 140. As shown, the elastomeric hinge element 140 is supported by a pair of support arms 139A and 139B extending from the cylindrical post portion 133A of the scanning assembly pivot mechanism 133.

Figure 4A:
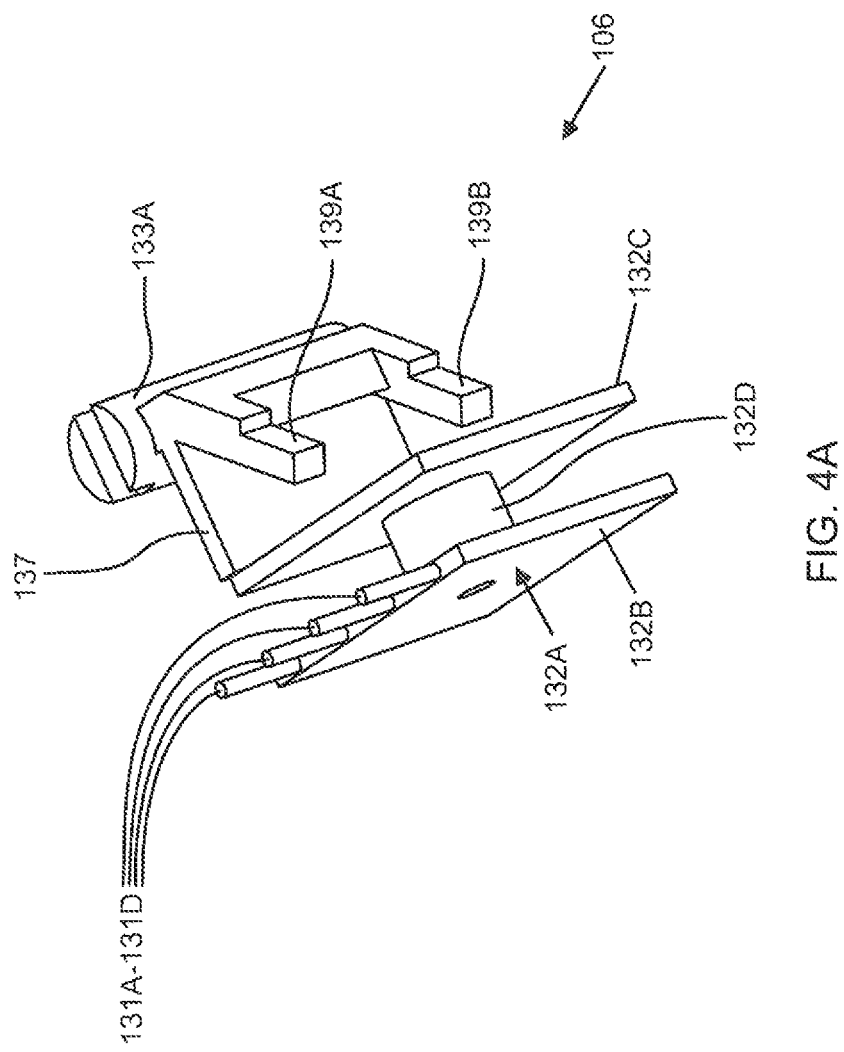
FIG. 4A is a first perspective view of the electromagnetic coil support structure integrated with the scanning assembly pivot mechanism having a pair of arms for supporting the scanning subassembly, shown in FIGS. 5A, 5B and 5C.

FIGS. 4A and 4B shows the electromagnetic coil support structure (i.e. coil bobbin) 132A being integrated with the scanning assembly pivot mechanism 133, via a bracket 137 that connects the electromagnetic coil support structure 132A and the support arms 139A and 139B, along the length of the scanning assembly pivot post 133A, as shown.

Figure 5A:
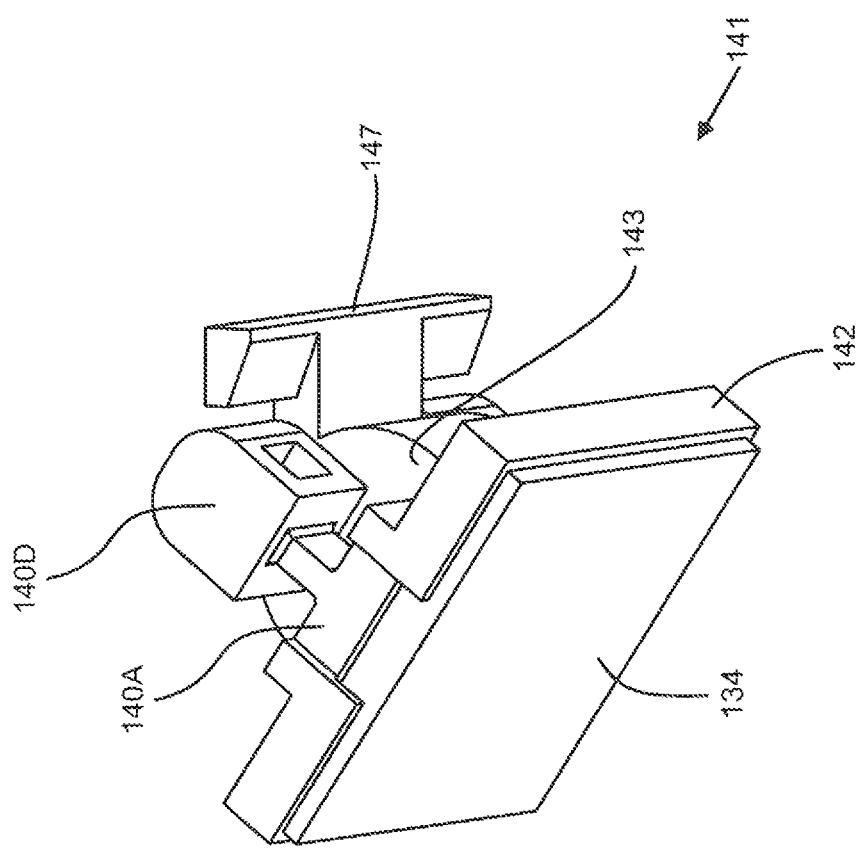
FIG. 5A is a perspective view of a scanning subassembly employed in the laser scanning assembly shown in FIG. 6A.

FIGS. 5A and 5C shows the scanning subassembly 141 employed in the laser scanning assembly 106 comprising: rectangular mirror element 134; a mirror support structure 142; a cylindrical center portion 143 integrated to the rear of the mirror support structure 142 and having a small recess 144 for receiving and mounting a permanent magnet 145 using a layer of adhesive 146; elastomeric hinge structure 140 (e.g. made from silicone rubber or equivalent material), coupled to the mirror support structure and the pair of support arms 139A and 139B, and having a scanning axis about its hinge elements, as specified in greater detail below; and a bar-like projection 147 stemming from cylindrical center portion 143 for striking the support arms 139A and 139B and limiting the angular motion of the scanning subassembly 141 when the scanning element assembly 141 undergoes extreme limits of rotational motion about the scanning axis of the elastomeric hinge element.

As shown in FIG. 5C, the elastomeric hinge structure 140 comprises: (i) a planar base portion 140A that extends along the length of the mirror element 134; (ii) a pair of flexible hinge portions 140B and 140C that extend from the planar base portion 140A of rectangular dimensions; and (iii) a pair of distal end portions 140D and 140E that terminate in the ends of the hinge portions 140B and 140C, respectively, and having a pair of apertures 140F and 140G, respectively, for use in supporting the entire scanning subassembly 141 via tip portions of support arms 139A and 139B, as shown in FIGS. 6A, 6B and 6C. An illustrative embodiment of elastomeric hinge structure 140 is disclosed in co-pending U.S. application Ser. No. 13/367,978 filed Feb. 7, 2012, and incorporated herein by reference in its entirety. During scanning operations, the distal end portions 140D and 140E oscillate relative to the base portion 140A, via the flexible hinge portions (i.e. elements) 140B and 140C, about a (virtual) scanning axis passing through the hinge portions 140B and 140C, in a direction parallel to the longitudinal extent of the base portion 140A.

As shown in FIGS. 5B and 5C, the mirror support structure 142 comprises: a rectangular recess 142A for receiving and mounting the rectangular mirror element 134 using a thin layer of adhesive 135, which is applied after a layer of primer has been applied to the rectangular recess region 142A; a pair of cut-outs 142B and 142C formed in the upper and lower portions of the rectangular recess 142 for passage of the distal end portions 140D and 140E of the elastomeric hinge element 140; and a thin rectangular recess 142D formed in the mirror recess 142 so that the planar base portion 140A of the elastomeric hinge element 140 can mount in recess 140D and then allow the mirror element 134 to mount over the base portion 140A of the hinge element, with the layer of adhesive and primer disposed therebetween.

All components of the laser scanning assembly, except for the magnet 145 elastomeric hinge element 140, and electromagnetic coil windings 142B, can be a molded as thermoplastic parts using suitable thermoplastic material (e.g. Ticoma Fortron #1120L4-Polyphenylene Sulfide (PPS)). The permanent magnet 145 can be realized using Neodymium Iron Boron Type N50 magnetic material, or similar material. The elastomeric hinge element 140 can be injection molded from a Liquid Silicone Rubber (LSR) material, such as Momentive Performance #2030 Liquid LSR Silicone, or Shin-Etsu KE2090-30AB Select-Hesive Silicone with enhanced adhesive properties. The layer of adhesive 135 can be a Dow Corning 734 adhesive, or similar material, and the primer layer could be a GE SS4004P or similar material.

As shown in FIGS. 6A and 6B, the laser scanning assembly 106 comprises: electromagnetic coil support structure 132A shown in FIGS. 4A and 4B; integrated scanning assembly pivot mechanism 133 shown in FIGS. 4A and 4B; and scanning subassembly 141 shown in FIGS. 5A through 5C.

In the illustrative embodiment shown in FIG. 4A, the electromagnetic coil support structure 132 has the shape of a bobbin, formed by a pail of parallel flanges 132B and 132C extending from a cylindrical portion 132D. About the cylindrical portion 132D, a primary drive coil 132E, 132F is wound and terminated in a first pair of electrically-conductive pins 131A and 131B. Also, a sense coil 132F is wound about the electromagnetic coil support structure 132A, and terminated in a second pair of electrically-conductive pins 132C and 131D. As shown in FIG. 6B, the electrically conductive pins 131A through 131D are arranged in a linear array configuration, but may be arranged in a different configuration, in different illustrative embodiments, as may be required or desired.

As shown in FIGS. 6A and 6B, the support arm portion 137 connects the electromagnetic coil support structure 132 to the scanning subassembly support arms 139A, 139B which are connected to cylindrical pivot post 133A that is designed for rotatable mounting within cylindrical recess 133B formed in the interior wall surface of the engine housing 120, as shown in FIG. 2B.

Figure 6D:
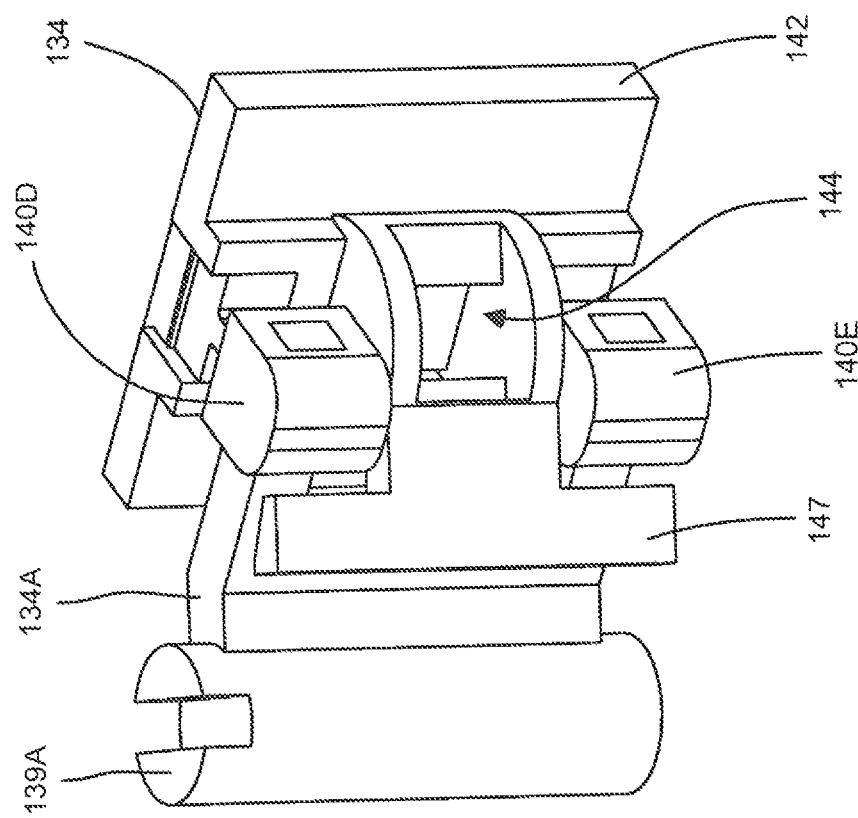
FIG. 6D is a second partially-cutaway perspective view of the laser scanning assembly in FIGS. 6A and 6B, with the electromagnetic coil support structure and a portion of the integrated scanning assembly pivot mechanism removed (i.e. cutaway) to reveal the recess where the permanent magnet is located on the rear side of the scanning subassembly.

As shown in FIGS. 6C and 6D, the support arms 139A and 139B extending from cylindrical pivot post 133A have distal tip portions which insert into apertures 140F and 140G, respectively, formed in the distal end portions 140D and 140E of the elastomeric scanning hinge 140. In FIG. 6C, a portion of the integrated scanning assembly pivot mechanism 133 is removed (i.e. cutaway) to show the location of the permanent magnet 145 on the rear side of the scanning subassembly 141

Figure 7:
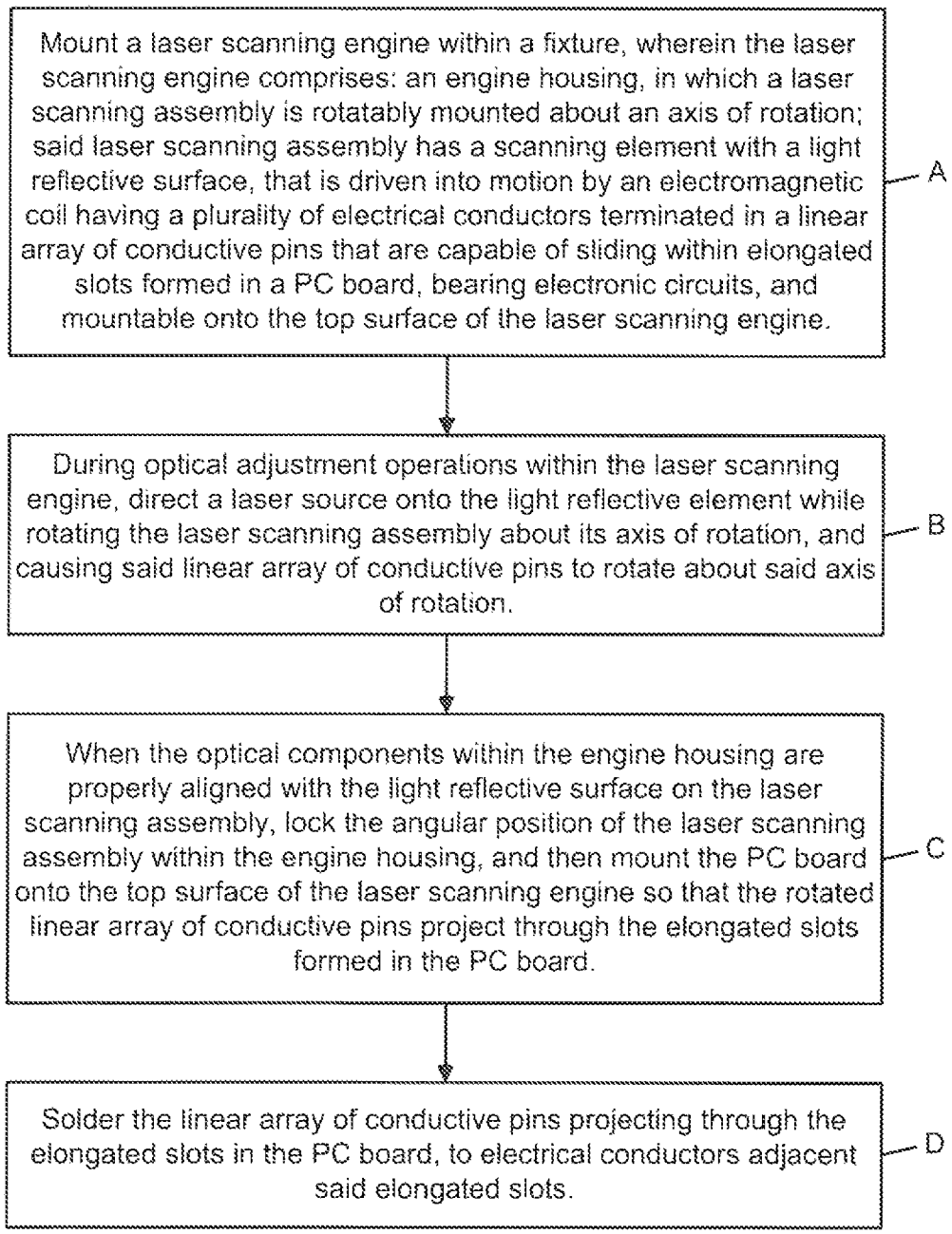
FIG. 7 is a flow chart describing the major steps performed when carrying out the method of adjusting the optics in the laser scanning engine shown in FIGS. 1A, 1B and 1C, in accordance with the principles of invention disclosure.

FIG. 7 describes a method of adjusting the optics in the laser scanning engine shown in FIGS. 1A, 1B and 1C, in accordance with the principles of invention disclosure.

As indicated at Step A in FIG. 7, the laser scanning engine 100 is mounted within a fixture, as schematically depicted in FIG. 8A. As shown, the laser scanning engine 100 comprises engine housing 120, in which laser scanning assembly 106 is rotatably mounted about the axis of rotation 135, and the laser scanning assembly has scanning surface 134 that is driven into motion and sensed by electromagnetic coils 132E, 132F having electrical conductors terminated in a set of conductive pins 131A through 131D. As indicated above, the set of conductive pins 131A through 131D are capable of sliding within the configuration of elongated slots 130A through 130D formed in the PC board 122, which is mountable onto the top surface of the laser scanning engine, after optical alignment has been achieved.

Also shown in FIG. 8A, the distance D between the planar flange 132C of the electromagnetic coil and the permanent magnet 145, indicated by reference numeral 500, is selected during scanning assembly design to be minimized, or made as small as possible, so as to minimize the electrical current required through the electromagnetic coil to generate a force field sufficient to drive the scan mirror and magnet rotor assembly during scanning operation, as required for the application at hand.

Figure 8B:
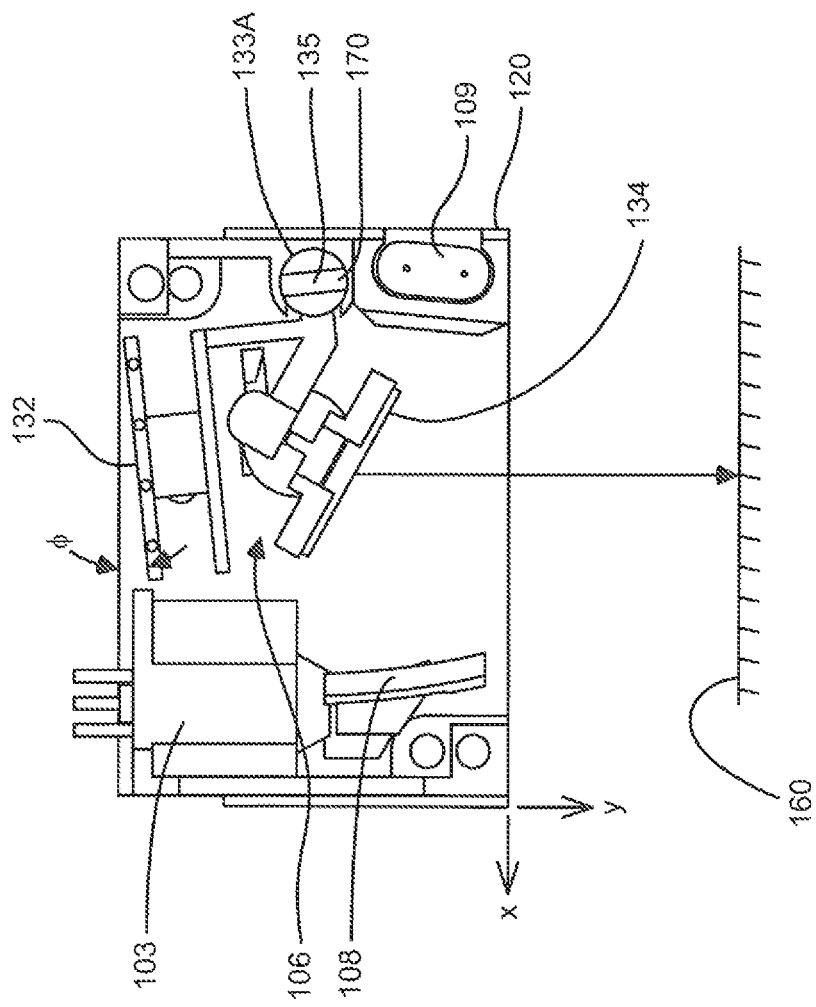
FIG. 8B is a plan view of the laser scanning engine of FIG. 1A shown with its PC board removed, and revealing that the laser scanning assembly is located at the 6 degree position at subsequent steps in the optical alignment and adjustment process described in FIG. 7.
Figure 8C:
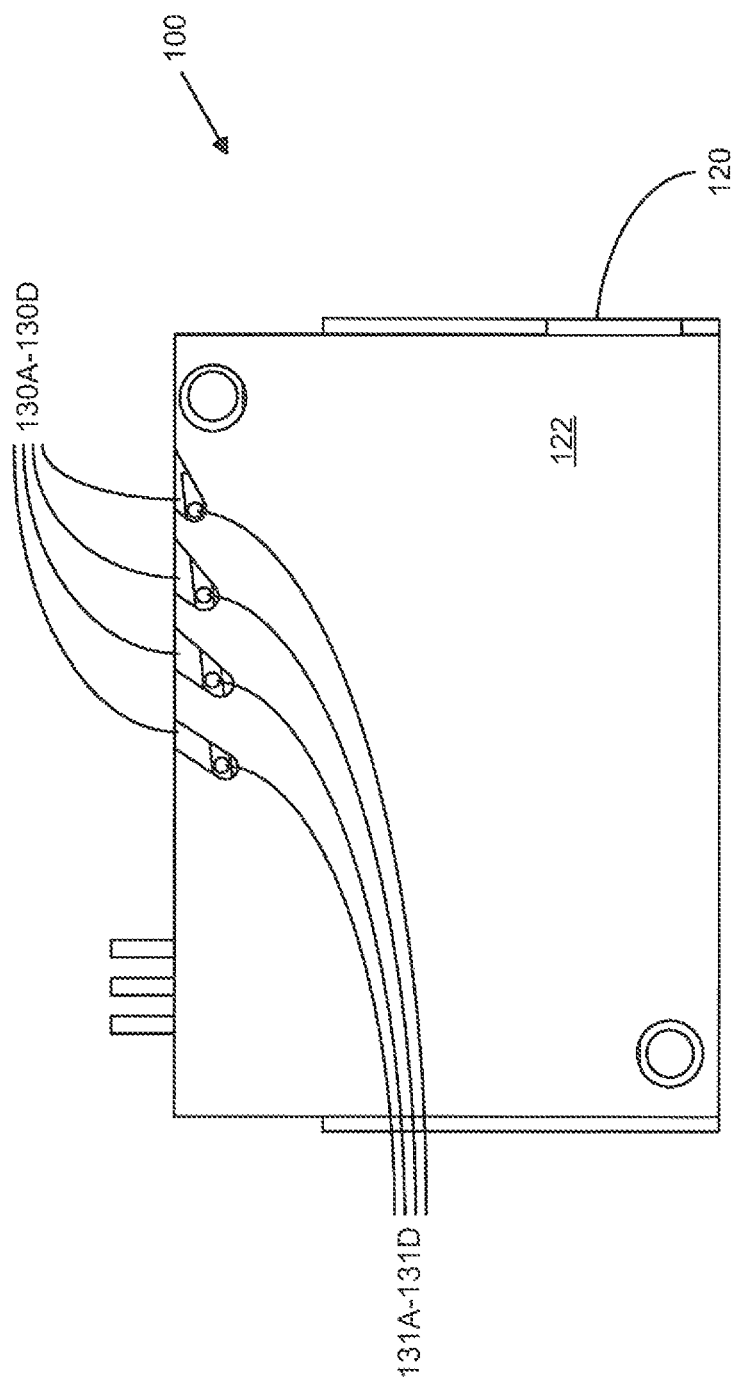
FIG. 8C is a plan view of the laser scanning engine of FIG. 1A shown with its PC board installed, and the linear array of electrically-conductive pins projected through the elongated slots formed therein, and ready to be soldered to circuits supported on the PC board.
Figure 8D:
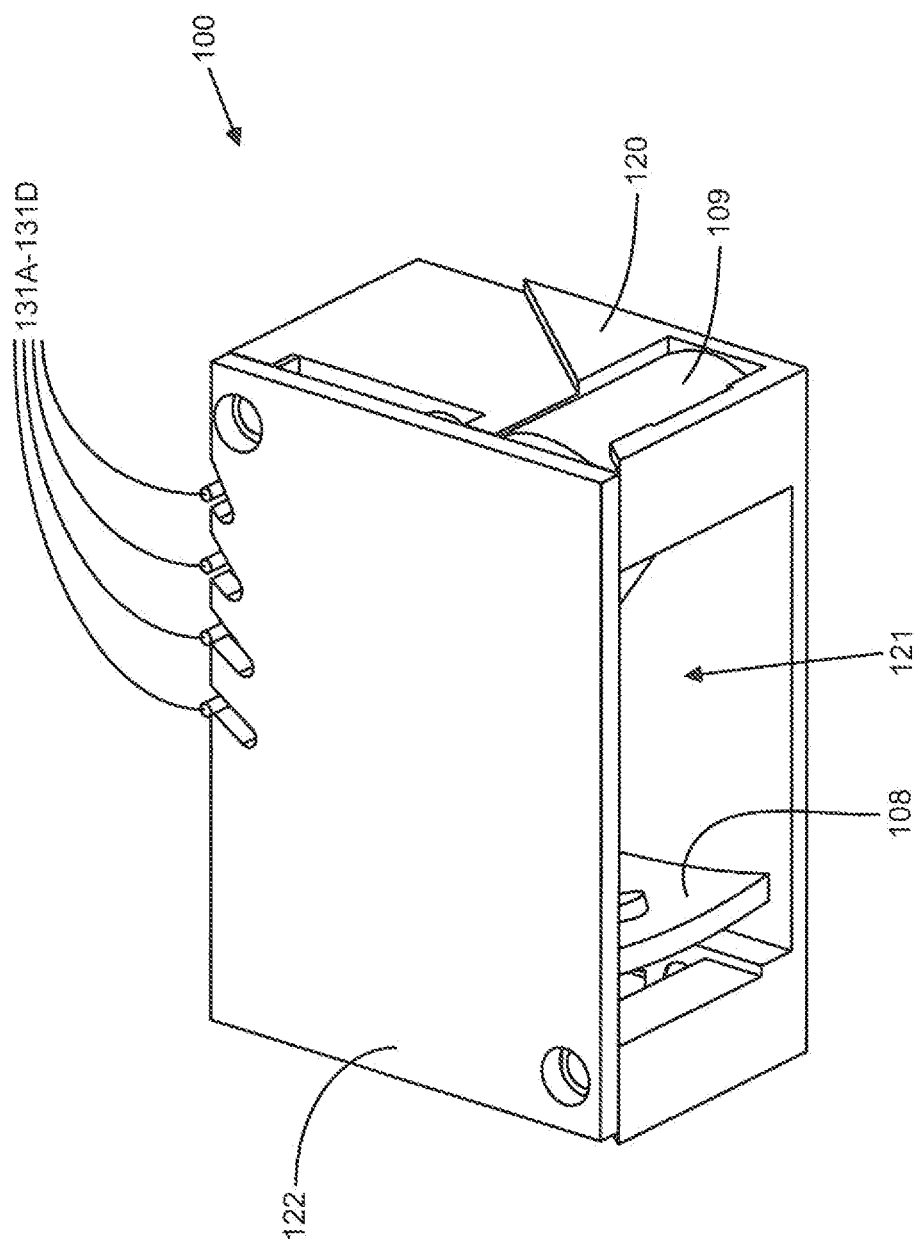
FIG. 8D is a perspective view of the laser scanning engine of FIGS. 1A and 8C showing its linear array of electrically-conductive pins projecting through the elongated slots formed in the PC board, and ready to be soldered to circuits supported on the top surface of the PC board.

As indicated at Step B in FIG. 7, during optical adjustment operations within the laser scanning engine, a laser beam from source 103 is directed onto the light reflective calibration surface 160, associated with the alignment test fixture, while the laser scanning assembly is rotated about its axis of rotation, and causing the array of conductive pins 131A and 131D to rotate about the axis of rotation. Preferably, the laser scanning assembly is rotated, typically a few angular degrees, by placing a screwdriver tip into the flat headed groove 170 provided on the top end surface of the cylindrical post portion 133A associated with the laser scanning assembly, and then rotating the screwdriver handle until the desired degree of rotation is achieved to cause optical alignment while the laser scanning engine is mounted in the test fixture. This adjustment procedure is illustrated in FIGS. 8A and 8B.

As indicated at Step C in FIG. 7, when the optical components (i.e. beam folding mirror and light collecting mirror) within the engine housing 120 are properly aligned with the light reflective surface on the laser scanning assembly 106, then the angular position of the laser scanning assembly 106 is mechanically locked within the engine housing (e.g. using LOCTITE® adhesive), and then the PC board 122 is mounted onto the top surface of the laser scanning engine so that the rotated linear array of conductive pins 131A through 131D project through the elongated slots 130A through 130D formed in the PC board 122. During the optical alignment procedure, the distance d, determined by design, is not altered or modified, thereby ensuring that magnetic field alignment is preserved.

In an alternative method, Step C can be modified out as follows. The PC board can be first mounted onto the housing, with a hole provided in the PC board to provide access to the end of cylindrical post portion 133A using a screwdriver. Then, the laser scanning assembly can be rotated within the housing while PC board is mounted in place on the housing, during optical adjustment operations.

As indicated at Step D in FIG. 7, the set of conductive pins 131A through 131D projecting through the elongated slots 130A through 130D, respectively, in the PC board 122 are soldered to electrical conductors adjacent the elongated slots 130A through 130D, which form part of the electronic circuits on the PC board. Such electrical connections further strengthen the mechanical mounting of the laser scanning assembly 136 within the engine housing 120. This steps represents the completion of the optical alignment process, and now the laser scanning engine can be removed from the test fixture and advanced to the next stage in the manufacturing/testing process.

Figure 9C:
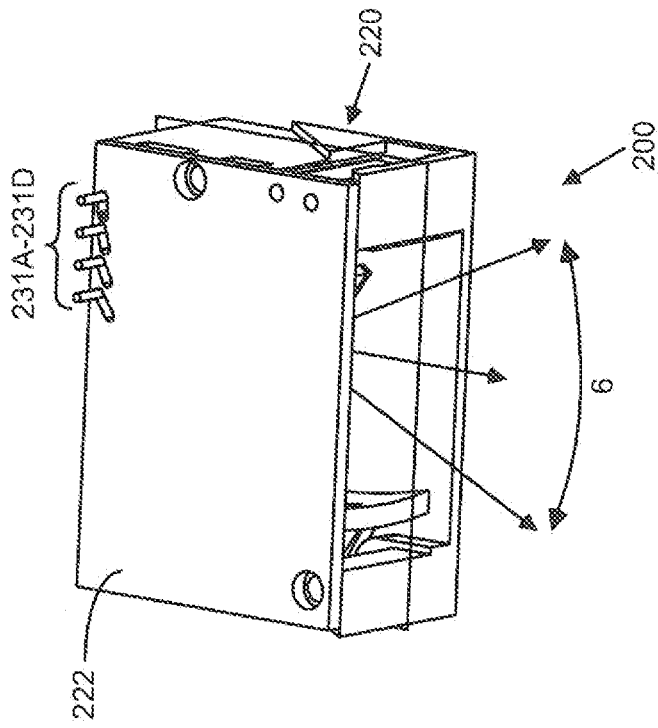
FIG. 9C is a second perspective view of the laser scanning engine shown in FIGS. 9A and 9B, showing the linear array of electrically-conductive pins projecting through the plurality of elongated holes formed in a non-parallel manner in the PC board mounted over the top open side of the engine housing, and slid along the elongated holes during adjustment and alignment of the laser scanning assembly within the engine housing, during manufacture, as specified in FIGS. 7 through 8C.
Figure 9B:
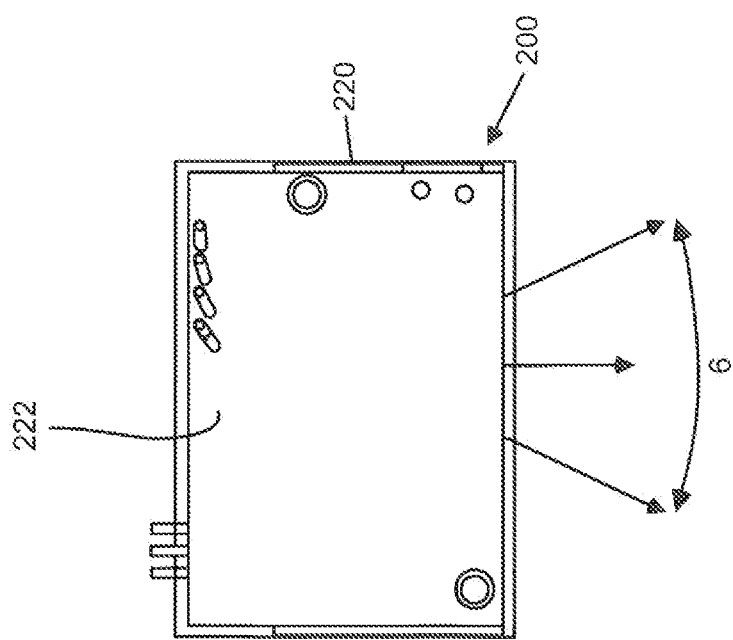
FIG. 9B is a plan view of the laser scanning module shown in FIG. 9A, revealing a plurality of elongated holes (i) formed in the PC board mounted over the top open side of the engine housing, and (ii) through which the linear array of electrically-conductive pins project and can slide back and forth along the elongated holes during adjustment and alignment of the laser scanning assembly within the engine housing, during manufacture.
Figure 9D:
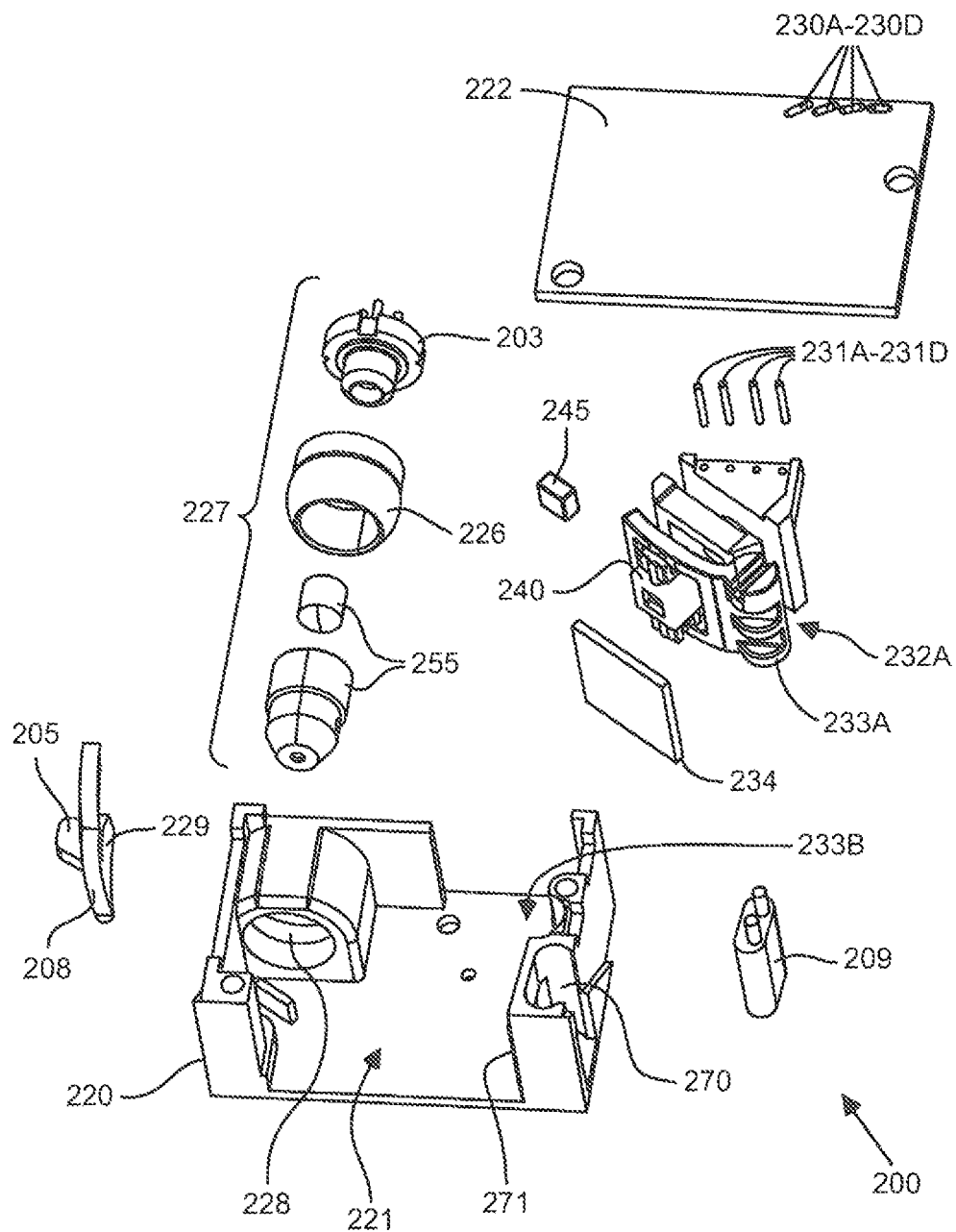
FIG. 9D is an exploded view of the laser scanning engine shown in FIGS. 9A, 9B and 9C showing components used to construct the laser scanning assembly and laser beam production assembly within the engine housing.

Laser Scanning Module According to a Second Illustrative Embodiment of the Present Disclosure FIG. 9 through 9D show the laser scanning module 200 according to a second illustrative embodiment of the present disclosure comprising: an engine housing or framework 220 having six sides, namely opposing sides 220A and 220B, a front side 220C with a light transmission aperture 221, and opposing rear side 220D, a bottom side 120E and opposing top side 120F; a laser scanning assembly 206 rotatably mounted within the engine housing 220; and at least one PC board 222, mounted on the top side 120F, having one or more electronic circuits formed thereon implementing the functions of the various subsystems described in the system block diagram shown in FIG. 9.

As shown in FIG. 9, the laser scanning module 200 comprises: a laser drive circuit 201 for receiving control signals from system controller 202, and in response thereto, generating and delivering laser (diode) drive current signals to laser source 203, to produce a laser scanning beam 204A during each laser scanning bar code symbol reading cycle; a beam folding mirror 205 for folding beam 204A into beam 204B; a laser scanning assembly 206 for scanning laser beam 204B into laser scanning beam 204C across the laser scanning field 6; a scanner drive and sense circuit 207 for driving the electromagnetic coil structure 232 employed within the laser scanning assembly 206, and sensing scanning mirror motion, under the control of system controller 202; light collection optics 208 for collecting light reflected/scattered from scanned object in the scanning field, and a photo-detector 209 for detecting the intensity of collected light and generating an analog scan data signal corresponding to said detected light intensity during scanning operations; an analog scan data signal processor/digitizer 210 for processing the analog scan data signals and converting the processed analog scan data signals into digital scan data signals, which are then converted into digital words representative of the relative width of the bars and spaces in the scanned code symbol structure; programmed decode processor 211 for decode processing digitized data signals, and generating symbol character data representative of each bar code symbol scanned by laser scanning beam 204C; an input/output (I/O) communication interface module 212 for interfacing with a host communication system (e.g. PC computer) and transmitting symbol character data thereto via wired or wireless communication links that are supported by the symbol reading system and host system; and system controller 202 for generating the necessary control signals for controlling operations within the laser scanning module 200.

In the illustrative embodiments, electronic circuit blocks 201, 207, 202, 210, 211 and 212 specified in the system diagram of FIG. 9 can be realized on one or more printed circuit (PC) boards 222 that mounted to one or more sides of the engine housing, as will be described in greater detail hereinafter.

In general, the laser scanning assembly 206 is rotatably mounted within the framework, and comprises a scanning subassembly 241 (supporting a scanning mirror 234), having a permanent magnetic 245, and being capable of oscillation about a scanning axis 235, when its electromagnetic coil structure, having a plurality of electrically conductive pins 231A through 231D connected to its coil windings 232E, 232F, are driven by scanner drive and sense circuit 207. The function of the electromagnetic coil 232E is to exert forces on the permanent magnet, causing the scanning subassembly and scanning mirror 234 to oscillate about its scanning axis, and sweeping the laser scanning beam 204C across the laser scanning field 6. One or more PC boards 222 having one or more electronic circuits are mounted on one or more of the sides of the module housing 220. Also, at least one of the PC board 222 has a configuration of elongated holes (i.e. elongated apertures having a closed-ended geometry) 230A through 230D formed therein, through which the electrically-conductive pins 2321A through 232D project at locations determined by the angular rotation of the laser scanning assembly 206 when it is fixedly mounted in the module housing 220 after optical alignment procedures have been completed during manufacture.

Figure 15A:
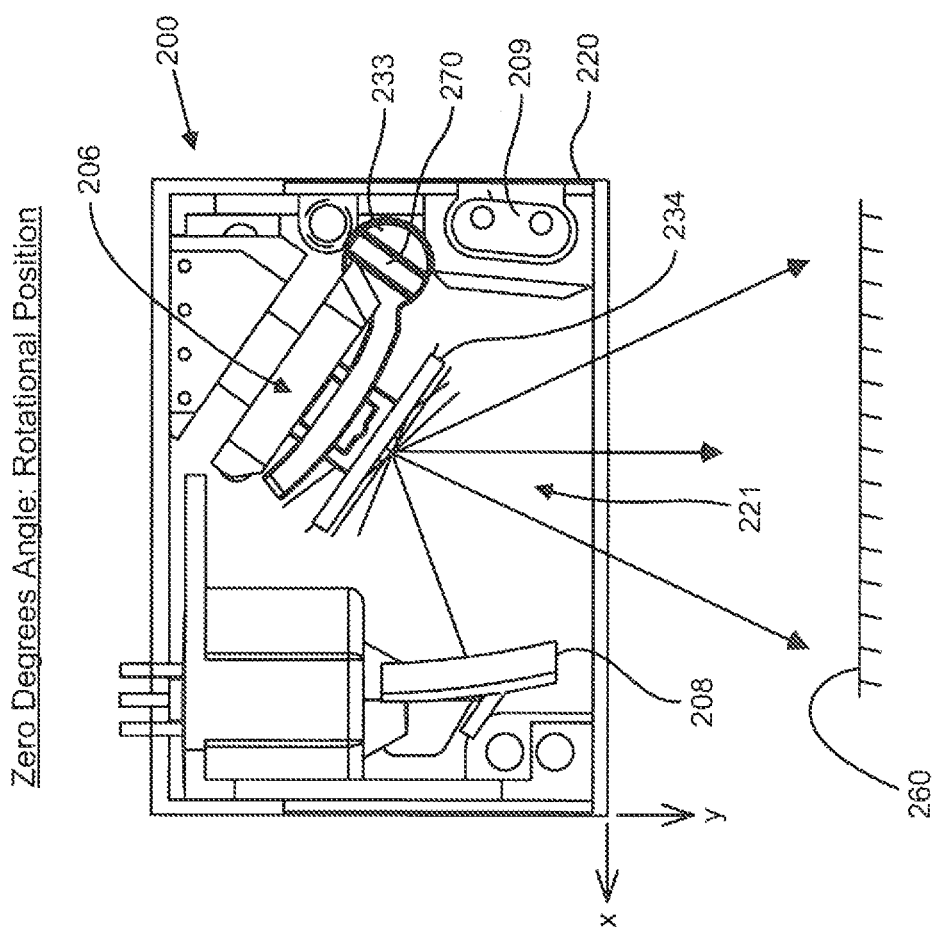
FIG. 15A is a plan view of the laser scanning engine of FIGS. 9A through 9D shown with its PC board removed, and revealing that the laser scanning assembly is rotated to the 0 degree position, about its axis of rotation, at the beginning of the optical alignment and adjustment process described in the flow chart FIG. 14.
Figure 15D:
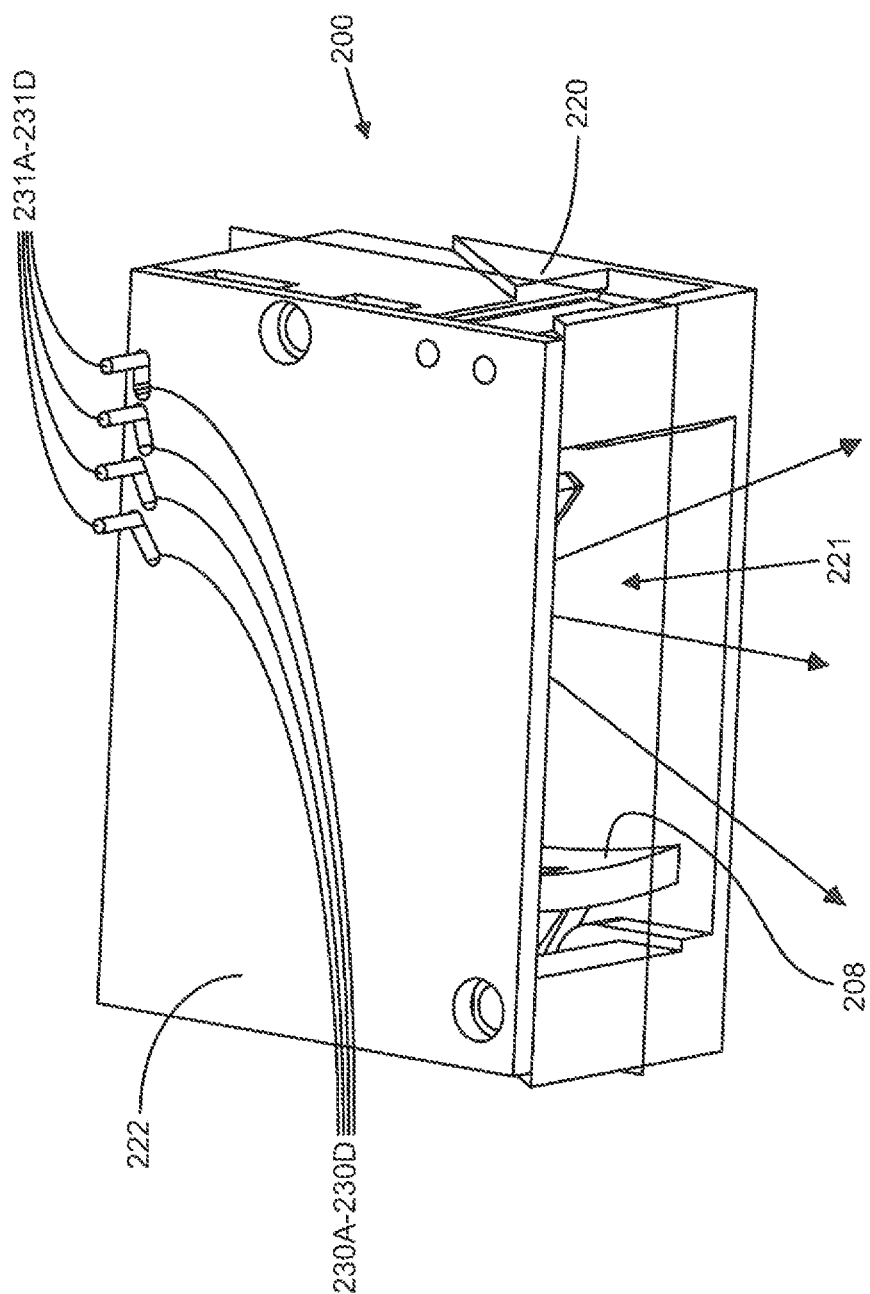
FIG. 15D is a perspective view of the laser scanning engine of FIG. 15CA shown with its PC board installed, and the linear array of electrically-conductive pins projecting through the elongated holes formed therein, and ready for being soldered to conductive circuits supported on the front surface of the PC board.

As shown in FIGS. 9B and 9C, the PC board 222 is mounted over the top open side of the engine housing 220, when the engine is assembled, and has the plurality of elongated holes 230A through 230D formed therein in a non-parallel manner, through which a linear array of electrically-conductive pins 231A through 232D project and can slide back and forth along the elongated holes during adjustment and alignment of the laser scanning assembly 206 within the engine housing, during manufacture, as specified in FIGS. 14 through 15D. Conductors associated with the electronic circuit (i.e. scanner driver circuit 207) are formed adjacent the elongated holes on the PC board, so that soldered connections can be established between electrically-conductive pins that project therethrough, during the manufacturing process, as will be described in greater detail hereinafter.

As shown in FIG. 9D, the laser scanning engine 200 further comprises: a visible laser diode (VLD) 203 beam forming optics 225, and a barrel 226 for containing the VLD 203 and optics 225, and forming a laser beam production module 227 mounted within the cylindrical mount 228 in the housing 220; a beam folding mirror 205 for folding the focused laser beam and transmitting it through an aperture 229 formed in a light collection mirror 208 mounted within the housing for focusing return laser light rays to a point of focus within the engine housing; and a photo-detector 209 supported in a cavity 270 formed in housing 220 with aperture 271, and electrically mounted to the PC board 222, and located at the point of focus of the light collection mirror 208 so as to detect the intensity of the analog laser light return signal and generate an electrical signal corresponding thereto; signal processing circuitry 210 on PC board 222, for converting the electrical analog scan data signal into a digital scan data signal (including edge detection signals and/or digital count values); and programmed decode processor 211 on the PC board 222, for processing digital scan data and producing symbol character data of decoded bar code symbols in a matter known in the art.

As shown in FIG. 9D, the laser scanning assembly 206 employs a scanning assembly pivot mechanism 233 that allows a set (e.g. linear array) of electrically-conductive pins 231A through 231D on the electromagnetic coil structure 232 to project through and slide within a configuration of elongated holes (i.e. elongated apertures) 230A through 230D formed in the PC board 233 in a non-parallel manner, as the laser scanning mirror 234 of the laser scanning assembly 206 is rotatably adjusted relative to the PC board 222 and fixed optics (i.e. light collection and beam folding mirrors) 205 and 208 mounted within the engine housing 220, during optical adjustment and alignment operations performed during manufacture.

Figure 10B:
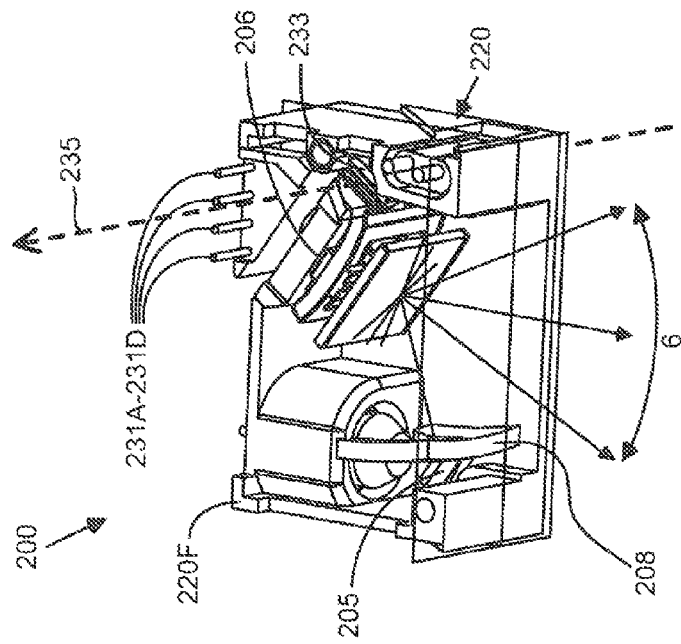
FIG. 10B is a perspective view of the laser scanning module shown in FIG. 10A, with the PC board removed from the top side thereof, and revealing the linear array of electrically-conductive pins projecting from the electromagnetic coil support structure, integrated with a scanning assembly pivot mechanism that is rotatable about an axis of rotation and supported within a cylindrical recess formed in the wall portion of the engine housing, and allowing the laser scanning assembly to be rotated about the axis of rotation during laser scanning assembly adjustment and alignment operations, specified in FIGS. 14 through 15C.
Figure 10A:
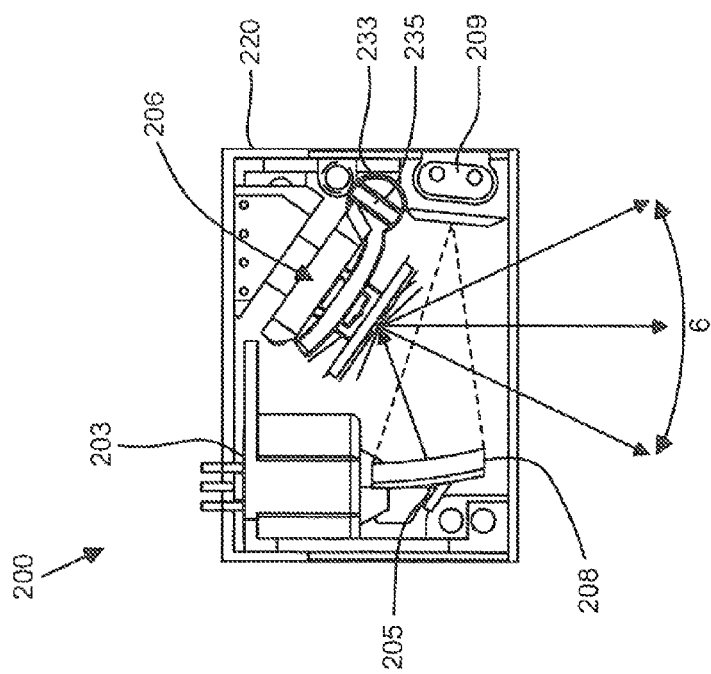
FIG. 10A is a plan view of the laser scanning engine shown in FIGS. 9A through 9C, with the PC board removed from the top side thereof, and revealing the linear array of electrically-conductive pins projecting from the electromagnetic coil support structure, integrated with a scanning assembly pivot mechanism that is rotatable about an axis of rotation and supported within a cylindrical recess formed in the wall portion of the engine housing, and allowing the laser scanning assembly to be rotated about the axis of rotation during laser scanning assembly adjustment and alignment operations, specified in FIGS. 14 through 15C.

FIGS. 10A and 10B show the PC board 222 removed from the top side thereof, and reveal the linear array of electrically-conductive pins 231A through 231D projecting from the electromagnetic coil support structure 232A, integrated with a scanning assembly pivot mechanism 233 that is rotatable about an axis of rotation 235 and having a cylindrical pivot post 233A pivotally supported within a cylindrical recess 233B formed in the wall portion of the engine housing 220, and allowing the laser scanning assembly 206 to be rotated about the axis of rotation during adjustment and alignment operations, specified in FIGS. 14 through 15C.

Figure 11A:
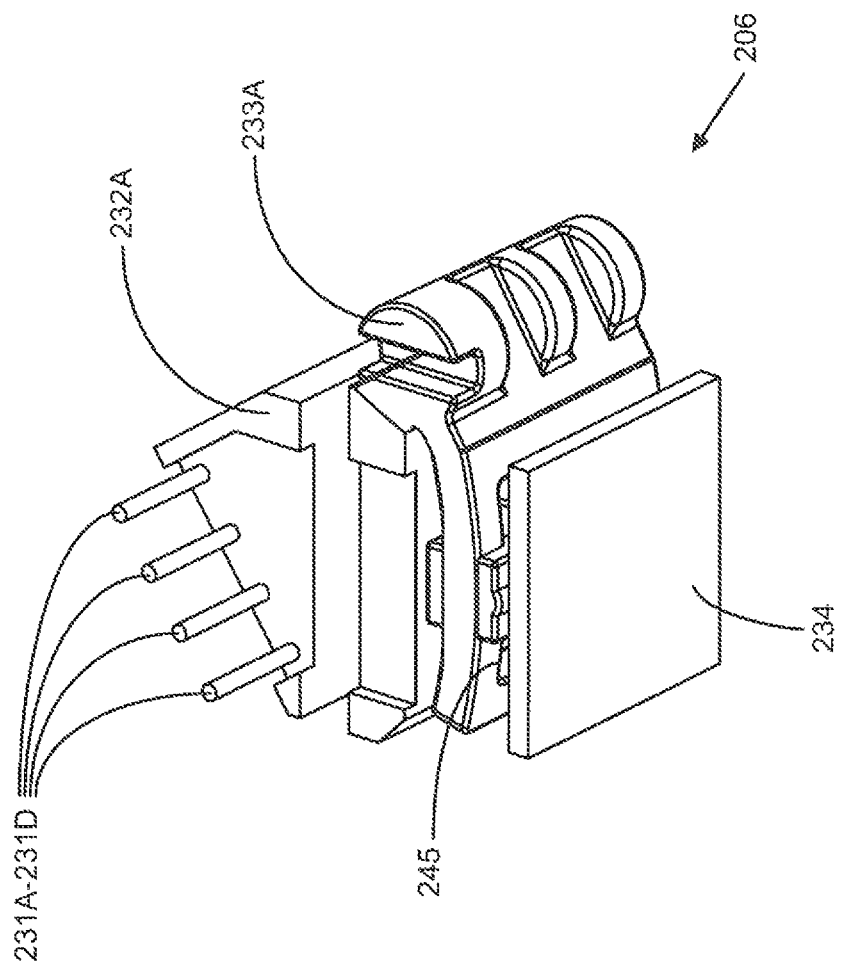
FIG. 11A is a first perspective view of the laser scanning assembly employed in the laser scanning engine of shown in FIGS. 9A through 9D.
Figure 11B:
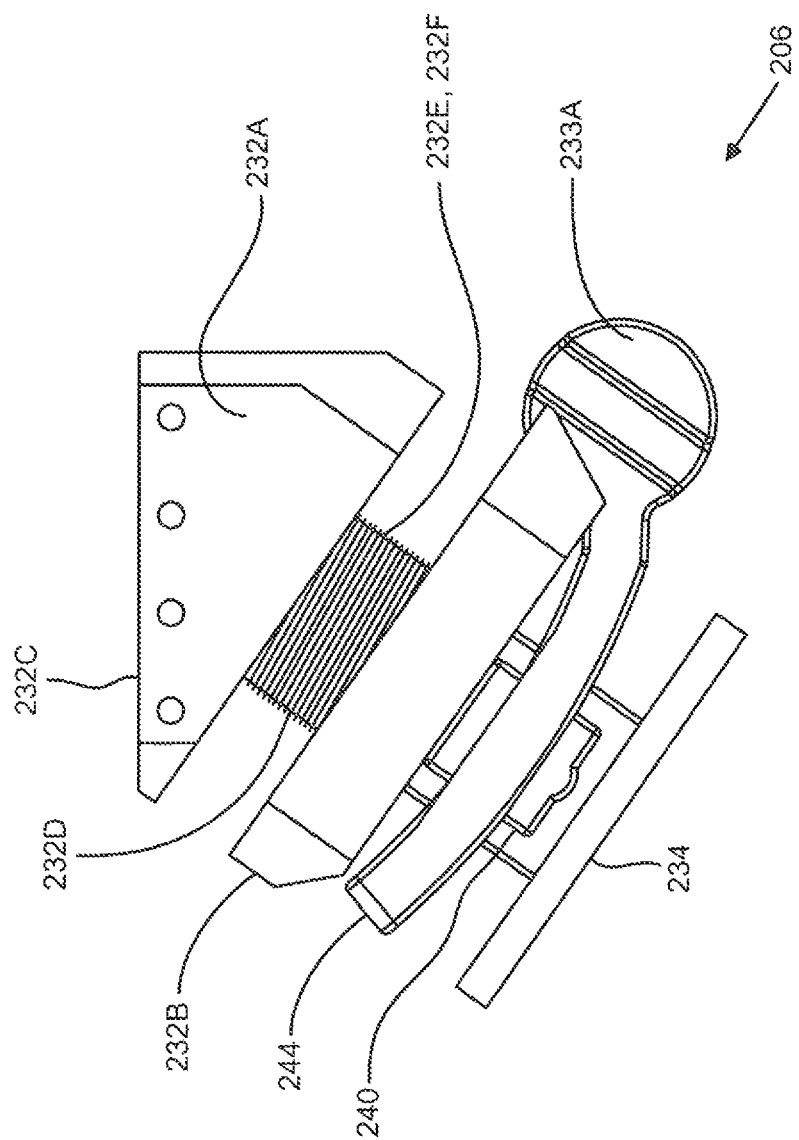
FIG. 11B is a plan view of the laser scanning assembly employed in the laser scanning engine of shown in FIGS. 9A through 9D.
Figure 11C:
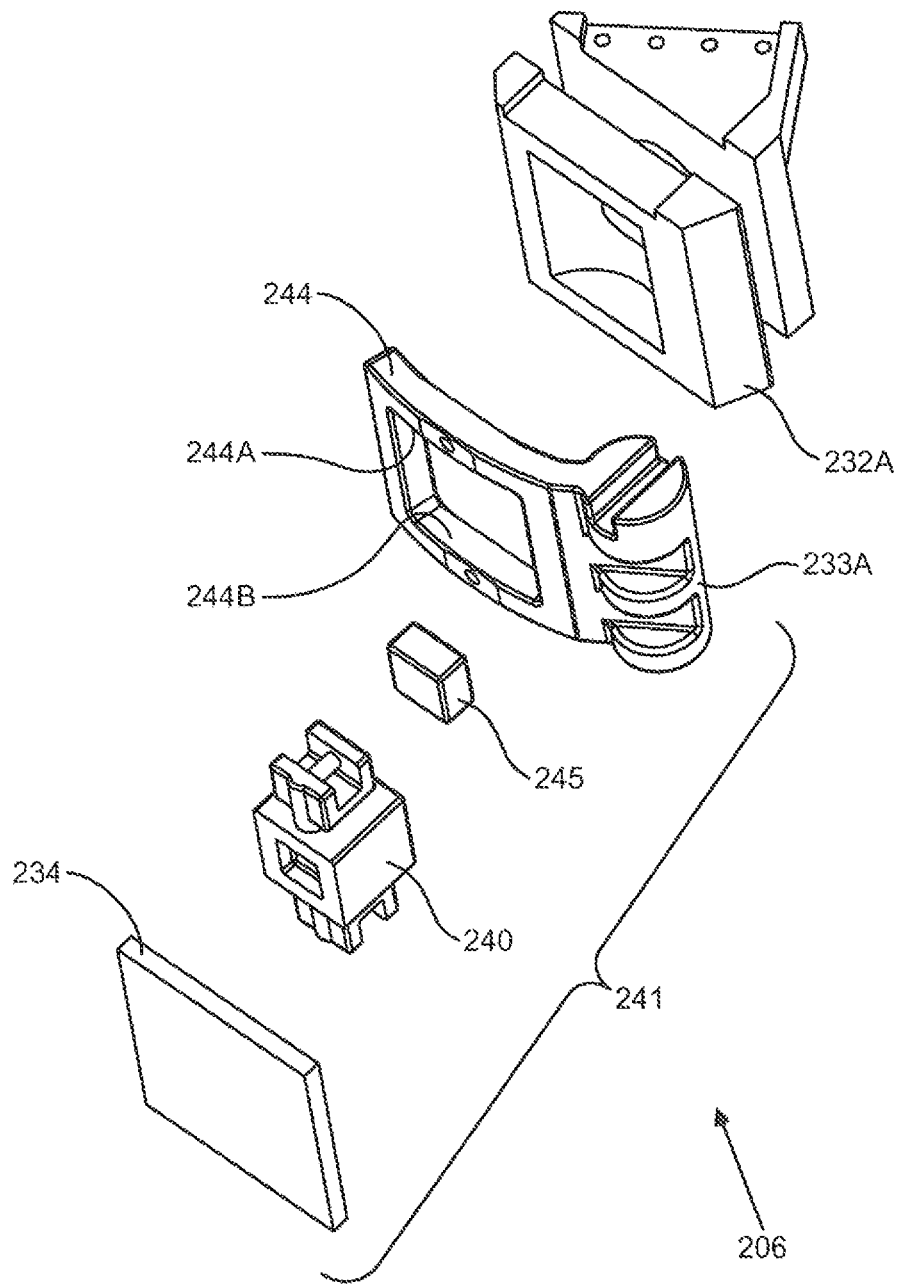
FIG. 11C is an exploded view of the laser scanning assembly employed in the laser scanning engine shown in FIGS. 9A through 9D.

As shown in FIGS. 11A, 11B and 11C, laser scanning assembly 206 comprises: scanning subassembly 241 having an elastomeric scanning element 240 torsionally-supported between a scanning element support framework 244 and supporting a light reflective surface (e.g. mirror element) 234 on its front surface, and a permanent magnet 245 on its rear surface; scanning assembly pivot mechanism 233 having a cylindrical pivot post portion 233A which mounts within a cylindrical recess 233B formed in the wall surface of the engine housing 220, and is integrated with the scanning element support framework 244; and an electromagnetic coil support structure 232A connected to the scanning element support framework 244 by adhesive or snap-fit connection, or integrally molded to the scanning element support framework 244. As shown, the cylindrical pivot post portion 233A has a linear groove 270 formed on its top surface, for rotation using a conventional screwdriver.

FIGS. 11A and 11B show the electromagnetic coil support structure (i.e. coil bobbin) 232A that is integrated with the scanning element support framework 244 and scanning assembly pivot mechanism 233, shown in FIGS. 10A, 10B and 10C.

In the illustrative embodiment, the electromagnetic coil support structure 232A has the shape of a bobbin, formed by a pair of parallel flanges 232B and 232C separated by a cylindrical portion 232D. About the cylindrical portion 232D, a primary drive coil 232E is wound and terminated in a first pair of electrically-conductive pins 231A and 231B. A sense coil 232F is also wound about the electromagnetic coil support structure 232A and terminated in a second pair of electrically-conductive pins 231C and 231D. As shown, the electrically conductive pins 231A through 231D are arranged in a linear array configuration, but may be arranged in a different configuration, in different illustrative embodiments, as may be required or desired.

Figure 12A:
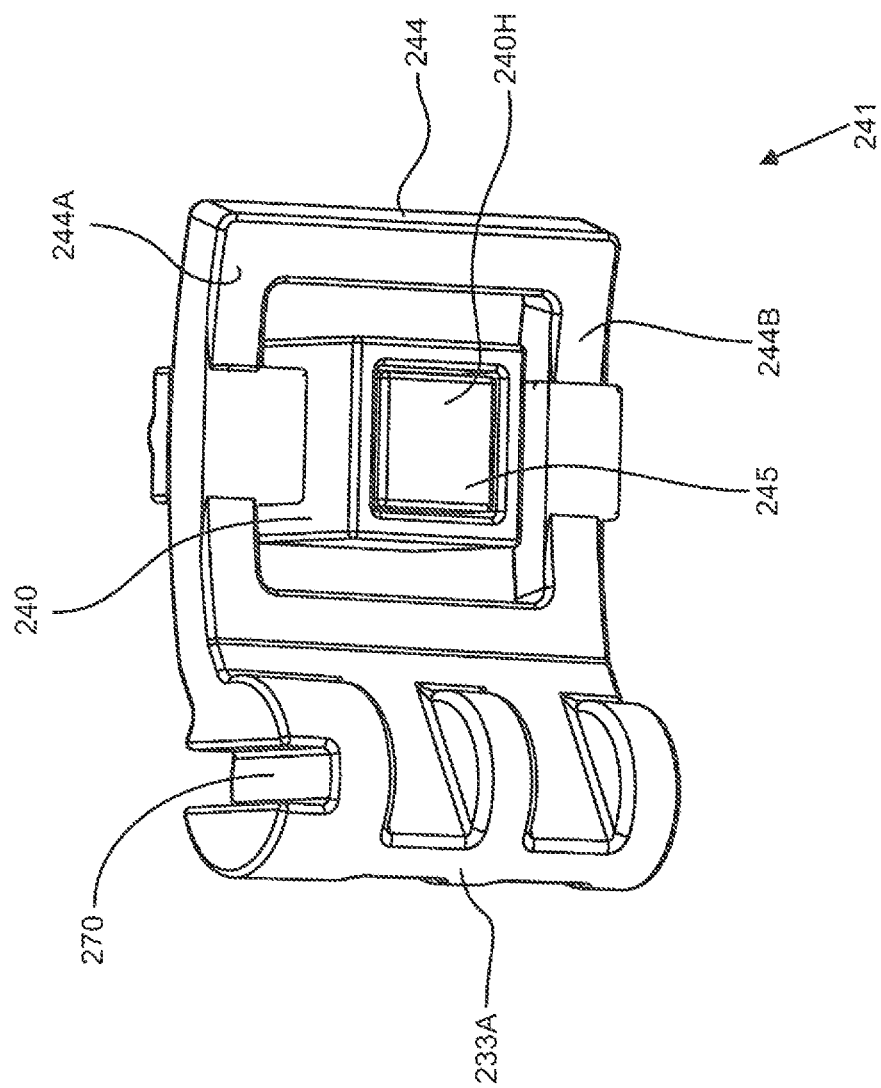
FIG. 12A is a rear perspective view of the scanning subassembly employed in the laser scanning assembly shown in FIGS. 11A through 11C, showing the elastomeric scanning element torsionally-supported within the scanning element support frame having an integrated pivot mechanism for pivotal mounting about an axis of rotation, within a recess formed in the wall section of the engine housing.
Figure 12B:
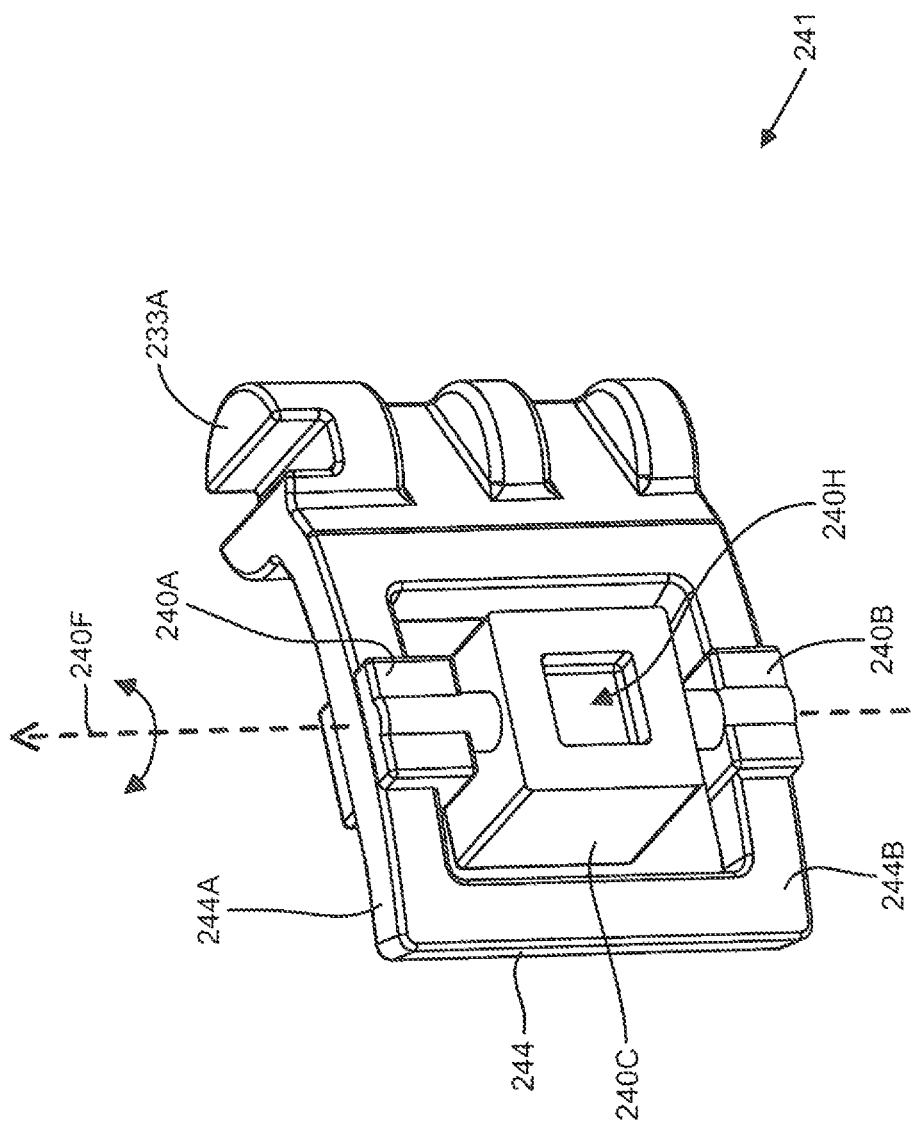
FIG. 12B is a front perspective view of the scanning subassembly shown in FIG. 12A.

FIGS. 12A and 12B shows the scanning element support framework 244 with elastomeric scanning element 240 (e.g. made from silicone rubber or equivalent material) torsionally-supported between the upper and lower elements 244A and 244B of the scanning element support framework 244. The mirror element 234 has been removed for purposes of exposition. As clearly shown, the scanning assembly pivot mechanism 233 is integrated with the scanning element support framework 244 and can be molded as a single component.

Figure 13B:
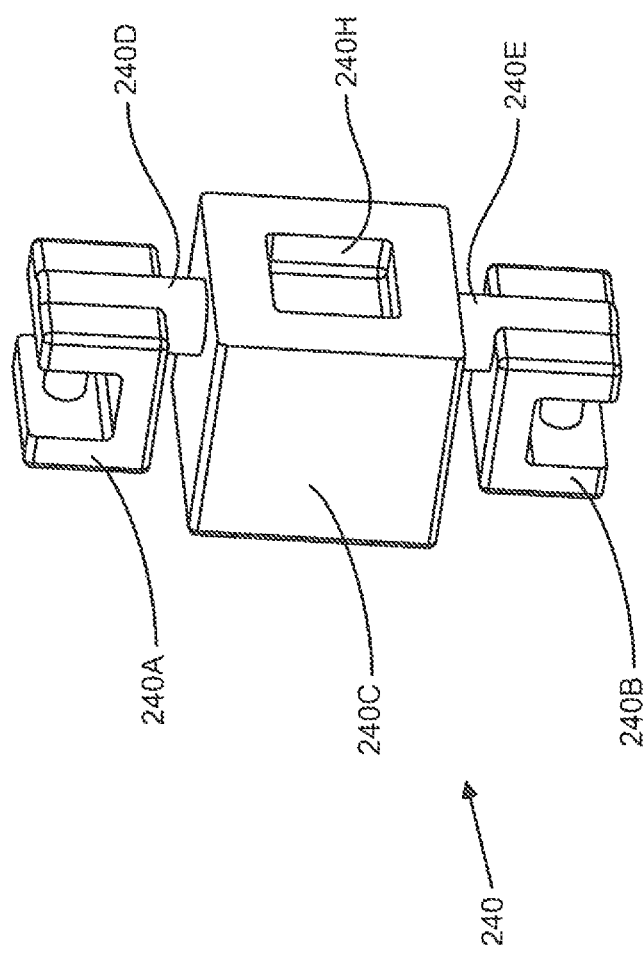
FIG. 13B is a second perspective view of the elastomeric scanning element shown in FIG. 13A.

As shown in FIGS. 13A and 13B, the elastomeric scanning element 240 is removed its scanning element support framework 244 and is shown comprising: a first end portion 240A; a second end portion 240B; and a scanning element support portion 240C extending between the first and second end portions 240A and 240B, by cylindrical portions 240D and 240E, extending along an axis of rotation 240F. As shown, first and second end portions 240A and 240B are shaped with a U-shaped geometry to clasp about the upper and lower support elements 244A and 244B. Alternatively, end portions 240A and 240B can be co-molded about support elements 244A and 244B, respectively. An illustrative embodiment of elastomeric scanning element 240 is disclosed in co-pending U.S. application Ser. No. 13/367,047 filed Feb. 6, 2012, and incorporated herein by reference in its entirety.

As shown in FIG. 13A, the scanning element support portion 240C also has a rear surface 240G which is adapted to receive the permanent magnet 245 using a layer of adhesive 245A after a layer of primer 245B has been applied to such surfaces. Also, scanning element support portion 240C has a front surface 240H which is adapted for supporting a mirror element 234 using a layer of adhesive 234A after a layer of primer 234 B has been applied to such surfaces.

All components of the laser scanning assembly, except for the magnet 245, elastomeric hinge element 240, and electromagnetic coil windings 232E, 232F can be a molded as thermoplastic parts using suitable thermoplastic material (e.g. Ticoma Fortron #1120L4-Polyphenylene Sulfide (PPS)). The permanent magnet 245 can be realized using Neodymium Iron Boron Type N50 magnetic material, or similar material. The elastomeric hinge element 240 can be injection molded from a Liquid Silicone Rubber (LSR) material, such as Momentive Performance #2030 Liquid LSR Silicone, or Shin-Etsu KE2090-30AB Select-Hesive Silicone with enhanced adhesive properties. The layer of adhesive 235 can be a Dow Corning 734 adhesive, or similar material, and the primer layer could be a GE SS4004P or similar material.

FIG. 14 describes a method of adjusting the optics in the laser scanning engine shown in FIGS. 9A, 9B and 9C, in accordance with the principles of invention disclosure.

As indicated at Step A in FIG. 14, the laser scanning engine 200 is mounted within a fixture, as schematically depicted in FIG. 15A. As shown, the laser scanning engine 200 comprises engine housing 220 in which laser scanning assembly 206 is rotatably mounted about an axis of rotation, and the laser scanning assembly has scanning mirror 234 that is driven into motion and sensed by electromagnetic coils 232E and 232F, respectively, having electrical conductors terminated in a set of conductive pins 231A through 231D. As indicated above, the set of conductive pins 231A through 231D are capable of sliding within the configuration of elongated holes 230A through 230D formed in the PC board 222, which is mountable onto the top surface of the laser scanning engine, after optical alignment has been achieved.

As indicated at Step B in FIG. 14, during optical adjustment operations within the laser scanning engine, a laser beam from VLD 203 is directed onto the light reflective calibration/reference target 260 associated with the alignment fixture, while the laser scanning assembly 206 is rotated about its axis of rotation 235, and causing the array of conductive pins 231A and 231D to rotate about the axis of rotation. Preferably, the laser scanning assembly is rotated, typically a few angular degrees, by placing a screwdriver tip into the flat headed groove 270 provided on the top end surface of the cylindrical post portion 3 associated with the laser scanning assembly, and then rotating the screwdriver handle until the desired degree of rotation is achieved to cause optical alignment while the laser scanning engine is mounted in the test fixture. This adjustment procedure is illustrated in FIGS. 15A and 15B. In FIG. 15A, the distance, d, between the planar flange of the electromagnetic coil and the permanent magnet is selected during design to be minimized, or made as small as possible, so as to minimize the electrical current required through the electromagnetic coil to generate a force field sufficient to drive the scan mirror and magnet rotor assembly, during scanning operation.

As indicated at Step C in FIG. 14, when the optical components (i.e. beam folding mirror and light collecting mirror) within the engine housing are properly aligned with the light reflective surface on the laser scanning assembly, then the angular position of the laser scanning assembly is mechanically locked within the engine housing, and then the PC board 222 is mounted onto the top surface of the laser scanning engine so that the rotated linear array of conductive pins 231A through 231D project through the elongated holes 230A through 230D formed in the PC board 222. During the optical alignment procedure, the distance d, determined by design, is not altered or modified, thereby ensuring that magnetic field alignment is preserved.

In an alternative method, Step C can be modified out as follows. The PC board 222 can be first mounted onto the housing, with a hole provided in the PC board to provide access to the end of cylindrical pivot post portion 233A using a screwdriver. Then, the laser scanning assembly can be rotated within the housing while PC board is mounted in place on the housing, during optical adjustment operations.

As indicated at Step D in FIG. 14, the set of conductive pins 231A through 231D projecting through the elongated holes 230A through 230D, respectively, in the PC board 222 are soldered to electrical conductors adjacent the elongated holes 230A through 230D, which form part of the electronic circuits on the PC board. Such electrical connections further strengthen the mechanical mounting of the laser scanning assembly 206 within the engine housing 220. This step represents the completion of the optical alignment process, and now the laser scanning engine can be removed from the test fixture and advanced to the next stage in the manufacturing/testing process.

Laser Scanning Module According to a Third Illustrative Embodiment of the Present Disclosure FIG. 16A through 16C show the laser scanning module 300 according to a third illustrative embodiment of the present disclosure comprising: an engine housing or framework 320 having six sides, namely opposing sides 320A and 320B, a front side 320C with a light transmission aperture 321, and opposing rear side 320D, a bottom side 320E and opposing top side 320F; a laser scanning assembly 306 rotatably mounted within the engine housing 320; and at least one PC board 322, mounted on the top side 320F, having one or more electronic circuits formed thereon implementing the functions of the various subsystems described in the system block diagram shown in FIG. 16.

As shown in FIG. 16, the laser scanning module 300 comprises: a laser drive circuit 301 for receiving control signals from system controller 302, and in response thereto, generating and delivering laser (diode) drive current signals to laser source 303, to produce a laser scanning beam 304A during each laser scanning bar code symbol reading cycle; a beam folding mirror 305 for folding beam 304A into beam 304B; a laser scanning assembly 306 for scanning laser beam 304B into laser scanning beam 304C across the laser scanning field 6; a scanner drive and sense circuit 307 for driving the electromagnetic coil structure 332 employed within the laser scanning assembly 306, and sensing scanning mirror motion, under the control of system controller 302; light collection optics 308 for collecting light reflected/scattered from scanned object in the scanning field, and a photo-detector 309 for detecting the intensity of collected light and generating an analog scan data signal corresponding to said detected light intensity during scanning operations; an analog scan data signal processor/digitizer 310 for processing the analog scan data signals and converting the processed analog scan data signals into digital scan data signals, which are then converted into digital words representative of the relative width of the bars and spaces in the scanned code symbol structure; programmed decode processor 311 for decode processing digitized data signals, and generating symbol character data representative of each bar code symbol scanned by laser scanning beam 304C; an input/output (I/O) communication interface module 312 for interfacing with a host communication system (e.g. PC computer) and transmitting symbol character data thereto via wired or wireless communication links that are supported by the symbol reading system and host system; and system controller 302 for generating the necessary control signals for controlling operations within the laser scanning module 300.

In the illustrative embodiments, electronic circuit blocks 301, 307, 302, 310, 311 and 312 specified in the system diagram of FIG. 16 can be realized on one or more printed circuit (PC) boards 322, 380 and 390 that mounted to one or more sides of the engine housing, as will be described in greater detail hereinafter. In the illustrative embodiment, PC board 322 supports circuit 307, whereas PC board 390 supports circuits 310, 311, 312 and 320, while PC board 390 supports circuit 301.

In general, the laser scanning assembly 306 is rotatably mounted within the framework, and comprises a scanning subassembly 341 (supporting a scanning mirror 344), having a permanent magnetic 345, and being capable of oscillation about a scanning axis 335, when its electromagnetic coil structure 332, having a plurality of electrically conductive pins 331A through 331D connected to its coil windings, are driven by scanner drive and sense circuit 307. The function of the electromagnetic coil is to exert forces on the permanent magnet, causing the scanning subassembly and scanning mirror 334 to oscillate about its scanning axis, and sweeping the laser scanning beam 304C across the laser scanning field 6. One or more PC boards 322 having one or more electronic circuits are mounted on one or more of the sides of the module housing. Also, at least one of the PC board has a configuration of elongated holes (i.e. elongated apertures having a closed-ended geometry) formed therein in a non-parallel manner, through which the electrically-conductive pins 331A through 331D project at locations determined by the angular rotation of the laser scanning assembly 306 when it is fixedly mounted in the module housing after optical alignment procedures have been completed during manufacture.

As shown in FIG. 16C, the PC board 322 has the plurality of elongated holes 330A through 330D, through which the linear array of electrically-conductive pins 331A through 331D from the electromagnetic coil support structure 332A project and can slide back and forth along the elongated holes 330A through 330D during adjustment and alignment of the laser scanning assembly 306 within the engine housing, during manufacture, as specified in FIGS. 23 through 24C. Conductors associated with the electronic circuit (i.e. scanner driver circuit 307) are formed adjacent the elongated holes on the PC board, so that soldered connections can be established between electrically-conductive pins that project therethrough, during the manufacturing process, as will be described in greater detail hereinafter.

Figure 18:
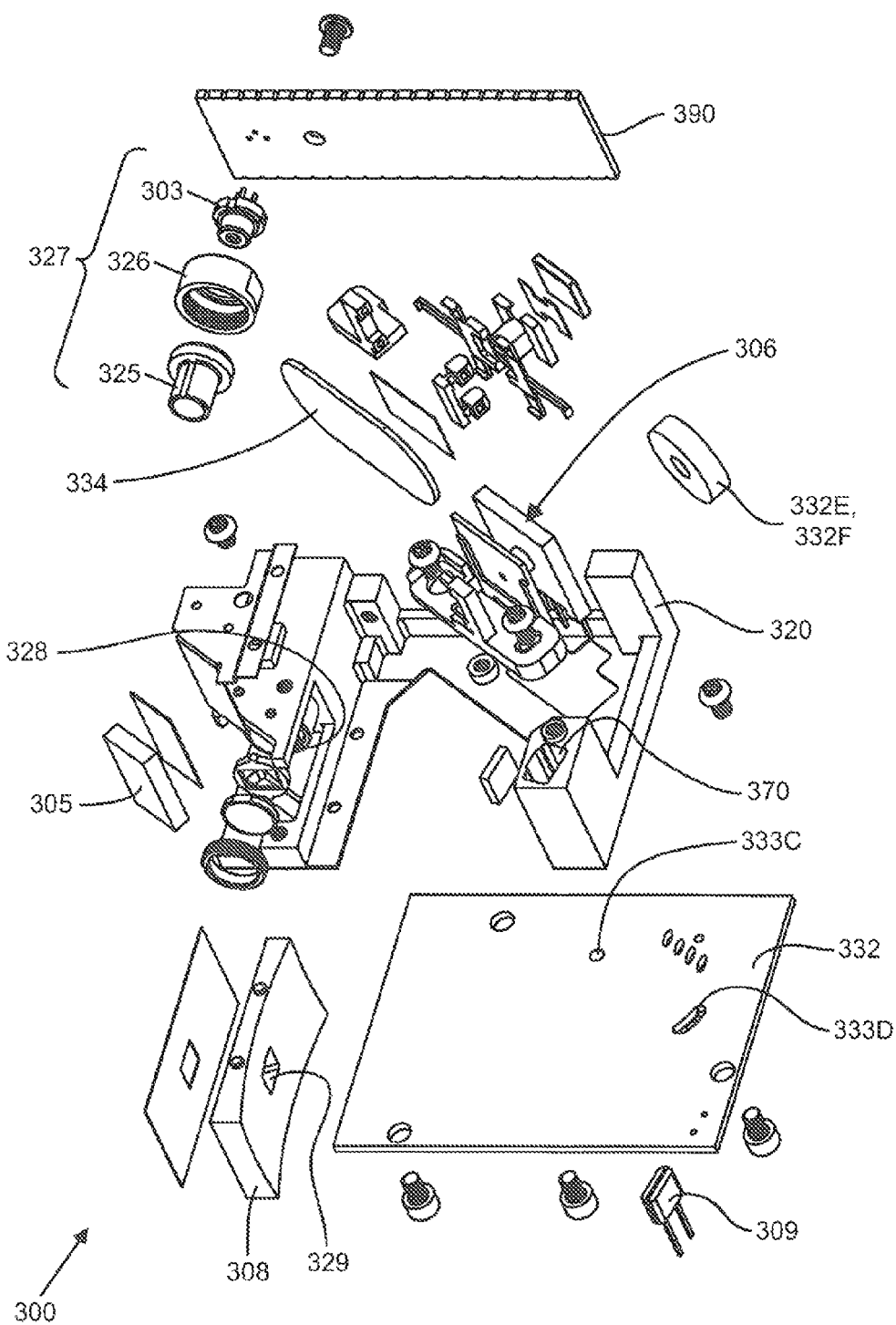
FIG. 18 is an exploded view of the laser scanning assembly employed in the laser scanning engine shown in FIG. 17.

As shown in FIGS. 17C and 18, the laser scanning engine 300 further comprises: a visible laser diode (VLD) 303, beam forming optics 325, and a barrel 326 for containing the VLD 303 and optics 325 and forming the laser beam production module 327 within the cylindrical mount 328 in the housing 320; a beam folding mirror 305 for folding the focused laser beam and transmitting it through an aperture 329 formed in a light collection mirror 308 mounted within the housing for focusing return laser light rays to a point of focus within the engine housing; and photo-detector 309 mounted on the PC board 322 and located in recess 370 at the point of focus of the light collection mirror 308 so as to detect the intensity of the analog laser light return signal and generate an electrical signal corresponding thereto; signal processing circuitry 310 on PC board 322 for converting the electrical analog scan data signal into a digital scan data signal (including edge detection signals and/or digital count values); and programmed decode processor 311 on the PC board 322, for processing digital scan data and producing symbol character data of decoded bar code symbols in a matter known in the art.

As shown in FIGS. 17 and 18, the laser scanning assembly 306 employs a scanning assembly pivot mechanism 333 that allows a set (e.g. linear array) of electrically-conductive pins 331A through 331D on the electromagnetic coil structure 332 to project through and slide within the configuration of elongated holes (i.e. elongated apertures) 330A through 330D formed in the PC board 332 in a non-parallel manner, as the laser scanning mirror 334 of the laser scanning assembly 306 is rotatably adjusted relative to the PC board 322 and fixed optics (i.e. light collection and beam folding mirrors 305 and 308) mounted within the engine housing 320, during optical adjustment and alignment operations performed during manufacture.

Figure 19C:
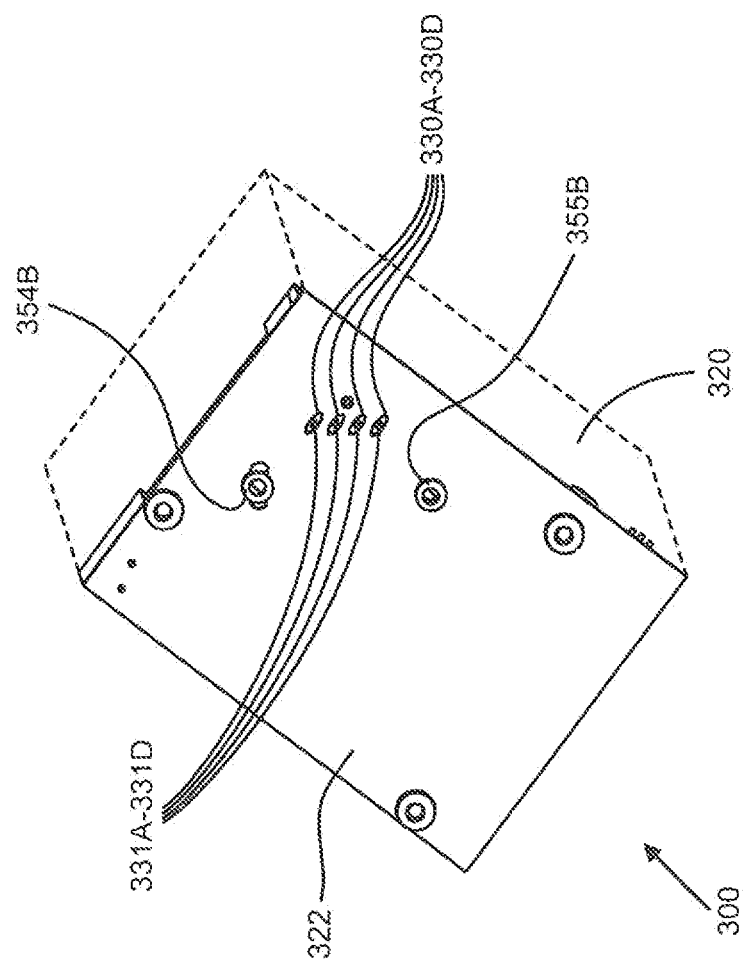
FIG. 19B is an elevated side view of the electro-magnetic coil mounting structure and scanning element support assembly mounted on the PC board, shown in FIG. 19A.

FIGS. 19A, 19B and 19C show the PC board 322 removed from the engine housing 320 so as to reveal the linear array of electrically-conductive pins 331A through 331D projecting from the electromagnetic coil support structure 332. As shown in FIGS. 20A and 20C, the electromagnetic coil structure 332 is integrated with a scanning assembly pivot mechanism 333 that is realized by a first base plate 341A joined to second base plate 341B, while supporting elastomeric hinge element 340 by way of support arms 339A and 339B, shown in FIG. 20C. In turn, the laser scanning mirror 334 is mounted to mirror support structure 342, which is coupled to a magnet support structure 344, by way of posts 343 coupled to the elastomeric hinge structure 340. The magnetic support structure 344 supports permanent magnet 345 by way of a layer of adhesive 345A, along with a layer of primer 345B. An illustrative embodiment of elastomeric hinge structure 340 is disclosed in co-pending U.S. application Ser. No. 13/367,978 filed Feb. 7, 2012, and incorporated herein by reference in its entirety.

As shown, the base plate 341A has an elongated hole 351, and a circular hole 352, whereas base plate 341B has only a circular hole 353. Then the base plates 341A and 341B are joined together, as shown in FIG. 20A, a bolt 354A is passed through holes 352 and 353 in the joined base plates, and hole 333C formed in the PC board 322, and then tightened with nut 354B. Also, a bolt 355A is also passed through elongated hole 351 formed in base plate 341A, and hole 333D formed in the PC board 322, and then tightened down with nut 355B. When mounting bolts 354A and 355A are loosened, the laser scanning assembly 306 is free to rotate about axis of rotation 335, during adjustment and alignment operations, as specified in FIGS. 23 through 24C. The mounting bolts 354A and 355A can be easily locked in place by tightening into threaded inserts 354B, 355B after the base plate assembly has been sufficiently rotated to an angular position at which proper optical alignment is attained between the beam folding mirror 305, the light collection mirror 308 and the laser scanning mirror 334 within the engine housing 320.

In the illustrative embodiment shown in FIGS. 20A and 20B, the electromagnetic coil support structure 332A has the shape of a bobbin formed by a pair of spaced apart flanges 332B and 332C separated by a cylindrical portion 332D. About the cylindrical portion 332D, a primary drive coil 332E is wound and terminated in a first pair of electrically-conductive pins 331A and 331B. Also, sense coil 332F is also wound about the electromagnetic coil support structure 332A, and terminated in a second pair of electrically-conductive pins 331C and 331D. As shown in FIG. 20B, the electrically conductive pins 331A through 331D are arranged in a linear array configuration, but may be arranged in a different configuration, in different illustrative embodiments, as may be required or desired.

As shown in FIGS. 20C and 21, the scanning subassembly 349 comprises: (a) a scan mirror and magnet rotor subassembly including a scan mirror and magnetic support structure collectively identified by reference numerals 342, 343 and 344, a permanent magnet 345, an elastomeric hinge element 340 as described in the second illustrative embodiment, and a mirror element 345; and (b) a stationary scanning element support framework (i.e. a stationary stator structure) collectively identified by reference numerals 338A, 338B, 339A, 339B, for supporting the scan mirror and magnet rotor assembly and being integrated with a scanning assembly pivot mechanism 333 realized by pivoting base portions 341A, 341B, supported on the PC board 322.

As shown in FIGS. 20C and 21, the mirror and magnetic support structure (i.e. scan mirror and magnet rotor subassembly) 342, 343 and 344 comprises: (i) a mirror mounting portion 342 having mirror support arms 342D and 342E extending outwards transverse to the virtual axis of rotation supported by the laser scanning assembly; (ii) a magnet mounting portion 344 extending from a transverse body portion 343 that is integrated to the mirror support portion 342; and (iii) cut-outs 342A and 342B formed in the mirror and magnetic support portions along the transverse body portion 343. As shown in FIGS. 20C and 21, the elastomeric hinge arm elements 340D and 340E slides through the cut-out portions 342A and 342B and is glued to the transverse body portion 343 as shown in FIG. 21. The permanent magnet 345 is mounted to the magnet mounting portion 344 using a layer of adhesive 345A upon a layer of primer 345B.

The scanning element support framework 338 is formed by base support plates 341A and 341B slid together and bolted to the PC board 322, and a pair of parallel support arms 339A and 339B that pass through apertures 340F and 340G formed in the end portions of the elastomeric hinge element 340B. The function of support arms 339A and 339B is to support the scanning subassembly 349 relative to the scanning element support framework 338, as the scanning subassembly 349 is driven into oscillation relative to the scanning element support framework 338, by electromagnetic forces generated by the electromagnetic coil structure 332.

As shown in FIGS. 20A and 20C, the mirror element 334 is mounted to the base portion 340A of the elastomeric hinge element 340 and mirror support arms 342D and 342E using a layer of adhesive 350A applied upon a layer of primer 350B.

FIG. 22 shows the elastomeric scanning element 340 (e.g. made from silicone rubber or equivalent material) supported between the support arms 339A and 339B of the scanning element support framework 338. The base plate portions 341A and 341B of scanning element support framework, and hole 352, and elongated aperture 351, with bolts 354A and 355A fastened through PC board 322, and nuts, implement the scanning assembly pivot mechanism 333 of the third illustrative embodiment. The mirror element 344 has been removed for purposes of exposition. As clearly shown, the scanning assembly pivot mechanism 333 is integrated with the scanning element support framework 341, 338 and can be molded as a single component.

All components of the laser scanning assembly, except for the magnet 345, elastomeric hinge element 340, and electromagnetic coil windings 332E, 332F can be a molded as thermoplastic parts using a suitable thermoplastic material (e.g. Ticoma Fortron #1120L4-Polyphenylene Sulfide (PPS)). The permanent magnet 345 can be realized using Neodymium Iron Boron Type N50 magnetic material, or similar material. The elastomeric hinge element 340 can be injection molded from a Liquid Silicone Rubber (LSR) material, such as Momentive Performance #2030 Liquid LSR Silicone, or Shin-Etsu KE2090-30AB Select-Hesive Silicone with enhanced adhesive properties. The layer of adhesive 135 can be a Dow Corning 734 adhesive, or similar material, and the primer layer could be a GE SS4004P or similar material.

FIG. 23 describes a method of adjusting the optics in the laser scanning engine shown in FIGS. 16A, 16B and 16C, in accordance with the principles of invention disclosure.

As indicated at Step A in FIG. 23, the laser scanning engine 300 is mounted within a fixture, as schematically depicted in FIG. 24A. As shown, the laser scanning engine 300 comprises engine housing 320, in which laser scanning assembly 306 is rotatably mounted about an axis of rotation 335, and the laser scanning assembly has a scanning mirror 334 that is driven into motion and sensed by electromagnetic coils 332E and 332F having electrical conductors terminated in a set of conductive pins 331A through 331B. As indicated above, the set of conductive pins 331A through 331D are capable of sliding within the configuration of elongated holes 330A through 330D formed in the PC board 322.

As indicated at Step B in FIG. 23, during optical adjustment operations within the laser scanning engine, a laser beam from VLD 301 is directed onto the light reflective target 360 associated with the test fixture, while the laser scanning assembly 306 is rotated about its axis of rotation, and causing the array of conductive pins 331A and 331D to rotate about the axis of rotation to an angular position, and slide within elongated holes 330A through 330D. Rotation of the laser scanning assembly 306 can be achieved by loosening bolts 354A and 355A slightly, and then gently rotating the laser scanning assembly 306. Preferably, the laser scanning assembly is rotated, typically a few angular degrees, until the desired degree of rotation is achieved to cause optical alignment while the laser scanning engine is mounted in the test fixture. This adjustment procedure is illustrated in FIGS. 24A and 24B. In FIG. 24A, the distance, d, between the planar flange of the electromagnetic coil and the permanent magnet is selected during design to be minimized, or made as small as possible, so as to minimize the electrical current required through the electromagnetic coil to generate a force field sufficient to drive the scan mirror and magnet rotor assembly, during scanning operation.

Once the laser scanning assembly been adjusted, the angular position of the laser scanning assembly that achieves this adjustment can be mechanically locked by retightening bolts 354A and 355A, to nuts 354B and 355B, and placing a few drops of LockTite® adhesive on these bolts in a conventional manner. During the optical alignment procedure, the distance d, determined by design, is not altered or modified, thereby ensuring that magnetic field alignment is preserved.

As indicated at Step C in FIG. 23, when the optical components (i.e. beam folding mirror and light collecting mirror) within the engine housing are properly aligned with the light reflective surface on the laser scanning assembly, then top plate 380 is mounted onto the top surface of the laser scanning engine.

As indicated at Step D in FIG. 23, the set of conductive pins 331A through 331D projecting through the elongated holes 330A through 330D, respectively, in the PC board 322 are soldered to electrical conductors adjacent the elongated holes 330A through 330D, which form part of the electronic circuit on the PC board. Such electrical connections further strengthen the mechanical mounting of the laser scanning assembly 306 within the engine housing 320. This step represents the completion of the optical alignment process, and now the laser scanning engine can be removed from the test fixture and advanced to the next stage in the manufacturing/testing process.

Modifications that Come to Mind

Having described the illustrative embodiments, several variations and modifications readily come to mind.

In the illustrative embodiments, the laser scanning modules has been shown to have the form factor of parallel-piped shaped engines, where opposite sides are generally parallel to each other. It is understood, however, that in alternative embodiments, the laser scanning module of the present disclosure can have non-parallel-piped form factors (e.g. cylindrical-shaped, drum shaped, oval-shaped, arbitrary-shaped 3D modules).

Such modifications and alternative embodiments are possible provided that: (i) the laser scanning assembly is mounted in the module housing so that it can be rotated relative to a PC board affixed thereto; (ii) the PC board has a configuration of elongated holes, within which the electrically-conductive pins of the electromagnetic coil structure can slide, during or after optical alignment operations have been performed; and (iii) once optical alignment conditions have been achieved within the laser scanning module, the laser scanning assembly is mechanically located into its angular position, and the electrically-conductive pins are soldered to the electronic circuits on the PC board.

It is understood that the laser scanning assembly of the illustrative embodiments may be modified in a variety of ways which will become readily apparent to those skilled in the art in view of the novel teachings disclosed herein. All such modifications and variations of the illustrative embodiments thereof shall be deemed to be within the scope of the Claims appended hereto.

What is claimed is:

1. A laser scanning module, comprising:
a module housing having a light transmission aperture for the transmission of a laser scanning beam and collection of return laser light and optics mounted in said module housing for folding said laser scanning beam and collecting return laser light reflected or scattered from a scanned code structure;
a PC board disposed in or on said module housing and having a configuration of elongated apertures of open-ended and/or closed geometry formed therein in a non-parallel manner and one or more electronic circuits formed thereon with at least one electronic circuit having a conductor formed adjacent said elongated apertures; and
a laser scanning assembly disposed in said module housing and having a scanning subassembly including a mirror element and an electromagnetic coil structure with a set of electrically-conductive pins for scanning said laser scanning beam through said light transmission aperture and across a laser scanning field;
a scanning assembly pivot mechanism disposed in said module housing for (i) rotatably mounting said laser scanning assembly, including said scanning subassembly and said electromagnetic coil structure, about an axis of rotation within said module housing and (ii) allowing said laser scanning assembly to be rotated to an angular position about said axis of rotation;
wherein said set of electrically-conductive pins associated with said electromagnetic coil structure project through said configuration of elongated apertures formed in said PC board at locations along said elongated apertures determined by said angular position.

2. The laser scanning module of claim 1, comprising:
a visible laser diode (VLD), beam forming optics, and a barrel for containing said VLD and said beam forming optics and providing a laser beam production module for mounting within said module housing and generating a laser beam;
wherein said optics comprises a beam folding mirror and a light collection mirror disposed in said module housing;
wherein said beam folding mirror folds said laser beam and transmits said laser beam through an aperture formed in said light collection mirror, and said light collection mirror focuses return laser light rays to a point of focus within said module housing;
a photo-detector mounted on said PC board and located at said point of focus of said light collection mirror so as to detect the intensity of an analog laser light return signal focused at said point of focus and generate an electrical signal corresponding thereto;
signal processing circuitry on said PC board for converting the electrical analog scan data signal into a digital scan data signal including edge detection signals and/or digital count values; and
a programmed decode processor on said PC board for processing digital scan data and producing symbol character data of decoded bar code symbols.

3. The laser scanning module of claim 1, wherein said electromagnetic coil structure is integrated with said scanning assembly pivot mechanism.

4. The laser scanning module of claim 3, wherein said electromagnetic coil structure comprises an electromagnetic coil support structure for supporting (i) a drive coil terminated in a first pair of electrically-conductive pins and (ii) a sense coil terminated in a second pair of electrically-conductive pins.

5. The laser scanning module of claim 4, wherein said first and second pairs of electrically-conductive pins are aligned in a linear array mounted to a portion of said electromagnetic coil structure and said linear array of electrically-conductive pins project through said elongated apertures formed in said PC board at locations determined by said angular position of said laser scanning assembly.

6. The laser scanning module of claim 3, wherein said scanning subassembly comprises a cylindrical pivot post designed for rotatable mounting within a cylindrical recess formed in an interior wall surface of said module housing.

7. The laser scanning module of claim 6, wherein:
said scanning assembly pivot mechanism comprises a pair of support arms for supporting said scanning subassembly including said mirror element; and
said support arms extend from said cylindrical pivot post.

8. The laser scanning module of claim 1, wherein said electromagnetic coil structure is integrated with said scanning assembly pivot mechanism, and wherein said scanning assembly pivot mechanism comprises a cylindrical post portion that rotatably mounts within a cylindrical recess formed in a wall surface of said module housing, and wherein said scanning subassembly comprises:
a scanning element support framework supported by said cylindrical post portion;
wherein said electromagnetic coil structure is operably connected to said scanning element support framework; and
a scanning element supported by said scanning element support framework and having a front surface to which said mirror element is mounted and a rear surface to which a permanent magnet is mounted.

9. The laser scanning module of claim 8, wherein said scanning element support framework comprises upper and lower elements between which said scanning element is supported.

10. The laser scanning module of claim 9, wherein said electromagnetic coil structure comprises an electromagnetic coil support structure for supporting (i) a drive coil terminated in a first pair of electrically-conductive pins (ii) a sense coil terminated in a second pair of electrically-conductive pins.

11. The laser scanning module of claim 10, wherein said first and second pairs of electrically-conductive pins are aligned in a linear array mounted to a portion of said electromagnetic coil structure and said linear array of electrically-conductive pins project through said elongated holes formed in said PC board at locations determined by said angular position of said laser scanning assembly.

12. The laser scanning module of claim 9, wherein said scanning assembly pivot mechanism is integrated with said scanning element support framework and is molded as a single component.

13. The laser scanning module of claim 1, wherein said electromagnetic coil structure is integrated with said scanning assembly pivot mechanism, and wherein said scanning assembly pivot mechanism comprises a base portion rotatably mounted on said PC board.

14. The laser scanning module of claim 13, wherein said base portion is formed by a pair of base support plates that are slid together and rotatably connected to said PC board.

15. A laser scanning module, comprising:

a module housing;

a laser scanning assembly mounted within said module housing via a mechanism that allows the laser scanning assembly to be rotated to an angular position within the module housing;

a PC board mounted on a top side of said module housing and having a configuration of elongated apertures of open-ended and/or closed geometry arranged in a non-parallel manner; and an electromagnetic coil structure associated with said laser scanning assembly and having an array of electrically-conductive pins that project through said configuration of elongated apertures at locations along the elongated apertures that are determined by the angular rotation of said laser scanning assembly.

16. A laser scanning module, comprising:

a module housing;

a laser scanning assembly mounted within said module housing via a mechanism that allows the laser scanning assembly to be rotated to an angular position within the module housing;

a PC board mounted on a bottom side of said module housing and having a configuration of elongated apertures of open-ended and/or closed geometry arranged in a non-parallel manner; and an electromagnetic coil structure associated with said laser scanning assembly and having an array of electrically-conductive pins that project through said configuration of elongated apertures at locations along the elongated apertures that are determined by the angular rotation of said laser scanning assembly.

* * * * *